May 7, 1940.     J. R. PEIRCE     2,199,547
RECORD PERFORATING DEVICE
Filed July 2, 1932     24 Sheets-Sheet 1

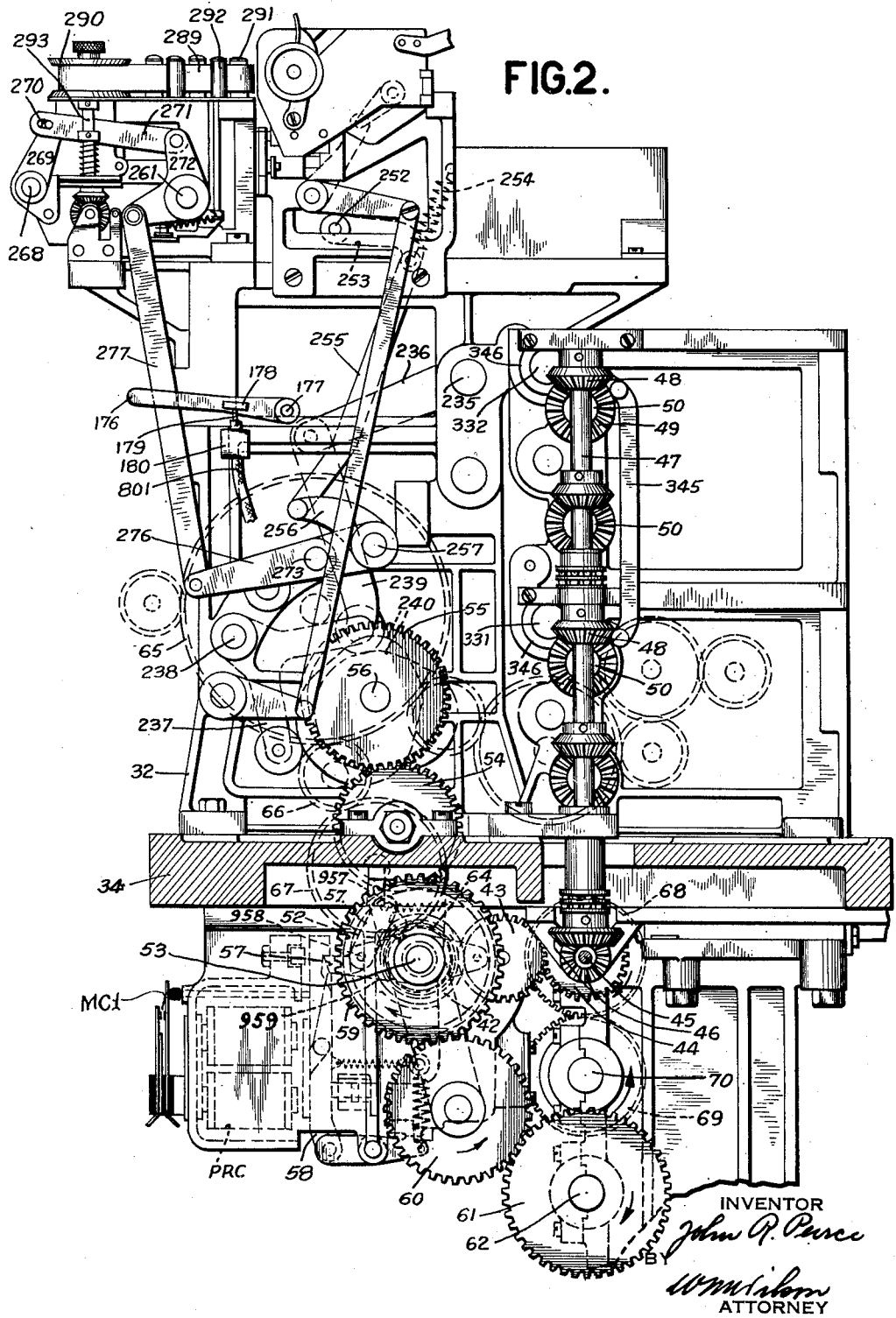

May 7, 1940.  J. R. PEIRCE  2,199,547
RECORD PERFORATING DEVICE
Filed July 2, 1932  24 Sheets-Sheet 3

May 7, 1940.  J. R. PEIRCE  2,199,547

RECORD PERFORATING DEVICE

Filed July 2, 1932  24 Sheets-Sheet 4

INVENTOR
John R. Peirce
BY
W. M. Wilson
ATTORNEY

May 7, 1940.    J. R. PEIRCE    2,199,547
RECORD PERFORATING DEVICE
Filed July 2, 1932    24 Sheets-Sheet 5
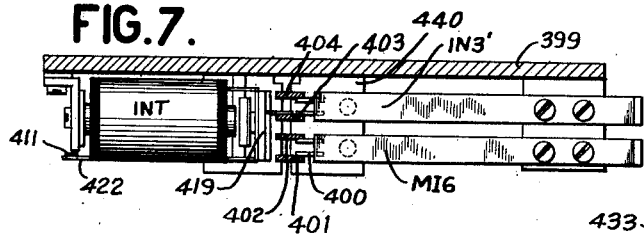
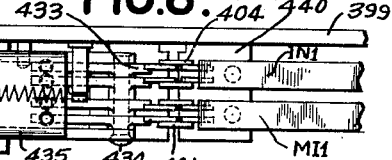
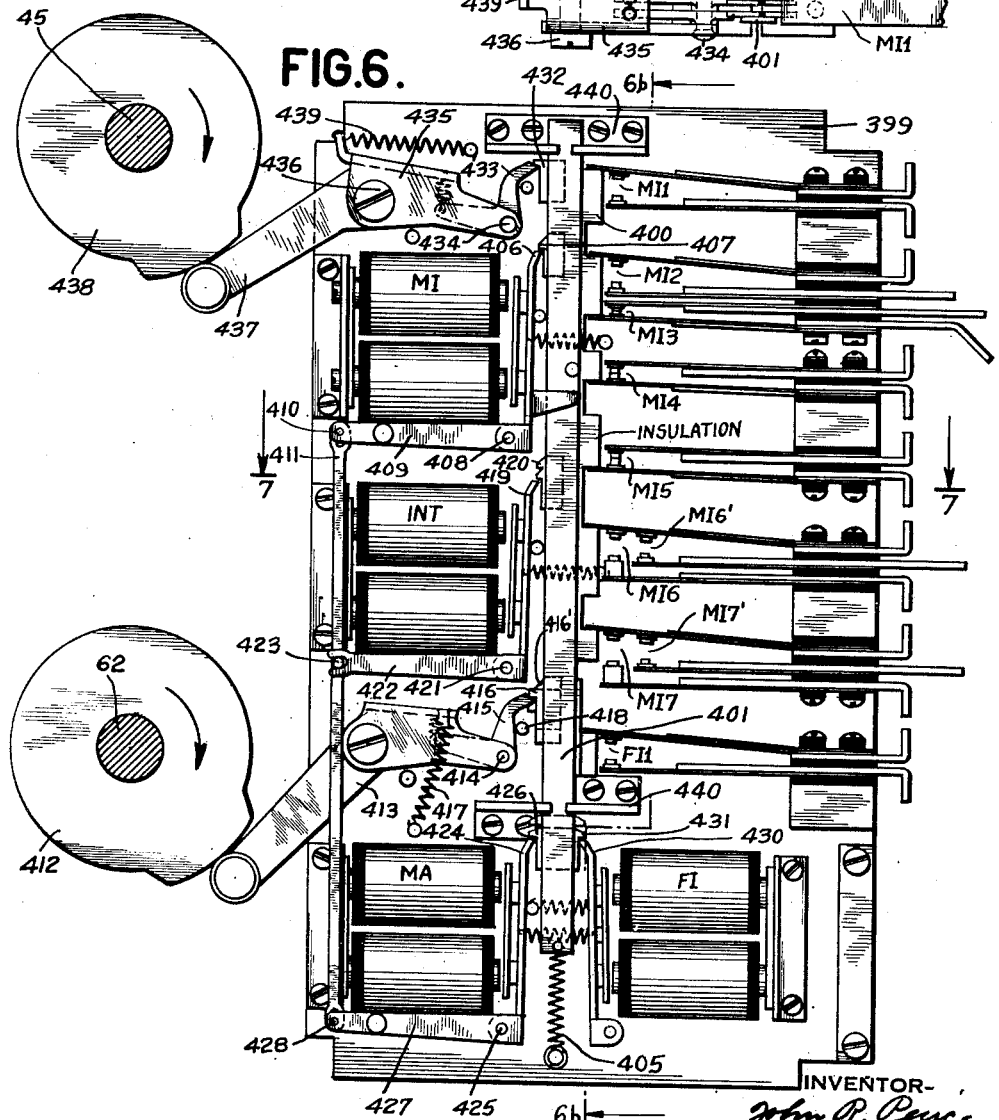
INVENTOR-
John R. Peirce
BY
ATTORNEY- May 7, 1940.  J. R. PEIRCE  2,199,547
RECORD PERFORATING DEVICE
Filed July 2, 1932  24 Sheets-Sheet 6
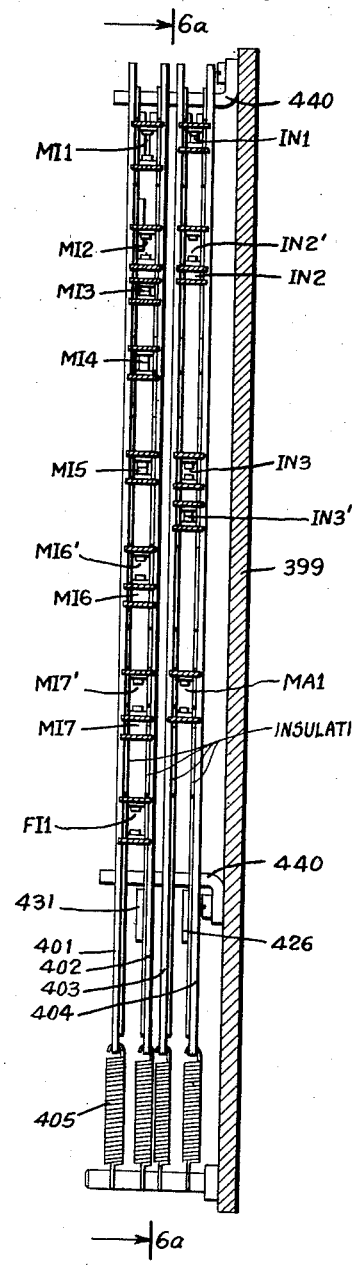
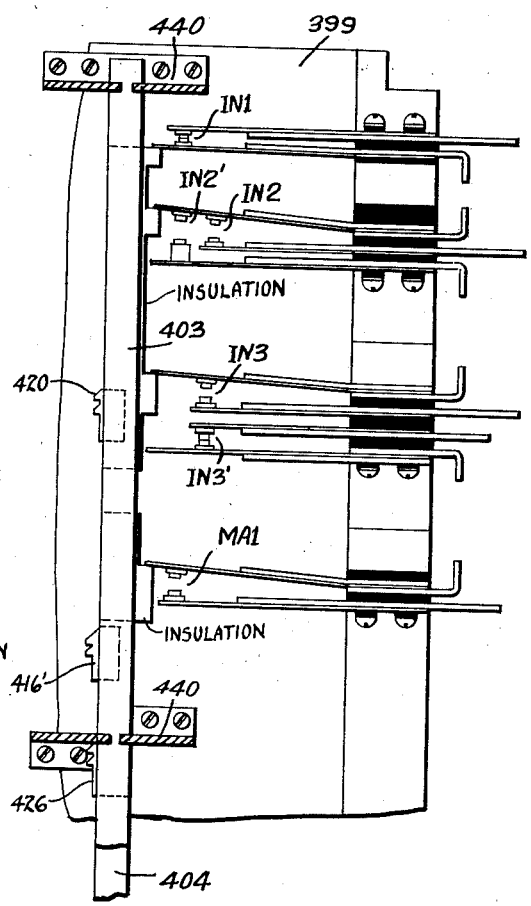
INVENTOR
John R. Peirce
BY
ATTORNEY

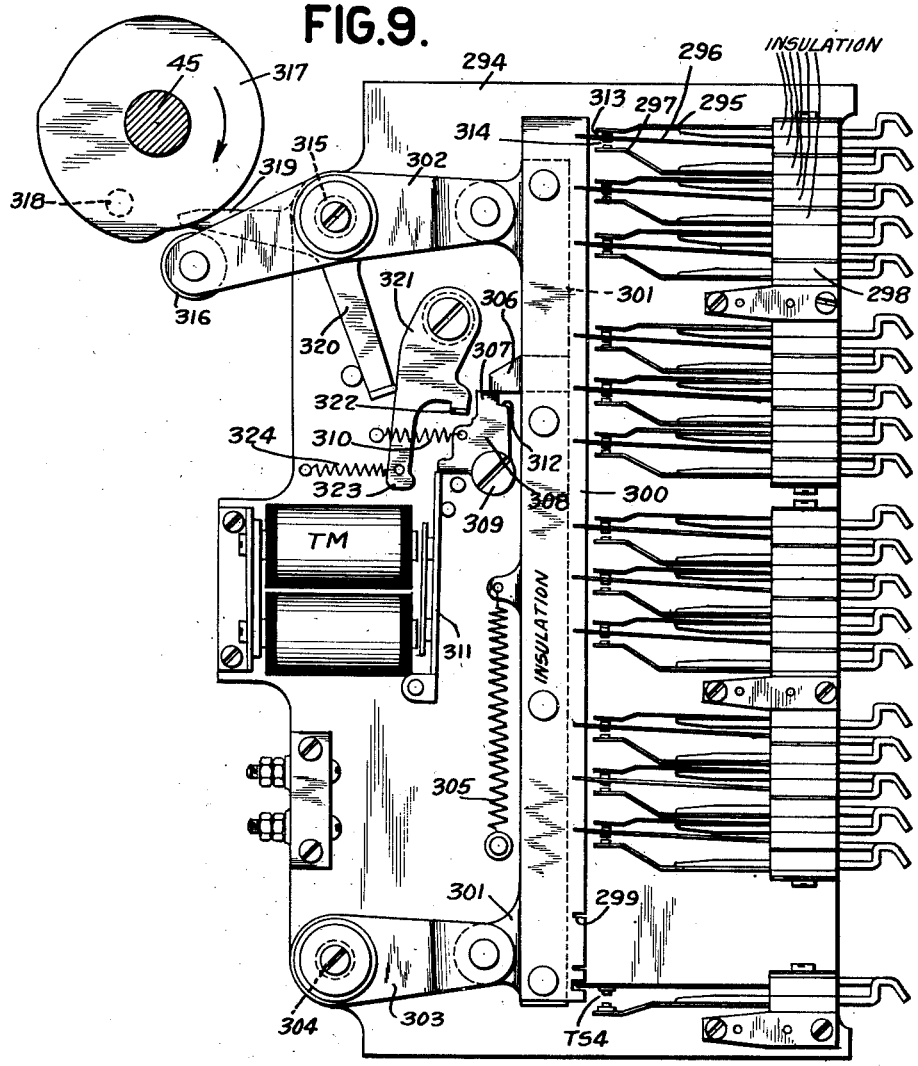

May 7, 1940.   J. R. PEIRCE   2,199,547
RECORD PERFORATING DEVICE
Filed July 2, 1932    24 Sheets-Sheet 8

INVENTOR-
John R. Peirce
BY
ATTORNEY-

FIG.11.
FIG.12.
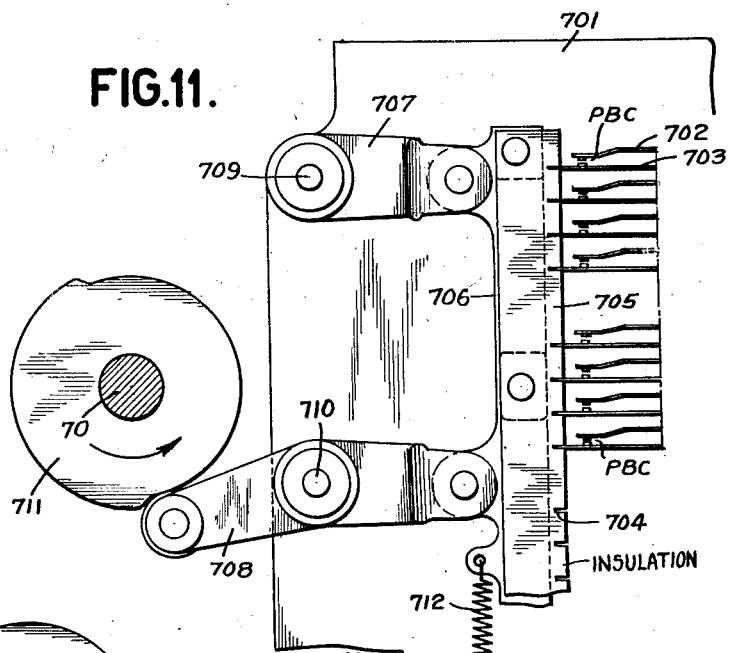
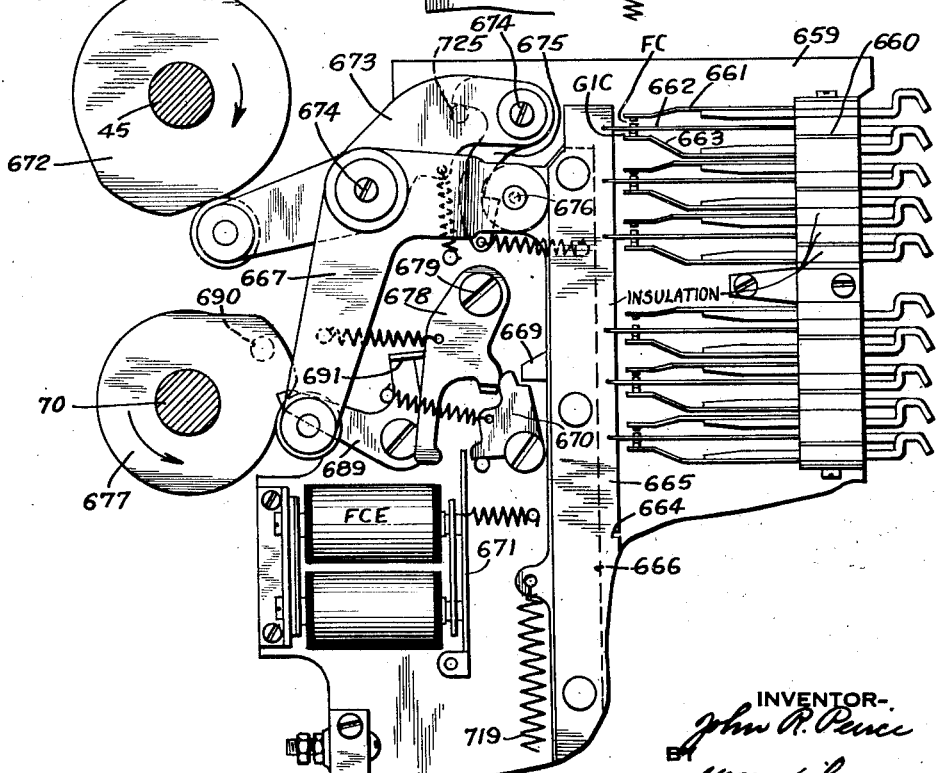

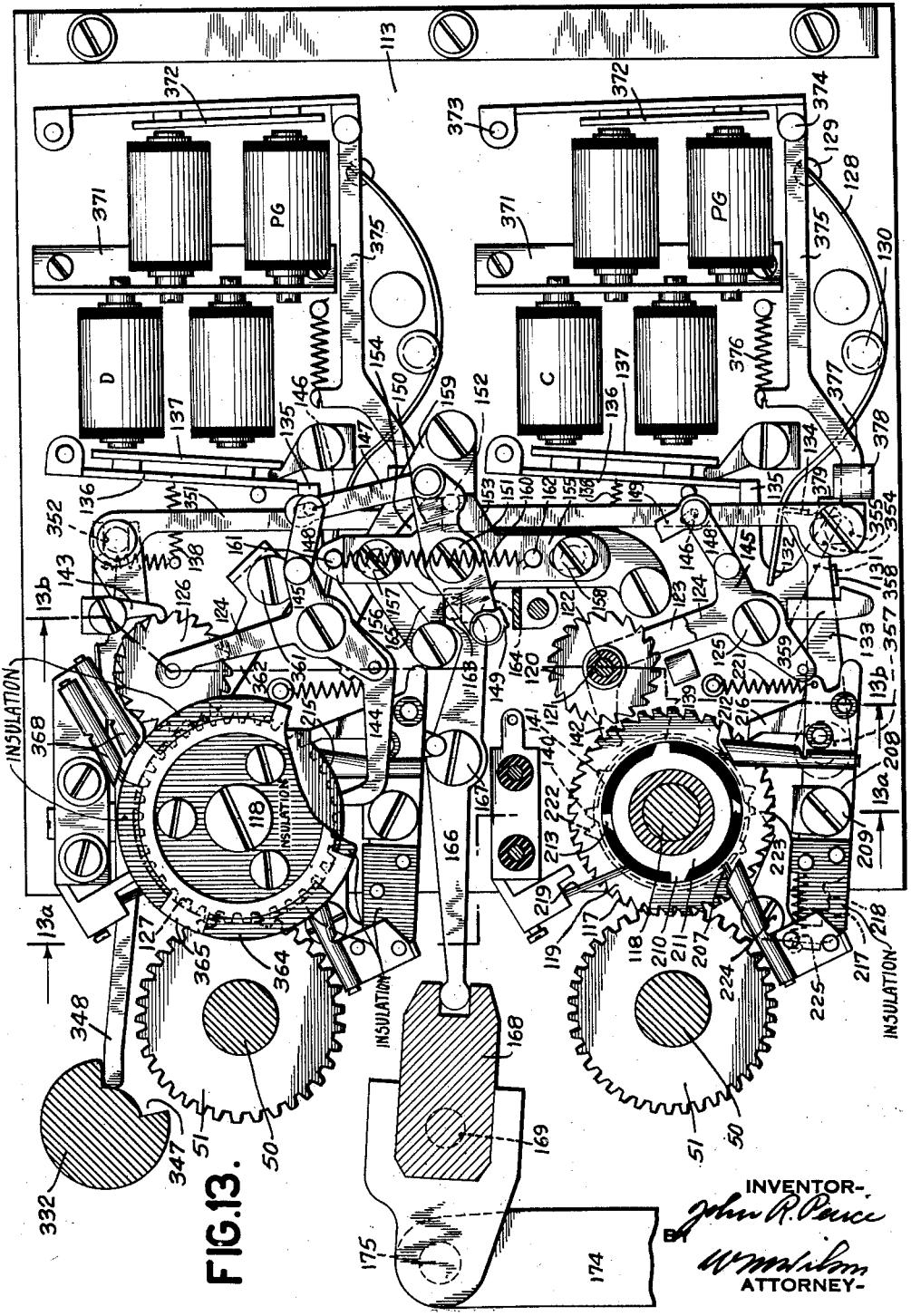

May 7, 1940.    J. R. PEIRCE    2,199,547
RECORD PERFORATING DEVICE
Filed July 2, 1932    24 Sheets-Sheet 11
FIG. 29.
| DISTRICT Major | SALESMAN Int. | COMMODITY Minor | AMOUNT Minor Balance | TOTAL Int. | TOTAL Major | TOTAL Final |
|---|---|---|---|---|---|---|
| 1 | 1 | 1 | 10.00 | | | |
| 1 | 1 | 2 | 10.00 | | | |
| 1 | 1 | 3 | 10.00 | | | |
| 1 | 1 | 4 | 10.00 | | | |
| | | | | 40.00 | | |
| 1 | 2 | 5 | 10.00 | | | |
| 1 | 2 | 6 | 10.00 | | | |
| | | | | 20.00 | 60.00 | |
| 2 | 3 | 7 | 10.00 | | | |
| 2 | 3 | 8 | 10.00 | | | |
| | | | | 20.00 | 20.00 | 80.00 |
287
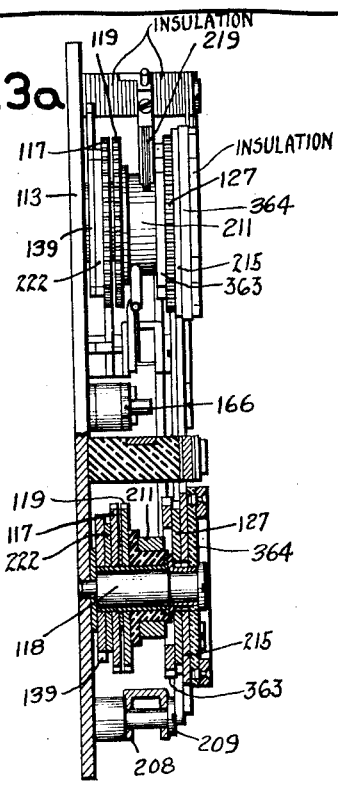
FIG.13a.
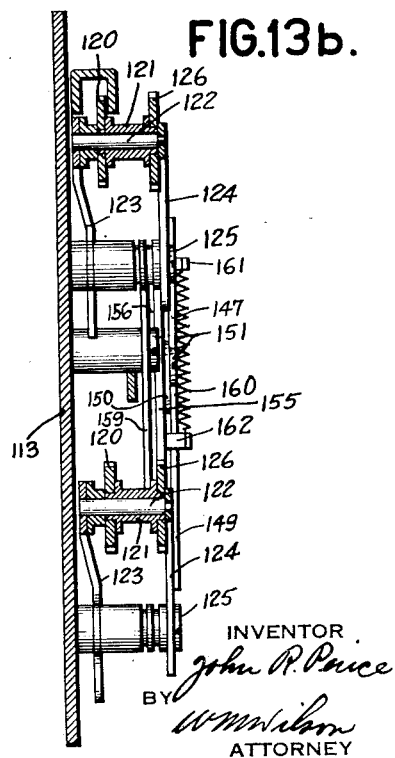
FIG.13b.
INVENTOR
John R. Peirce
BY
W M Wilson
ATTORNEY May 7, 1940. J. R. PEIRCE 2,199,547
RECORD PERFORATING DEVICE
Filed July 2, 1932 24 Sheets-Sheet 12

INVENTOR-
John R. Peirce
BY
W. M. Wilson
ATTORNEY-

May 7, 1940.                J. R. PEIRCE                2,199,547
                     RECORD PERFORATING DEVICE
               Filed July 2, 1932          24 Sheets—Sheet 13

INVENTOR-
John R. Peirce
BY
ATTORNEY-

May 7, 1940. J. R. PEIRCE 2,199,547
RECORD PERFORATING DEVICE
Filed July 2, 1932 24 Sheets-Sheet 14
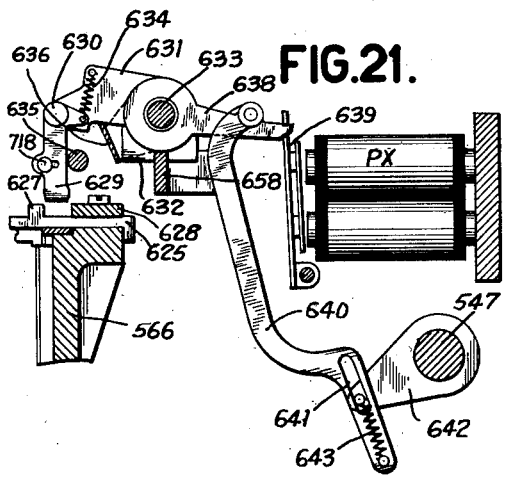
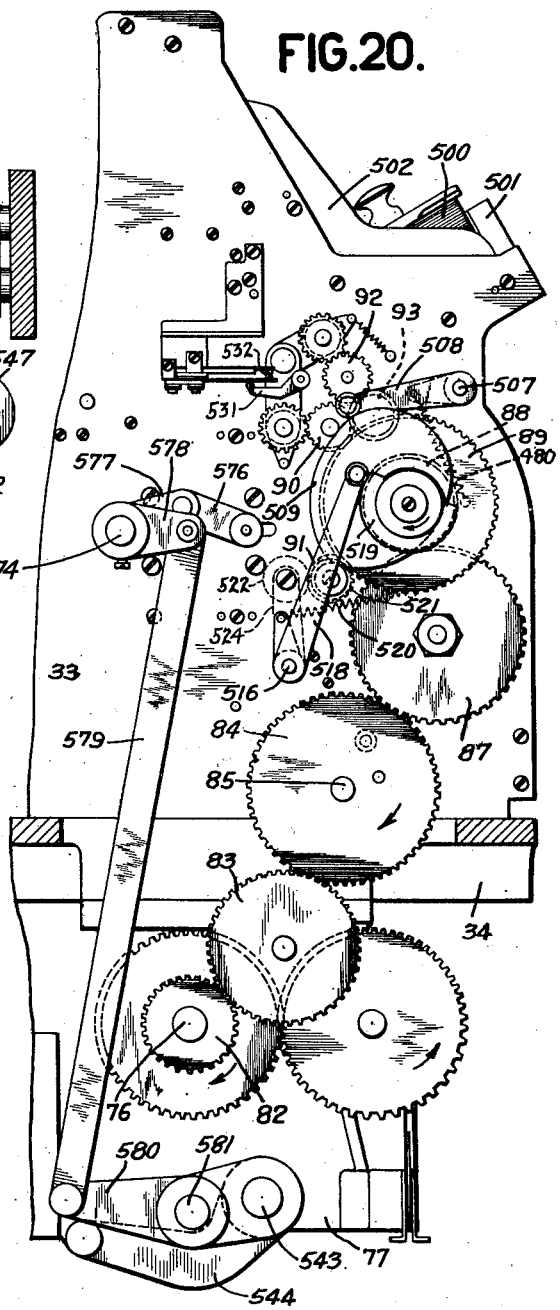
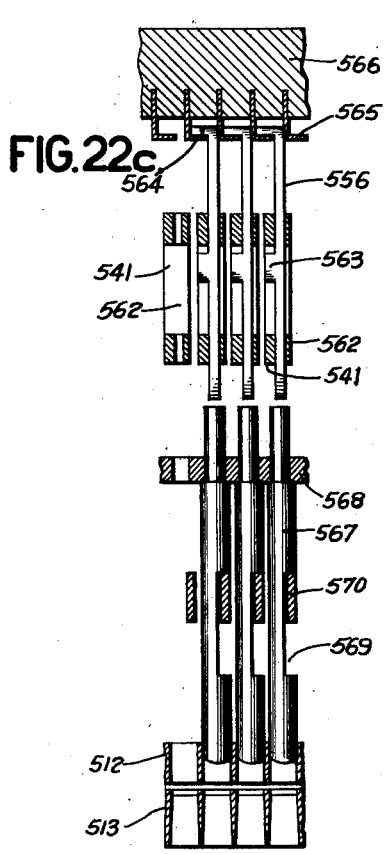
INVENTOR-
John R. Peirce
BY
W. M. Wilson
ATTORNEY-

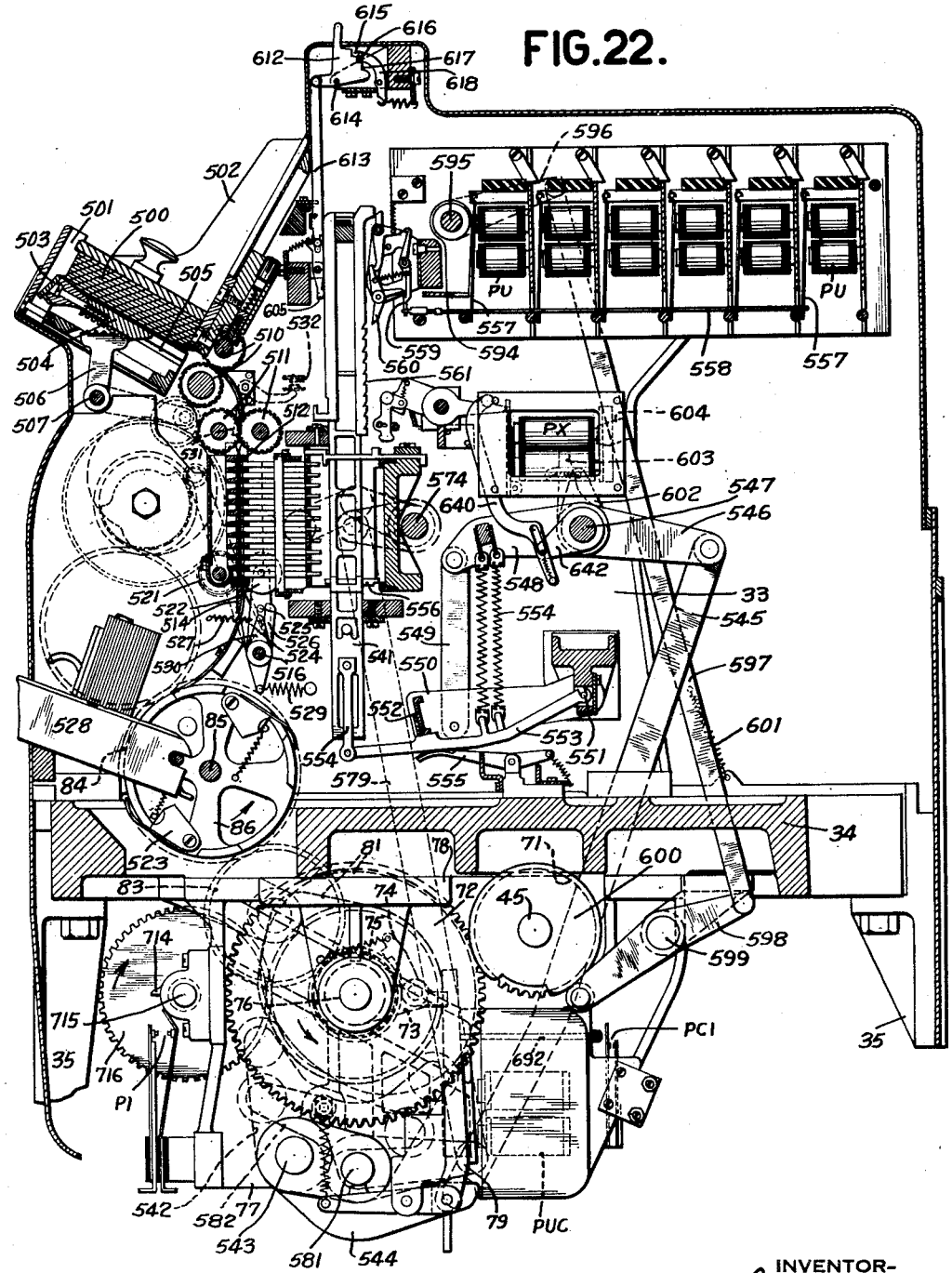

May 7, 1940. J. R. PEIRCE 2,199,547
RECORD PERFORATING DEVICE
Filed July 2, 1932 24 Sheets-Sheet 16

INVENTOR
John R. Peirce
BY
W M Wilson
ATTORNEY

May 7, 1940.  J. R. PEIRCE  2,199,547
RECORD PERFORATING DEVICE
Filed July 2, 1932   24 Sheets-Sheet 17

INVENTOR-
John R. Peirce
BY
ATTORNEY-

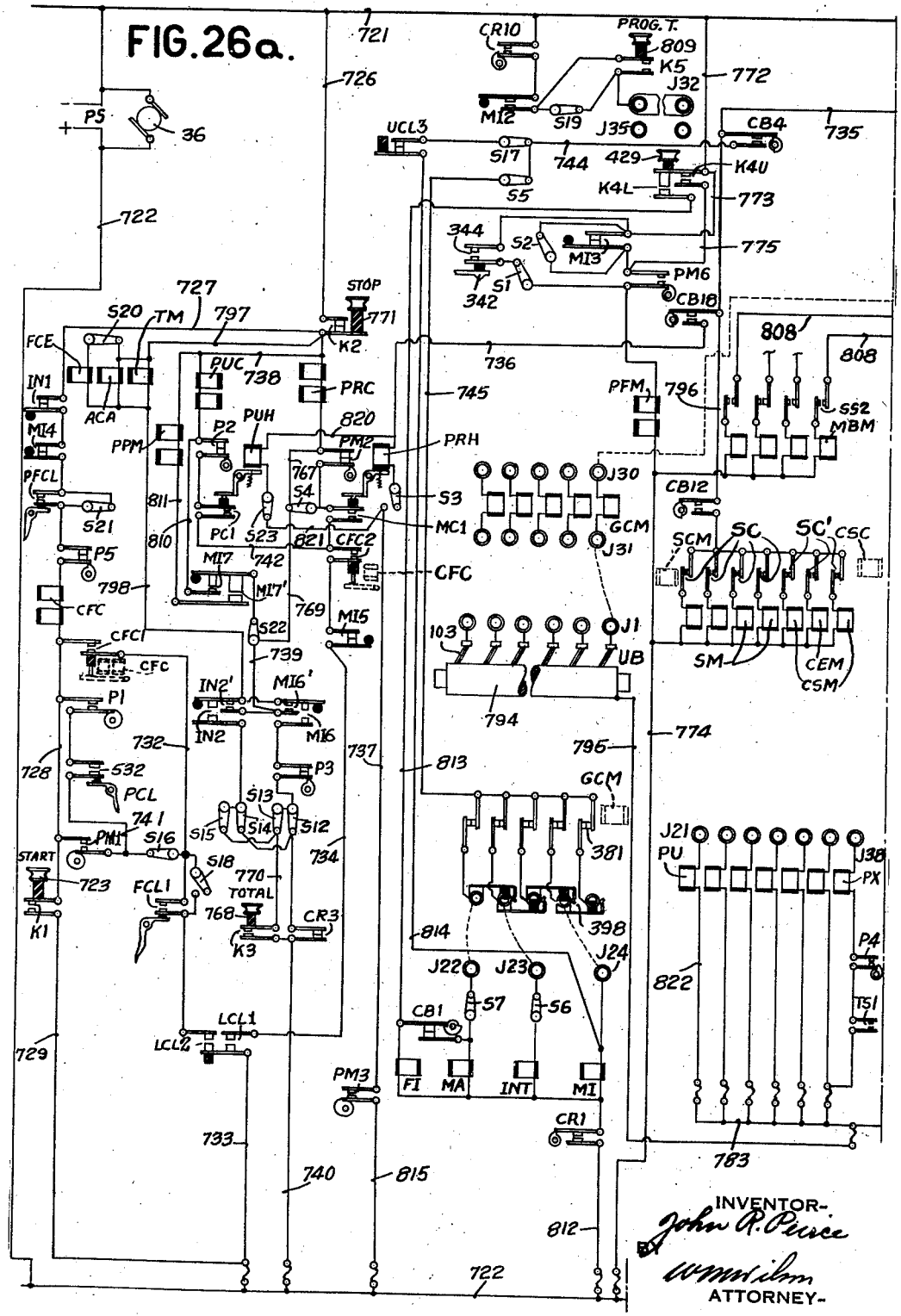

May 7, 1940.　　　　J. R. PEIRCE　　　　2,199,547
RECORD PERFORATING DEVICE
Filed July 2, 1932　　　24 Sheets-Sheet 19

May 7, 1940.   J. R. PEIRCE   2,199,547
RECORD PERFORATING DEVICE
Filed July 2, 1932   24 Sheets-Sheet 20

INVENTOR.
John R. Peirce
BY
ATTORNEY

May 7, 1940.    J. R. PEIRCE    2,199,547
RECORD PERFORATING DEVICE
Filed July 2, 1932    24 Sheets-Sheet 21

INVENTOR
John R. Peirce
BY
W. M. Wilson
ATTORNEY

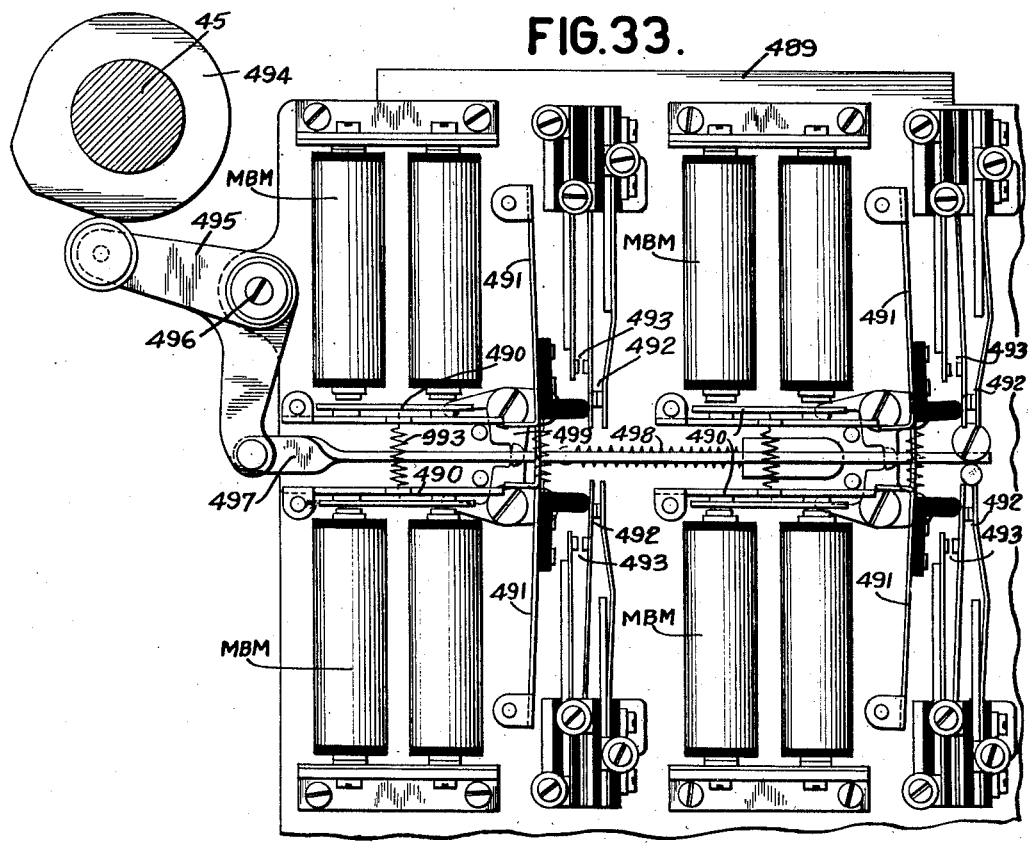

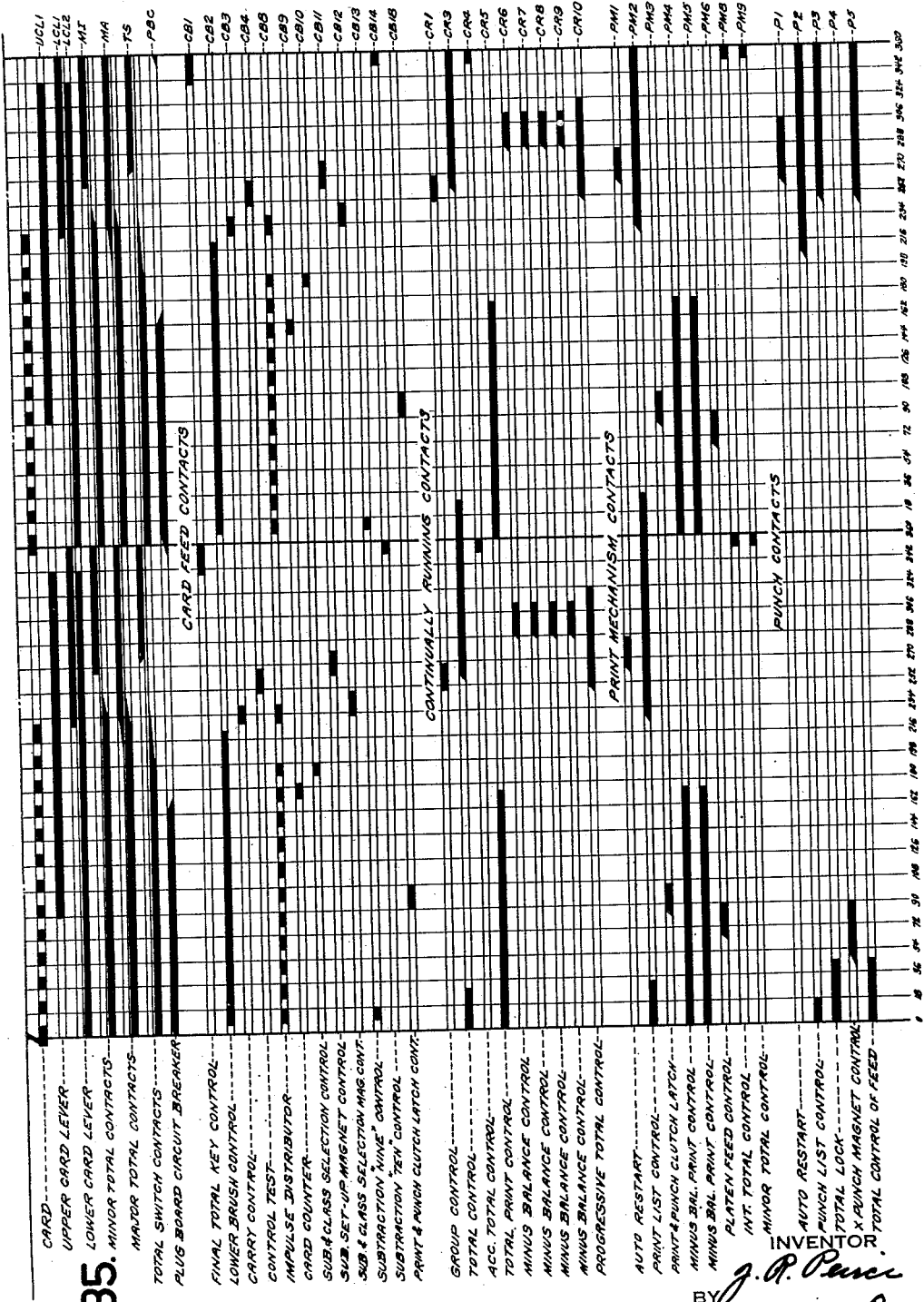

Patented May 7, 1940

2,199,547

UNITED STATES PATENT OFFICE 2,199,547

RECORD PERFORATING DEVICE

John Royden Peirce, New York, N. Y., assignor, by mesne assignments, to International Business Machines Corporation, New York, N. Y., a corporation of New York Application July 2, 1932, Serial No. 620,653

9 Claims. (Cl. 235—61.10)

This invention relates to devices for perforating records to register a total or summary of a number of accumulated items. The total amount punched may be a balance which is reached after adding and subtracting amounts by means of a pair of credit and debit accumulators provided in the machine. The accounting machine in which the novel devices are incorporated is controlled by perforated record cards.

The perforating devices are also adapted to be used as a duplicator to reproduce record cards fed through the machine.

An object of the invention is to provide card perforating devices adapted to be controlled by group control devices cooperating with the controlling record cards to sense a change in group classification.

Another object of the invention is to provide means for placing a special control perforation in summary cards carrying credit balances. The punching of the control perforation is controlled jointly by the highest order credit accumulator element and the perforator operating means. The location of the control perforation is manipulatively controlled so that it may be placed in any column on the summary card.

Another feature of the present invention is the control over the punching of zero perforations in the summary card. Manipulative devices associated with perforating control mechanism may be set to cause the perforation of the zero index points in all columns not punched to represent a significant digit. Another setting of the devices adapts the perforator to punch the zeros to the left of a significant digit perforation. A third setting splits the zero punching control to prevent zero punching to the left of the split column.

Another object of the invention is to provide a balance perforating device which normally punches the total or sub-total under control of the debit accumulator. If the total of the amounts added is greater than the total of the amounts subtracted the difference standing in the accumulators will be registered in the credit accumulator as a true number representing a positive amount and indicated by the presence of a zero on the highest order credit accumulator wheel. Then the balance perforating control is shifted so that a total is perforated under control of the credit accumulator which contains a true number as a credit balance.

In a copending application for Patent Serial No. 520,506, filed March 6, 1931, and issued May 16, 1933 as Patent 1,909,549 I disclose a tabulating machine adapted to analyze perforated records and accumulate debit and credit items in a duplex form of accumulator by adding credit items and complements of debit items in a credit accumulator and adding debit items and complements of credit items in a debit accumulator.

In the present invention I employ an accounting machine similar to that disclosed in the above mentioned application but in connection therewith I disclose a balance or summary card perforating device adapted to be controlled by the accumulators in the machine. Many other novel control features are involved in the present invention and described hereinafter.

Further objects, uses, and advantages of the present invention are pointed out hereinafter in this specification and claims and shown in the drawings which show by way of illustration what is now considered to be the preferred embodiment of the invention.

In the drawings:

Fig. 1 is a rear elevation view showing the main driving means and the clutch connections to the various parts of the machine.

Fig. 2 is a side elevation view of the machine showing the accumulator and printer driving mechanism.

Fig. 6 is a side elevation view of the group control switch mechanism.

Fig. 6a is a detail view of the intermediate and major control contacts on the group control switch plate.

Fig. 6b is a sectional elevation view taken along line 6b—6b in Fig. 6 and showing the cooperation of the ends of the group control contacts with the operating bars.

Fig. 7 is a sectional plan view taken along lines 7—7 in Fig. 6 and showing the intermediate group control magnet.

Fig. 8 is a plan view of the group control switch mechanism.

Fig. 9 is a side elevation view of the total switch.

Fig. 11 is a detail view of the plugboard circuit breaker switch.

Fig. 12 is a side elevation view of the first card elimination control switch.

Fig. 13 is a side elevation view of a duplex accumulator unit partially in section.

Fig. 13a is a side view and section of the accumulator mechanism taken along lines 13a—13a in Fig. 13.

Fig. 13b is a sectional elevation view of the accumulator taken along the lines 13b—13b in Fig. 13 showing the subtraction control linkage.

Fig. 20 is a side elevation view showing the gear connections adapted to drive the summary card feeding devices.

Fig. 21 is a detail view of the devices for controlling the punching of a special perforation in the summary card.

Fig. 22 is a sectional elevation view of the machine taken through the summary card perforating devices.

Fig. 22a is a detail view of two sets of complementary cams for operating the summary card punch bars and the summary card punch frame.

Fig. 22c is a detail view of a section through the punch showing the perforator interposer members in cooperation with the punch plungers and the operating frame.

Figure 26B:
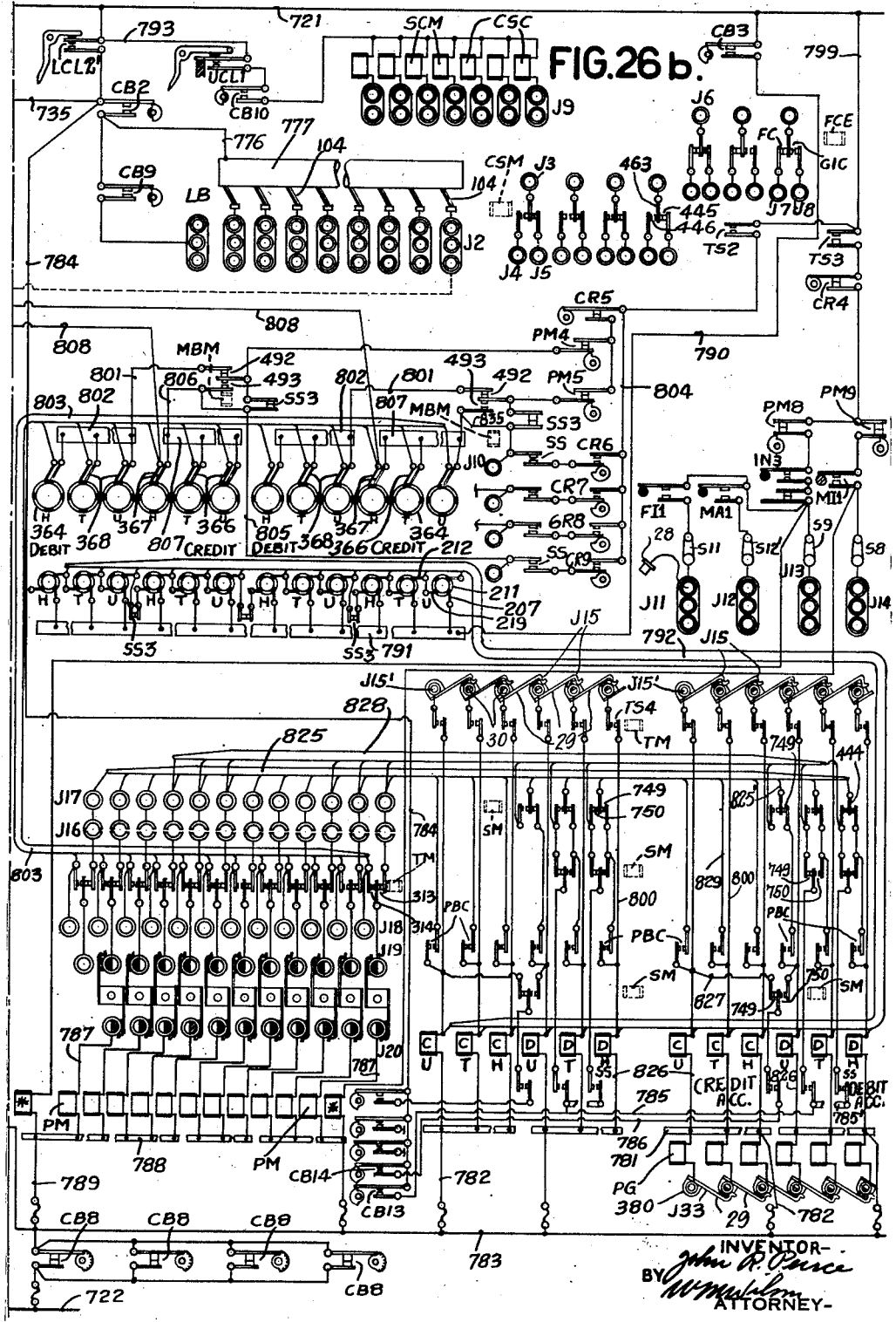

Figs. 26a and 26b taken together form a wiring diagram of the machine.

Fig. 27 is an illustration of the operation of the machine in adding and subtracting a series of credit and debit entries registered on the accumulators in the machine.

Fig. 28 is a portion of a record sheet showing the recording of some of the items shown in Fig. 27.

Fig. 29 is a view showing a portion of the record sheet containing a series of items printed under group control.

Figure 30:
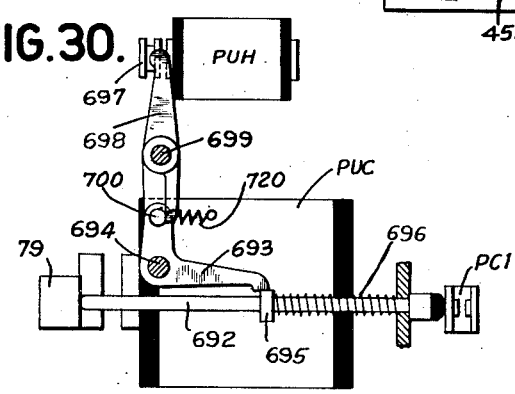

Fig. 30 is a detail view of a switch device for holding the punch controlling circuit closed after the perforation of a record of a total.

Figure 31:
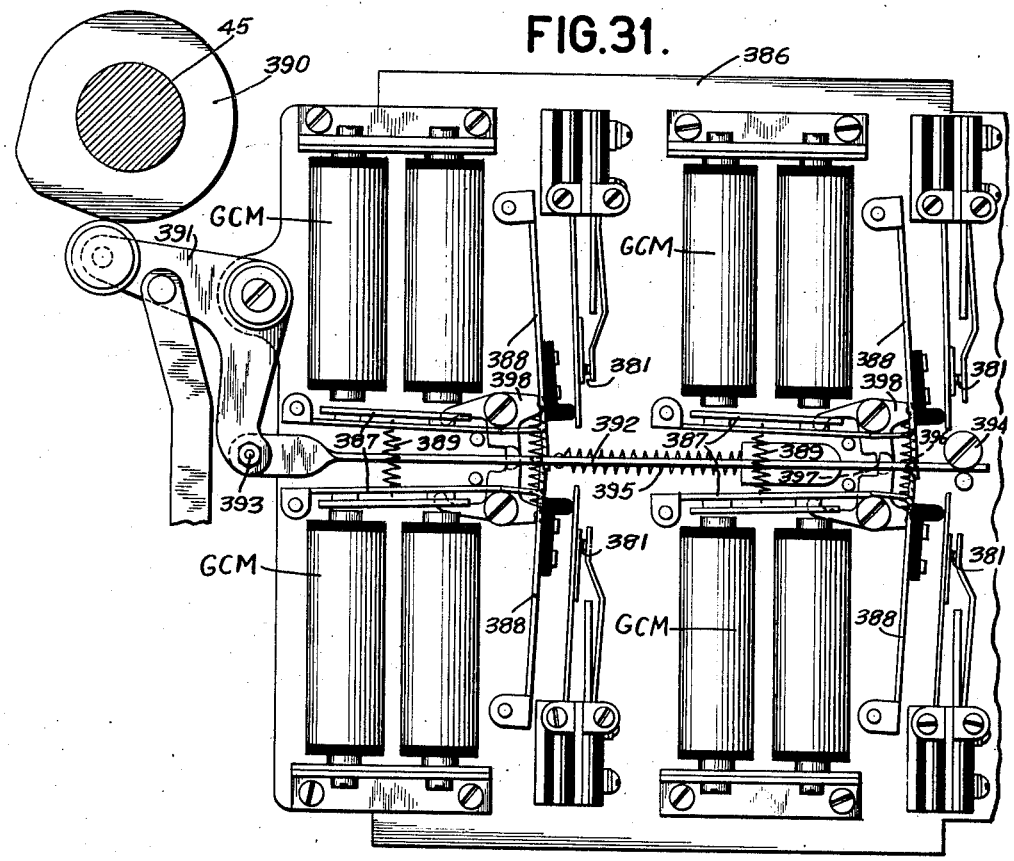

Fig. 31 is a side elevation view of the group control magnets and the contacts operated under control of the magnets.

Figure 31A:
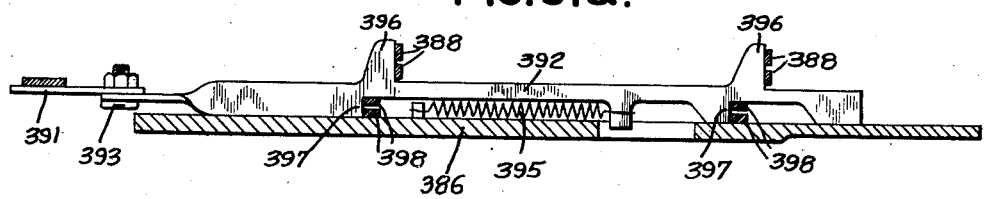

Fig. 31a is a detail view of the bar for restoring the group control magnet armatures and the group control contacts.

Figure 32:
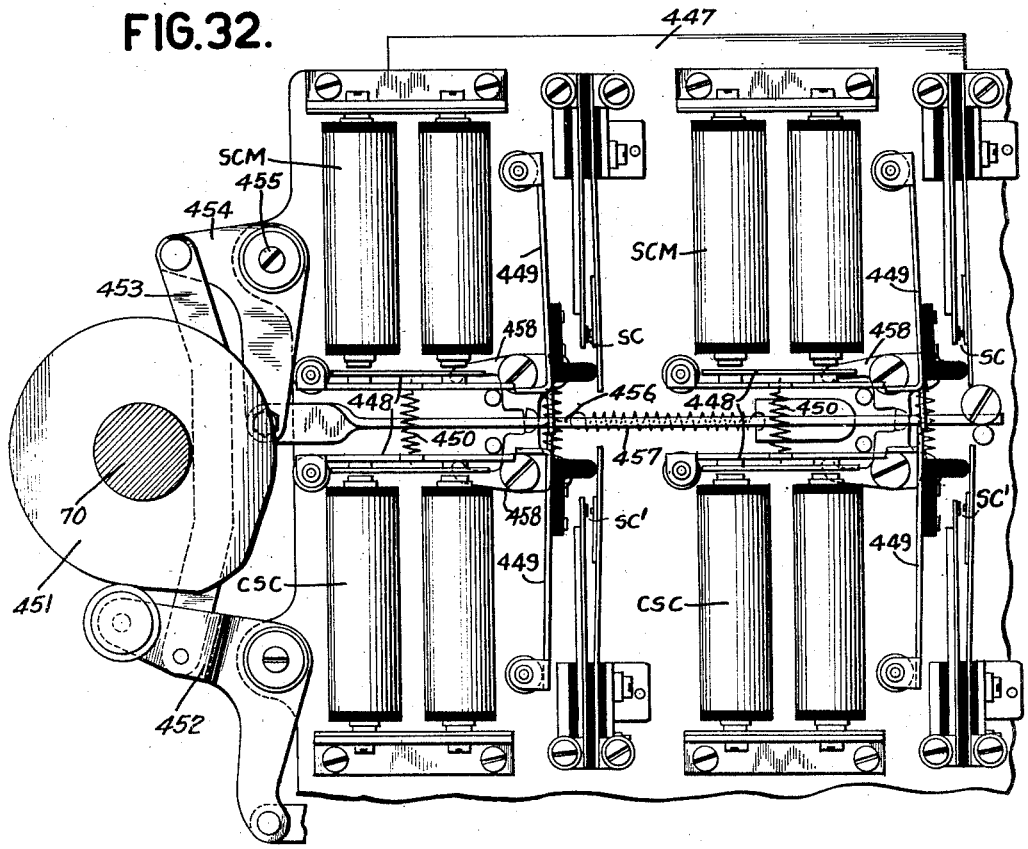

Fig. 32 is a side elevation view of the subtraction control magnets and class selection magnets operated under control of special perforations in the record cards.

Fig. 33 is a side elevation view of the minus balance magnet control plate.

Fig. 34 shows a portion of a punched summary card with a record of a credit balance of $18.27 and group number perforations showing that the total relates to group 63.

Fig. 35 is a timing diagram of the cam contacts in the machine.

Figure 36:
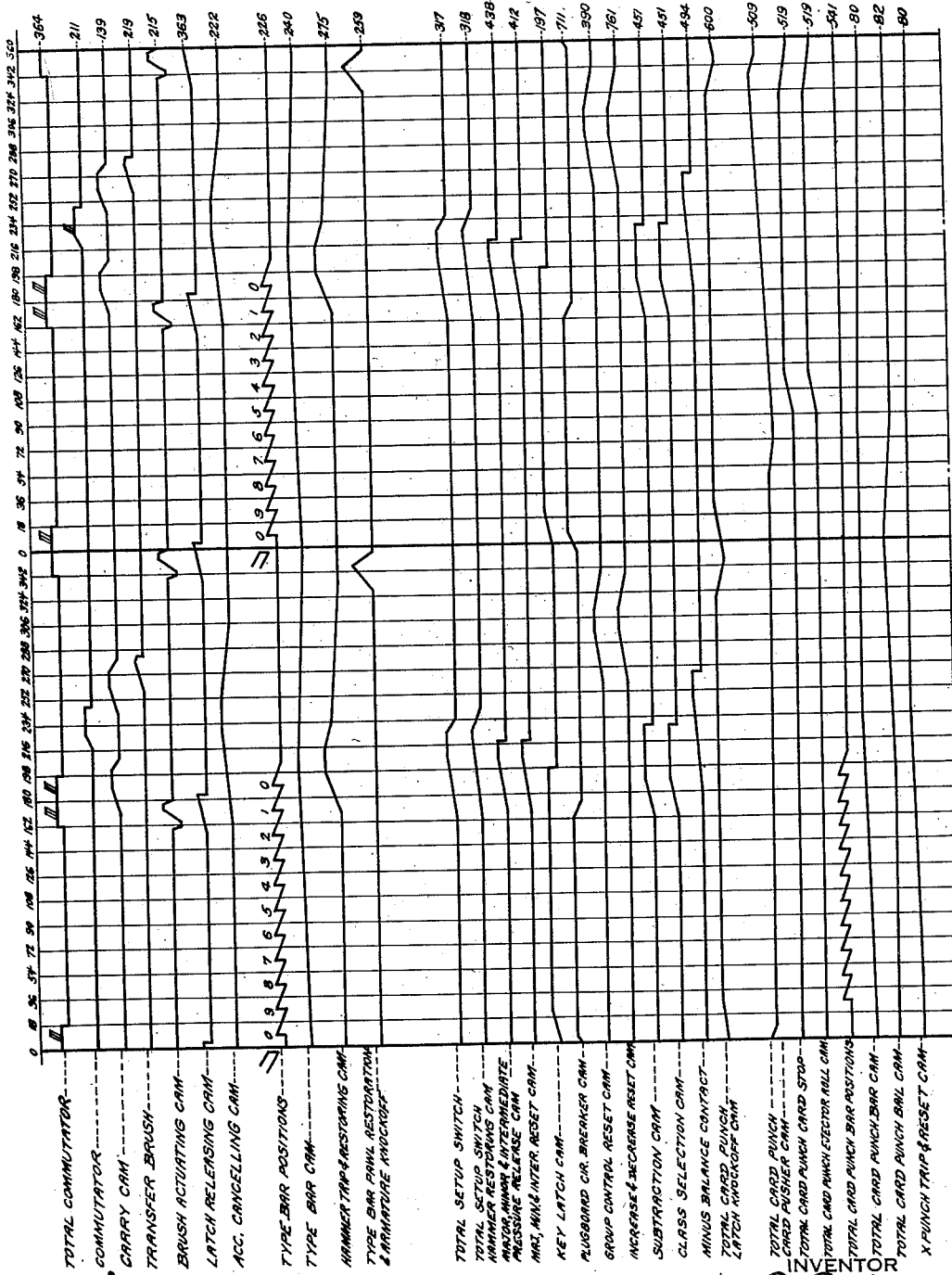

Fig. 36 is a timing chart showing the action of the cams in the machine.

The Hollerith form of perforated card is used to control the machine. The cards contain group classification and amount perforations. A reading of the amount and group number of each card is taken as they are fed successively through the machine. The amounts on the cards are accumulated until the machine is stopped, then a total key may be depressed to operate devices to print and perforate a record of the total accumulated in the accumulators. If automatic operation is desired, group control devices may be effective to automatically stop the machine and take totals when a change in group designation occurs as evidenced by the disagreement of a card under the lower brushes with a card under the upper brushes.

The main driving connections

The main frames 30, 31, 32 and 33 (Fig. 1) are mounted upon a base 34 (Figs. 1, 2, 3 and 22) supported by legs 35. Most of the driving shafts are suspended under the base and operate linkages reaching up to shafts supported in the main frames. A motor 36 attached to the underside of base 34 (Fig. 1) has belt and pulley connection 37 with a worm shaft 38. The worm 39 mounted thereon, drives worm wheel 40 fixed upon shaft 41 so that said shaft continues running as long as the motor receives current.

At the extremities of shaft 41 (Fig. 1) are clutch devices adapted upon actuation to form a driving connection at one end to the record card feeding device and at the other to the printing mechanism.

A gear 42 mounted upon constantly running shaft 41, through gears 43 and 44 (Fig. 2) drives shaft 45 which in turn through bevel gears 46 causes vertical shaft 47 to rotate. Upon this upright shaft are fixed several bevel gears 48 meshing with bevel gears 49 upon parallel shafts 50.

Thus, through this train of gearing, shafts 50 are in constant rotation, so that gears 51 (Fig. 13) mounted upon these shafts will in turn keep in constant rotation the actuating elements of the accumulating units with which they are related and which are more fully explained hereinafter.

The shaft 41 carries, adjacent to gear 42, a notched disk 957 (Figs. 1 and 2) adapted to be engaged by a dog 57 pivotally mounted at 958 upon an arm 959 integral with a gear 52. Gear 52 is carried by a stub shaft 53 (Fig. 2) in axial alinement with shaft 41 (Fig. 1) and, through idler gear 54, drives gear 55 mounted on cam shaft 56. An armature latch 58 (Fig. 2) normally holds dog 57 out of engagement with the driving disk in the position shown in Fig. 2. When the printing clutch magnet PRC is energized it draws armature latch 58 to the left as viewed in this figure, releasing dog 57 so that the printing mechanism cam shaft 56 is clutched to the driving shaft.

Upon deenergization of magnet PRC, armature 58 is moved by a spring into the path of a projecting toe on dog 57 to throw the dog out of engagement with the clutch disk 957. The arm 959 on gear 52 has a toe similar to the projection on dog 57, and by this toe the arm is also engaged by armature 58 to prevent further movement of gear 52 in a clockwise direction.

At the right end of shaft 53 (Fig. 1) is fixed a gear 59 in mesh with an idler 60 which meshes with a gear 61 secured to a shaft 62. Thus shaft 62 is rotated in a clockwise direction (Figs. 2 and 3) during the printing operation to be described more fully hereinafter.

In Fig. 1, shaft 41 is shown as carrying a second clutch driving disk 63 similar to disk 957 but cooperating with a dog 963 mounted upon an arm fixedly connected to a gear 64 (Fig. 2) which is adapted to drive the card reading ring gear 65 through idler gears 66 and 67. The engagement of these clutch elements is controlled by the card feed magnet CFC in a manner similar to that described above in connection with magnet PRC.

Adjacent to gear 44 and attached thereto, is a gear 68 (Fig. 1) in mesh with a gear 69 fastened to a shaft 70. The shaft is thereby adapted to be rotated in a counterclockwise direction (Figs. 2 and 3) for each operation of the card reading mechanism.

A third clutch mechanism is provided to couple a card punching mechanism to the driving shaft. At the right end of shaft 45 (Fig. 1) is fixed a gear 71 meshing with a large gear 72 fulcrumed in a bearing bracket 78. The gear ratio is 2 to 1, so that the total or balance punching devices operate one half as fast as the regular tabulating devices; or in other words, two ordinary operating cycles are required for one card punching operation. To the gear 72 is attached an arm 73 carrying a clutch pawl 74 (Fig. 22) which is adapted to engage a notched disc 75 on a stub shaft 76 suspended between frame plates 77. The pawl is normally held out of engagement with the disc, by an armature latch arm 79 associated with the punch clutch magnet PUC. When the magnet PUC is energized, the armature arm 79 is attracted and moved to the right (Fig. 22) releasing the pawl 74 and arm 73. The shaft is then rotated through a complete cycle during which the magnet PUC is deenergized, and at the end of which the pawl and arm are stopped in normal position by latch 79.

The shaft 76 carries two sets of complementary cams 80 and 81 (Fig. 1) described more fully hereinafter, and a gear 82 for operating a total card feeding device. The gear 82 (Fig. 20) meshes with an idler gear 83 in mesh with a gear 84 secured to the shaft 85 carrying the total card stacking drum 86 (Fig. 22). The gear connections continue from gear 84 (Fig. 20) through an idler gear 87 to drive a gear 88 attached to gear 89 which is in mesh with two pinions 90 and 91 mounted on the ends of the total card feeding rollers. A third pinion 92 is driven by an idler gear 93 in mesh with gear 90.

The record card reading devices

The card reading devices described hereinafter are disclosed in application Serial No. 442,348, filed April 7, 1930, issued as Patent 2,042,324.

Figure 18:
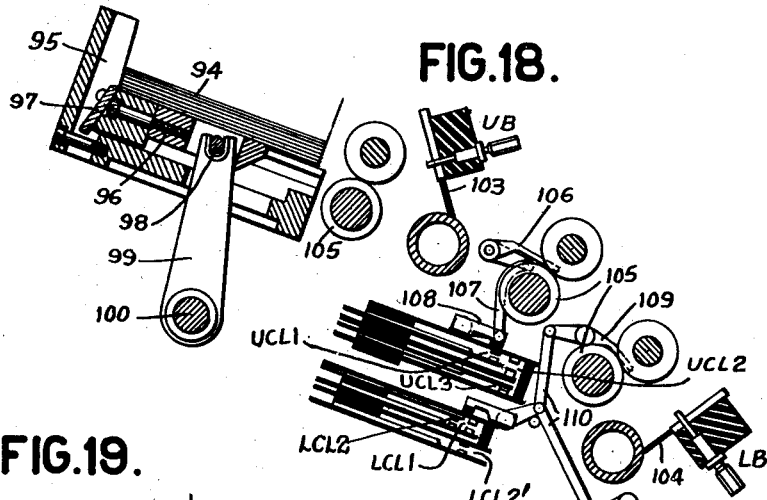
Fig. 18 is a sectional elevation view taken through the record card feeding means.

Referring now to Fig. 18, it is noted that the record cards 94 are fed singly from the supply magazine 95 by the usual card picker mechanism comprising in the present embodiment a slidably mounted reciprocal plate 96 carrying a picker knife 97 for cooperation with the record cards. The plate 96 has a pin and slot connection 98 with an arm 99 secured to a shaft 100 which carries at its end an arm 101 (Fig. 1) connected by a link 102 to a stud mounted eccentrically on the gear 66 (Figs. 1 and 2) meshing with ring gear 65. Each reciprocation of plate 96 and picker knife 97 causes a card to be fed from the magazine to the analyzing mechanism, wherein the card is presented to two sets of analyzing brushes, upper brushes 103 and lower brushes 104, which sense the perforations thereon.

The feeding of the record cards is effected by concentrically arranged pairs of rollers 105 having driving pinion connections to ring gear 65 (Fig. 2). The cards pass from the last pair of rollers 105 to any suitable stacker mechanism such as that shown in Fig. 22 where the cards are fed to a discharge stack in the same order they were placed in the magazine.

The usual card levers may be positioned at the card stations to control various functions of the machine as will be described in connection with the wiring diagram. After a record card passes the analyzing brushes 103 (Fig. 18) it contacts a lever 106 and through arm and links 107 rocks a contact operating lever 108 to close pairs of contacts UCL1 and UCL2 and to open contacts UCL3.

Lever 106 is adapted to return to its normal position after a card has passed and before the succeeding card arrives at the lever. Before the record card reaches the lower brushes 104 it contacts a lever 109 having link connections 110 to a lever 111 which is depressed by the card after it has passed the analyzing brushes 104. The positioning of levers 109 and 111 is such that while cards are feeding through the device the links 110 will remain in operative position to maintain contacts LCL—1, LCL—2' and LCL—2 in closed position. This is accomplished by spacing levers 109 and 111 further apart than the distance between successive cards. Thus the leading edge of a card depresses lever 109 before the rear edge of the previously fed card passes beyond lever 111.

The record card

Figure 19:
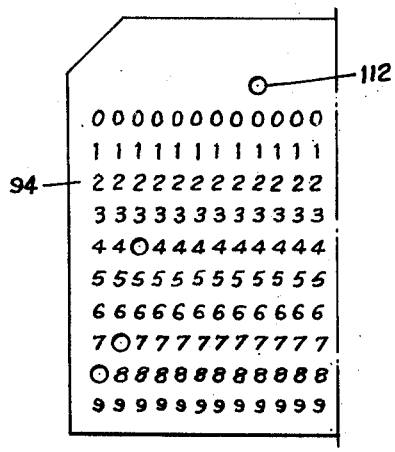
Fig. 19 is a view showing a portion of the record card used to control the machine.

Referring to the portion of the record card 94 shown in Fig. 19, a plurality of columns of index point positions, ranging from 0 to 9, are shown. The amount which is to be added or subtracted is entered by perforations in successive columns. Thus the number 874 is entered by punching the card in the 8 position in the first column and in the 7 position in the second column and in the 4 position in the third column. The amount is punched in this manner whether it is to indicate a credit item or a debit item. If the card contains a credit item, a control perforation 112 is made in the upper portion of the card to control the machine to effect reverse operation of adding and subtracting in the two accumulators provided in the machine. In the absence of such a perforation the machine will effect adding of a true number in a debit accumulator and adding of the complement of the true number in a credit accumulator. In Fig. 19, the perforation 112 is shown above the ninth column of data on the card. In actual practice this perforation may be presented above any of the columns and the machine may be plugged accordingly for subtraction control.

The card is fed past the analyzing brushes 103 and 104 (Fig. 18) with the nine index point passing under the brushes first, followed by the eight, then the seven, etc. in a manner which is well known in this art.

The upper row of brushes 103 is used merely for controlling, while impulses through the lower brushes 104 effect the adding and subtracting of the data contained on the card. When the data on the card are to be added in one of the accumulators and a perforation appears in the first column in the eight position (as in Fig. 19) then when the perforation passes under the brush 104, the accumulator wheel is set to commence adding one unit as each of the succeeding points on the card passes under the brush 104. When the zero position is passing under the brush, the machine automatically disconnects the accumulator wheel so that it stops turning. It will thus have turned eight points to accumulate the value 8. In the second column the brush 104 will contact with the perforation in the seven position and throw in its respective accumulator wheel to commence adding at this point, and 7 will have been added when the accumulator wheel is demeshed. In the third column the accumulator will be thrown in when the brush senses the perforation in the four position and 4 will be added. During the entry of a credit item, the adding operation described takes place in the credit accumulator. At the same time that this is occurring, by means of the subtracting connections between the credit accumulator and the debit accumulator, the debit accumulator is controlled so as to receive the complement of the number added in the credit accumulator.

In order that the debit accumulator may receive the complemental amount its accumulator actuating pinions are thrown in mesh so as to commence adding in all orders except the units order, when the nine position on the card passes under the brushes 104. The units order pinion is thrown in mesh one step before the other pinions. When a perforation is sensed by the brushes 104 in any particular column, the accumulator pinion in the debit accumulator, through the connections to the related pinion in the credit accumulator, is disengaged so as to stop the accumulator. Thus, with the card of Fig. 19, the debit accumulator pinion of the first column will commence accumulating as the nine position passes the associated brush 104. Then, when the eight position passes the brush, the perforation in this position will be sensed and the energization of an electromagnet will cause the credit accumulator pinion to be engaged and it in turn will act to disengage the related pinion in the debit accumulator so that it will stop turning and accumulating. The pinion in the debit accumulator will thus have turned one point to accumulate the value one which is the complement of the numeral 8 which is accumulated in the credit accumulator pinion of the same order.

In the second column, the pinion commences to rotate when the nine position passes the brush and is thrown out of mesh when the seven position passes the brush after the value 2 has been added to the debit wheel, this being the complement of the value 7 added to the credit wheel. In the third column or the units order of the number being considered, the associated debit wheel is thrown in mesh at the tens position and will be thrown out when the four position reaches the brush, and the pinion will have added 6 which is the tens complement of 4.

Should the card contain a credit item, it would be perforated with the perforation 112 as is the card shown in Fig. 19. When the perforation 112 is present it is sensed by the brush 103 in the upper row of sensing brushes and the subtraction control devices are actuated and serve to reverse the order in which the amount is added in the two accumulators. The amount is then added as a true number in the credit accumulator and the complement of the amount is added in the debit accumulator. The devices for performing this function of reversing the order of numeral reception by the two accumulators are described hereinafter.

*The accumulator driving mechanism*

Figure 3:
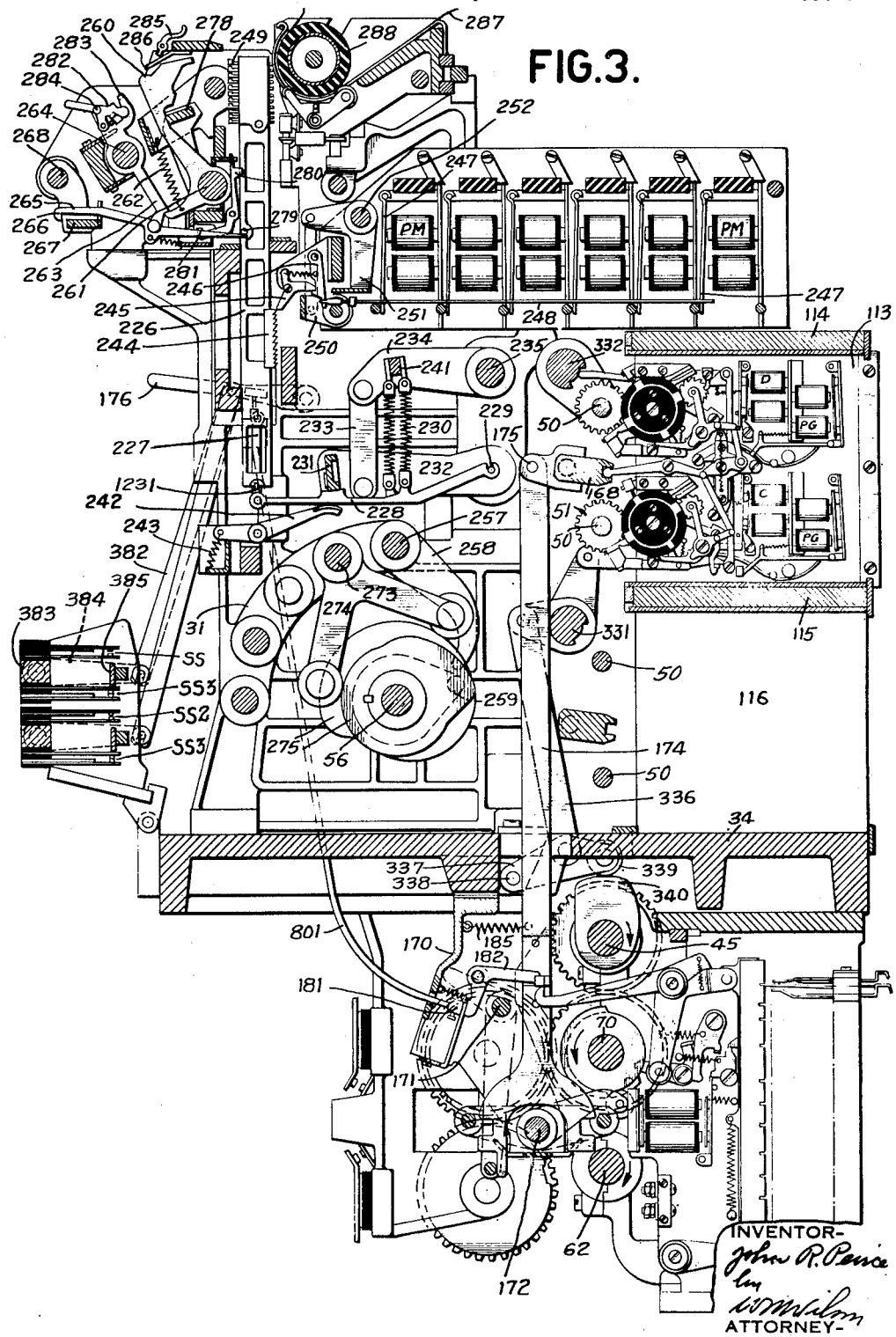
Fig. 3 is a sectional elevation view taken through the center of the machine showing the accumulator and printer control devices.

In Figs. 3 and 13 is shown the manner of mounting two associated debit and credit accumulators on a plate 113. This plate may be held in the machine by sliding it between supporting frame members 114 and 115 (Fig. 3). A number of these units may be mounted in the machine side by side. Other of such units may be mounted in a space 116 provided below the portion of the machine occupied by the units as shown in Fig. 3.

As shown in Figs. 13 and 13a each accumulator has a gear 117 rotatably mounted on a stud 118 fixed in the plate 113. This gear is in constant mesh with the gear 51 mounted on the shaft 50 on which is also mounted the bevel gear 49 (Fig. 2) meshing with a bevel gear 48 on the vertical shaft 47. As explained hereinbefore, the shaft 47 is constantly rotating while the machine is in operation, so that shaft 50 is turning constantly. Through the described driving connections the gear 117 in each accumulator order is adapted to rotate constantly.

*The credit and debit accumulators*

The subtracting mechanism described hereinafter is disclosed in application Serial No. 520,506, filed March 6, 1931, issued as Patent 1,909,549.

As both of the accumulators shown in Fig. 13 are similar in construction a description of one applies also to the other.

The gear 117 in each accumulator is secured to a gear 119 (Figs. 13 and 13a) adapted to mesh with a gear 120 fixed on a sleeve 121 loose on a shaft 122 mounted in arms 123, 124 that are part of a bail or frame which is loose on the screw headed stud 125. The gear 120 is normally disengaged from the gear 119. The teeth of the gears 119 and 120 are so pitched that the gear 120 may be moved into or out of mesh with the gear 119 while the latter is in motion. Also fixed on the sleeve 121 with gear 120 is a gear 126. This gear 126 is in constant mesh with an accumulating gear 127 (Fig. 13a) loose on stud 118. The teeth of the gear 126 are longer than those of gear 120 so that the gear 126 may be moved toward and away from the gear 127 when the gear 120 is moved into and out of mesh with gear 119 without causing disengagement of gears 126 and 127.

A spring 128 attached to post 129 and guided by post 130 in the plate 113, ends in a slot cut 132 in an arm 131 forming part of the bail 123, 124, as indicated in Fig. 13. An arm 133 engaging the spring 128 with a fulcrum block 134, tensions the spring to cause the frame 123, 124 to turn counterclockwise on the stud 125. An extension 135 of the arm 123 is normally latched by a latching member 136 fixed to the armature 137 of the credit accumulator magnet C, the armature being held in such position by a spring 138. The armature of the debit accumulator magnet D latches an associated bail 123, 124 in a similar manner. When the magnet is energized, attracting its armature, the latch 136 releases the arm 135 and then the spring 128 rocks the gear 120 into mesh with the gear 119. As explained before, the two accumulators are selectively engaged according to whether the item is a credit or a debit entry. The upper accumulator (Figs. 13 and 14) is adapted to receive the true amounts of debit items and the complements of credit items, while the lower or credit accumulator receives the true amounts representing credit items, and the complements of debit items. The energization of a credit accumulator magnet C during credit item entering or the energization of a debit accumulator magnet D during debit item entering, is effected by the sensing of a perforation in one of the data columns of the record card 94 (Fig. 19) by the respective sensing brush 104 (Fig. 18). The gear 120 (Fig. 13) is then thrown into mesh with the gear 119 while the latter is rotating. The gears 120, 126, 127 are thus caused to rotate until the zero position on the card reaches the brush 104 at which time the clutch gear 120 is thrown out of mesh by a cam 139 (Figs. 13 and 13a). This cam is fixed with respect to gears 117 and 119 and therefore is constantly rotating with them. As shown in Fig. 13 there are two projections 140 and two projections 141 on the cam 139.

The cam is timed to turn counterclockwise a half revolution for each accumulating cycle. After the gear 120 is thrown into mesh with gear 119 the gear connections continue to rotate gear 127 until the zero position is reached, then the projection 140 reaches an arm 142 fixed to arm 123, and cams the arm 142 to the right (Fig. 13) rocking the frame 123, 124 about the pivot 125 to move the gear 120 out of mesh with gear 119 so that gear 126 and accumulator gear 127 will cease rotating. The pinion frame 123, 124 will then be latched in this position by the armature latch 136. An impositive latch 143 will prevent overthrow of the gear 126. Gear 127 also has an impositive latch 144.

The above description deals mainly with the addition of an amount in an accumulator. If it is desired to subtract an amount from an accumulator, the complement of the amount is added to the accumulator. This is done at the same time the amount is being added to the other accumulator. In adding the complement, the proper set of accumulator magnets are energized automatically at the nine index point in the cycle (the units order at the ten index point) to mesh gears 120 with gears 119 and start the wheels rotating. Other means, however, must be provided to pull the subtracting gears out of mesh at the proper time when the related adding gears of the other accumulator are going into mesh with the driving gears. The connections between the gear holding bail frame provided to secure the desired relationship between the meshing of one accumulator and the demeshing of the other accumulator will now be described.

The arm 124 (Fig. 13) of each gear frame 123, 124 is substantially at right angles to another arm 145 on the frame, a pin 146 being fixed on the end of each arm 145. The pin 146 in the arm 145 on the debit accumulator gear frame, protrudes into a slot cut in a link 147.

A thin oblong spring clip 148 riveted to arm 145, holds the link 147 on the stud 146. The clip is provided for an easy assembly of the parts. It normally holds the link against the end of arm 145, but may be sprung sidewise for the removal of the link off the pin 146. The lower accumulator gear frame has a pin 146 which fits in a slot in another link 149. Both links 147 and 149 are pivotally connected to the opposite ends of a lever or oscillating member 150 centrally pivoted at 151. A pin 152 mounted on one arm of lever 150 is located between two oppositely facing projections 153, 154 extending from a pair of slides 155 and 156 (see Fig. 13b). In each slide are cut three guide slots through which project locating studs 157, 158 and 151 in an assembly plate 159. The plate is secured to frame 113 by three screws. The slides are urged in opposite directions by a common spring 160 attached at 161 to the lower slide 156 and at 162 to the upper slide 155.

Figure 14:
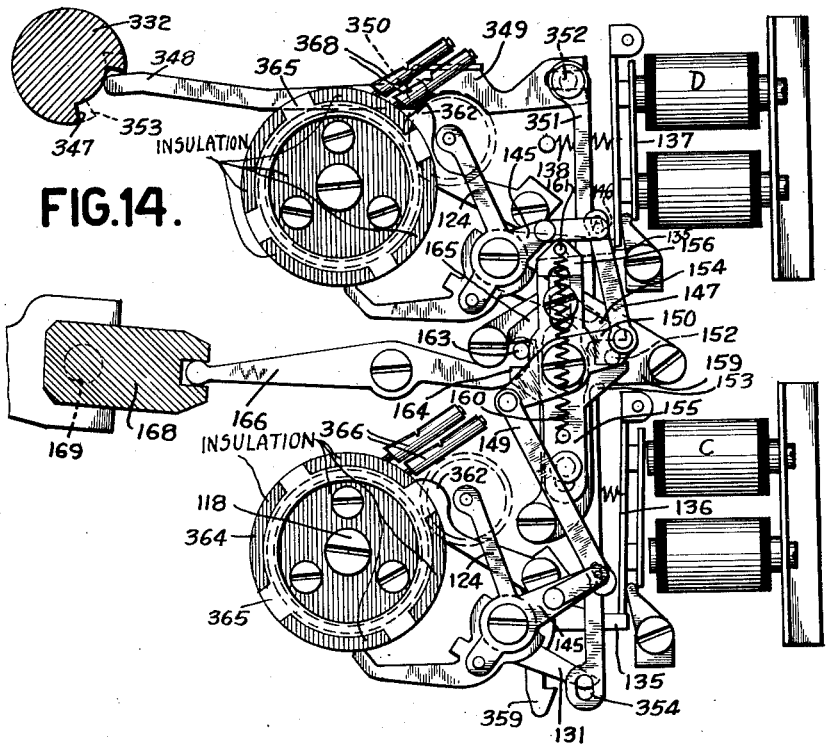
Fig. 14 is a side elevation view of the accumulators showing the tensioning mechanism for conditioning the devices for addition and subtraction.

The projection 153 extends from the upper slide 155 and contacts the lower edge of stud 152 to urge the arm 150 in a counterclockwise direction. The other projection 154 on slide 156 urges arm 150 in a clockwise direction. The slides are normally held in the position shown in Fig. 13 by a stud 163 projecting between an extension 164 on slide 155 and an extension 165 on slide 156. Stud 163 is mounted in the end of one arm of a lever 166 pivoted at 167. The opposite arm of the lever 166 has an articulated connection to a subtraction setting lever 168 pivoted at 169. The lever 168 has three positions to which it is adjusted to govern adding and subtracting operations. In Fig. 13 it is shown in the normal or neutral position. In Fig. 14 it is shown in the debit item entering position for effecting subtraction in the lower credit accumulator. To effect subtraction in the upper debit accumulator during credit item entering, the lever 168 is rocked counterclockwise to a position (not shown) wherein the lever 166 depresses the pin 163 below the position it occupies in Fig. 13.

With lever 168 in the normal or neutral position shown in Fig. 13, the linkage consisting of lever 166, pin 163, slides 155, 156, pin 152, and lever 150, serves to hold links 147 and 149 in the position shown. There it is noted that studs 146 on upper and lower gear frames 123, 124 are free to move upward in the slots in links 147 and 149, therefore pinion frames 123, 124 are free to move the gears 120 in and out of mesh with gears 119 to perform adding operations or take totals in the usual way.

When the machine is set for subtraction and a debit item is to be entered in the accumulators, the lever 168 is positioned as shown in Fig. 14. Then lever 166 is rocked and pin 163 is lifted carrying with it slide 156. Spring 160, because of its connection to stud 161 on the lifted slide 156, will be tensioned and will urge slide 155 to move upward. The extension 153 on slide 155 abuts against the under side of pin 152 and tends to rock lever 150 in a counterclockwise direction. However, as long as arm 135 on the upper gear frame 123 is held by stop arm 136, pin 146 will contact the lower end of the slot in link 147 and prevent the lifting of the link and counterclockwise rocking of the attached lever 150. Before the debit accumulator gear frame 123 is released, the credit accumulator magnet is energized at the nine position to release the lower gear frame 123 and throw gear 120 into mesh so that the lower accumulator may start adding the complement. Then the two gear frames remain in the position above noted until a perforation on the record card reaches the related brush 104. Then magnet D is energized, upper gear frame 123, 124 is released and swings the gear 120 into mesh, pin 146 moves upward releasing the linkages 147, 150 and 149. Lever 150 is moved counterclockwise by spring 160 acting on stud 152 through slide 155.

Link 149 is lowered and by pushing on stud 146, it rocks frame 123, 124, and throws the credit accumulator gear 120 out of mesh with its driver 119. The arm 135 is latched by lever 136 holding gear 120 out of mesh. The gear 120 in the debit accumulator continues to rotate until the frame 123 is rocked by cam 140, and arm 135 is latched by arm 136. At the end of the accumulating operation the two gear clutching frames are latched ready for the next item entry. From the above description it is clear that during debit item entering, the credit accumulator wheel is driven until the perforation on the card reaches the related sensing brush 104. Then, at the time of the meshing of the debit accumulator wheel, the credit wheel is stopped while the debit wheel is driven. Thus, the complement of a number is added on the credit accumulator and the true number is added on the debit accumulator during a single cycle of operation; the credit accumulation being made before the differential impulse is initiated by the card and the debit accumulation being made after the impulse is initiated.

When the machine is set for subtraction and a credit item is to be entered in the accumulators, the lever 168 (Fig. 13) is rocked upwardly placing lever 166 in a position wherein stud 163 is lowered, pushing slide 155 before it and tensioning spring 160. The slide 156 tends to follow the movement of slide 155 under the urging of spring 160, but is held in position by the stud 152 on lever 150 contacting the under side of the projection 154 on slide 156. The tendency is to rock lever 150 in a clockwise direction but the lever is held from movement in that direction by the end of the slot in link 149 contacting the pin 146. This pin 146 is mounted on the frame 123, 124 of the credit accumulator; and since the frame is latched by lever 136 it cannot be rocked until magnet C is energized by a sensing brush 104 making a contact through the record card.

Early in the credit item entering operation, the upper debit accumulator wheels are meshed with the drivers, the gear frame 123, 124 being free to move because of the slot in link 147. During the record card reading operation, when a perforation in the card reaches a sensing brush 104, magnet C is energized, the lower gear frame 123, 124 is rocked to engage credit gear 120 with gear 119, link 149 is released, lever 150 is then free to be rocked clockwise by spring 160, and link 147 is lowered pulling the upper gear clutch out of mesh, arm 135 latching under armature 136. After the card reading cycle the credit accumulator gear frame 123, 124 is rocked out of effective position by cam 140 striking arm 142. Both accumulator gear clutching frames are latched after accumulation ready for the next operation. It is obvious that during credit item entering the debit accumulator wheel is driven until the amount perforation on the record card reaches a related sensing brush 104. The resulting impulse serves not only to mesh the credit accumulator wheel, but also to demesh the debit accumulator wheel. The complement of the number registered is thus added on the debit accumulator during the same operation that the true number is added on the credit accumulator.

Fig. 27 shows an example of the operations performed by the machine in accumulating credit and debit entries. The first item, a credit amount of 16, is added in credit accumulator C at its face value, and the complement of 16, namely, 9984 is added in debit accumulator D. The second item, a debit amount of 17, is added as a true number in accumulator D and as a complement in accumulator C. After adding a series of credit and debit amounts the balance may be found on one accumulator or the other as a true number representing a positive or negative balance.

In the example given in Fig. 27 it is seen that upon taking a total of the first four items a negative balance of 54 is found on the debit accumulator and the complement of 54 is registered on the credit accumulator. A reading of the accumulator wheels after registering the first eight items given in Fig. 27 shows a positive or credit balance of 165 registered on the credit accumulator wheels, and the complement of the balance 9835 registered on the debit wheels.

Subtraction control devices

The positioning of lever 168 (Fig. 13) at various angles to selectively effect subtraction in either accumulator is referred to in the foregoing section of the description. The means for positioning the lever will now be described.

Referring to Fig. 3 it is noted that a subtraction control supporting frame 170 is secured to the bottom of the base 34. The frame acts as a support for shafts 171 and 172 upon which are mounted the subtraction shifting control devices. At the lower end of the frame 170, Fig. 4, there is secured a guide plate 173, the upwardly extending flanges of which are slotted to guide the swinging and lifting motion of a bifurcated lever or link 174 pivoted at 175, Figs. 3 and 13, to the left arm of lever 168. Link 174 is adapted to assume three positions in an arc, swinging about pivot 175 as a fulcrum. The left hand position of the bifurcated link is assumed for the debit entry subtraction selection position. The central position is a neutral position in which position the link remains during adding operations without complemental entries being made in either accumulator. The right hand position of the link 174 is assumed when operation of the accumulators for a credit item entry is desired during subtraction.

The link also partakes of movement in a vertical direction. It normally stands in a central vertical position when the lever 168 is positioned as shown in Fig. 13. The lever is raised to position the lever 168 as shown in Fig. 14 for the entry of a debit item during subtraction. For subtraction control during the entry of a credit item, the link 174 is lowered to swing the arm 168 in a counterclockwise direction. A pair of links such as link 174 are provided in the machine for the control of two duplex accumulator units. However, since they are similar in construction, a description of one applies to the other. The link 174 may be held in the neutral position under control of a manually operated lever 176, Figs. 2 and 3, which the operator of the machine may raise to select adding control or lower to effect subtraction control. The lever 176, Fig. 2, is pivoted at 177 and provided with an extension 178 abutting the end of a flexible wire 179 forming the part of a Bowden wire cable assembly 801 secured at one end on block 180 and at the other end to block 181, Figs. 3 and 4, secured to the subtraction frame 170. The lower end of wire 179 strikes one arm of a bell crank 182, Fig. 4, pivoted at 183. The horizontal arm of the bell crank is cut in the form of a latch having a shoulder cooperating with a projection 184 on link 174. As the parts are shown in Fig. 4 the machine is conditioned for an adding operation.

When the lever 176 is lowered, a connected link 382, Fig. 3, rocks an arm 384 pivoted at 383. The shaft 383 carries a series of contacts SS, SS2 and SS3 the ends of which cooperate with a fixed stop 385. When in adding position, the lower contacts SS3 are closed, and the upper contacts SS and SS2 are opened. Operation of lever 176 reverses the position of the contacts.

If subtraction control is desired, the operator of the machine depresses the lever 176 and rocks the bell crank 182 in a counterclockwise direction releasing the link 174 which then is urged to the left under the tension of spring 185, placing the notch 186 in the end of link 174 in cooperation with a short shaft 187 mounted between arms of a bail 188 fastened to shaft 172. The bail 188 is operated under control of a cam 189 secured to the operating shaft 70, Fig. 4, which shaft is rotated during record card reading operations as explained hereinbefore. Cooperating with the cam 189 is a roller on an arm 190 secured to the shaft 172 carrying the bail 188. By means of the cam, the bail 188 is rocked in a clockwise direction during each card reading operation of the machine. The two shafts 187 and 191 mounted on opposite sides of the bail 188 are adapted to impart upward and downward motions to the link 174.

Figure 4:
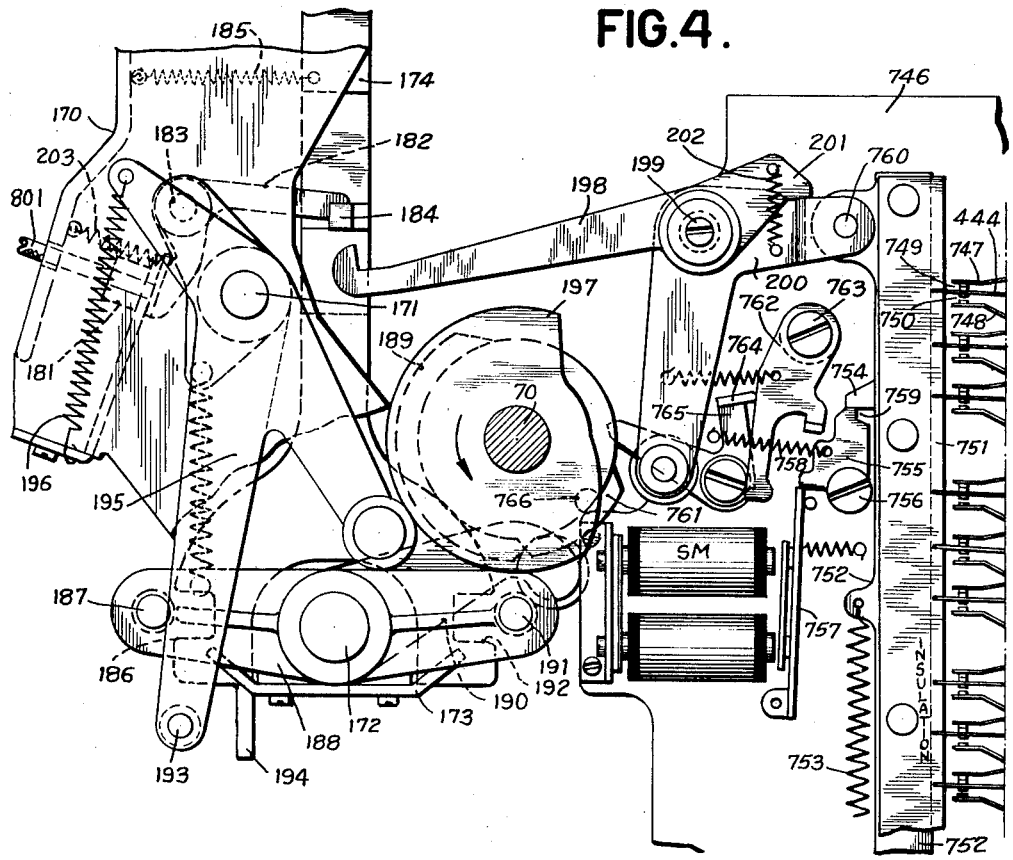
Fig. 4 is a side elevation view of the accumulator control mechanism for conditioning the accumulator for addition or subtraction.

A shifting bail is provided for carrying the link 174, Fig. 4, to the right to engage the notch 192 with the shaft 191 for credit item entry control during subtraction. This bail carries a shaft 193 cooperating with an extension 194 depending from the link 174. The bail comprises the pair of levers 195 secured to the shaft 171 and urged by the spring 196 in a counterclockwise direction with a roller on an extending arm of the lever 195 cooperating with a cam 197 mounted on shaft 70. The bail 195 is normally positioned to the left out of cooperation with the lower end of link 174, thus allowing it to engage shaft 187. During the operation of the machine, cam 197 presents a depression to the roll on bail 195, permitting the bail to rock to the right carrying with it the link 174 and placing the notch 192 on the link in cooperation with the shaft 191. This cooperation is maintained momentarily, not long enough to adapt the link 174 to partake of movement under control of shaft 191 on bail 188.

Such movement results only when the link 174 is latched in the right hand position by latch 198 engaging the projection 184. The latch is operated under control of the subtraction magnet SM. The latch 198 is pivoted at 199 alongside of a bell crank 200 which is rocked in a clockwise direction at the proper time when the subtraction control magnet SM is energized. The arm 201 on latch 198 overlies the upper edge of the horizontal arm on bell crank 200 and is held in cooperation therewith by a spring 202 secured to studs on arm 201 and bell crank 200.

From the above description it is apparent that bifurcated link 174 is normally allowed to swing to the left to engage shaft 187 on bail 188, which rocks in a clockwise direction to lift the link and operate the lever 168 to condition the subtraction control devices to select a debit accumulator for the entry of the true number and the credit accumulator for the entry of the complement of the true number. It is also noted that on each operation of the machine the link 174 is positioned to right by bail 195 to adapt it for operation in connection with a credit item entry. Should such a credit item be presented to the machine at the time, a control perforation 112, Fig. 19, through electric connections which will be described more fully hereinafter, controls the energization of subtraction magnet SM and operates latch 198 to hold link 174 in the right hand position, thereby engaging notch 192 with shaft 191. When magnet SM is energized, its armature 757 (Fig. 4) is rocked counterclockwise to release the latch 755 which then also rocks counterclockwise under the influence of spring 758. Thus, the support under the extention 754 on contact bar 752 is removed, and the bar is moved down by spring 753, and the bell crank 200 pivotally connected to the bar at 760 is rocked in a clockwise direction. Since the latch 198 is yieldingly connected to bell crank 200 by overlying arm 201 and spring 202, it follows along therewith in a clockwise direction to lift the latch hook into cooperation with stud 184 to hold 174 to the right and operatively connected to shaft 191. Then, when bail 188 is given the usual clockwise rocking movement, the link 174 is lowered, operating lever 168 to tension the subtraction devices, Fig. 13 to condition the credit accumulator to receive a credit amount as a true number, while the debit accumulator is conditioned to receive the complement of the credit amount.

*Accumulator carrying devices*

For effecting carrying or transferring from one order to the next higher order in an accumulator, a brush 207 (Figs. 13, 16 and 17) fixed to a lever 208 pivoted at 209 is adapted to cooperate with either of two projections 210 on a contact disk 211 mounted on stud 118 and fixed to constantly rotating gears 117 and 119. Another brush 212 on lever 208 is positioned to cooperate with other projections 213 in a plane adjacent to the position of projections 210 on the disk. When an accumulator wheel 127 (Figs. 13 and 13a) of a given order passes from the nine position to the zero position, a projection 214 (see Figs. 16 and 17) on a disk 215 fixed with respect to the gear 127 will engage a projection 216 on the lever 208 and rock the lever into the position of Fig. 17. The latching pawl 217 will then cooperate with a projection 218 (see Fig. 17) on the lever 208 and latch the lever in this position so that the brush 207 will be in position to make contact with the segmental projection 210 when the latter, which is constantly moving, passes the brush.

This contacting of brush 207 with projection 210 will take place soon after the projection 140 (Fig. 13) associated with the accumulator wheel of the next higher order, has engaged the arm 142 and cammed the gear 120 out of mesh with gear 119. The contacting of brush 207 with projection 210 will supply current through disk 211, to the contact brush 219 (Fig. 13) touching disk 211 during the transferring, and then to the magnet C or D of the adding unit of the next higher order. Gear 120 of said higher order will reengage, and turn gear 127 one more step and then be cammed out by cam point 141. If the value registered on the wheel of any accumulator unit happens to be nine when one is added to that order causing the adding wheel to pass from the nine position to the zero position, it will be necessary to continue the carrying on to the accumulator unit of the next higher order.

Figure 16:
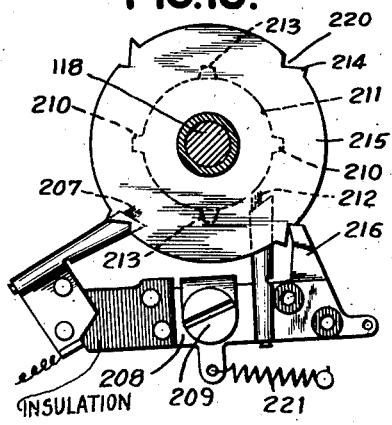
Fig. 16 is a detail view of the carrying device associated with one of the accumulator wheels shown in the nine position.

In order that this may be effected, when the wheel 127 of any order stands in the nine position, the disk 215 presents a depression 220 to the arm 216 as in Fig. 16, permitting the lever 208 to be rocked counterclockwise by its spring 221 (Fig. 13) into the position of Fig. 16, rocking the brush 212 also carried by the lever 208 into position to be engaged by one of the projections 213 also on the disk 211.

The brushes 207 and 212 are insulated from each other, and current is supplied to them through separate wires, but both brushes are adapted to carry current to the disk 211, and through the contact brush 219 to the accumulator magnet C or D of the next higher order. The projection 213 engages the brush 212 at the same time that the projection 210 is adapted to engage its brush 207. Thus if the accumulator wheel of a given order passes to zero position and supplies current to the brush of the accumulator unit of the next higher order, if the latter unit contains the value nine it, besides being caused to accumulate an additional one by reason of the position of the brush 207 in the unit of the next lower order, will supply current through the brush 212 to the adding device of the next higher order to carry one thereto.

Figure 17:
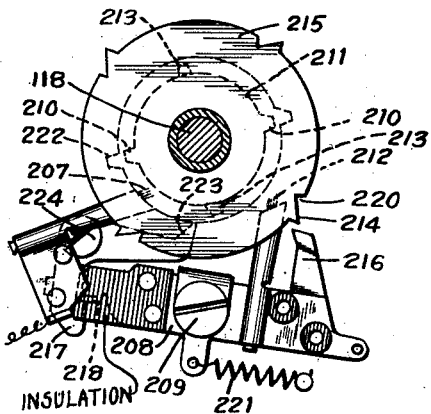
Fig. 17 is a detail view of a carry device associated with one of the accumulator wheels in the zero position.

After the brush lever 208 is rocked to the position of Fig. 17 and latched by the pawl 217 and after the projection 210 passes the brush 207, the lever 208 is released by a cam 222 (Figs. 13, 13a and 17) which is secured to the constantly rotating gear 119. The cam engages the inner projection 223 of the latching pawl arm which is pivoted at 224, rocking the pawl against the action of its spring 225, (Fig. 13) and releasing the lever 208 to permit its spring 221 to rock it counterclockwise until the projection 216 engages the periphery of the disk 215. The lever 208 will then be in such a position that neither brush 207 nor brush 212 make contact with the disk 211.

The energization of the units order magnet at the ten index point in the adding cycle rather than the nine index point during complemental addition is mentioned before in this specification. The extra unit thus gained fills out the complement to the true tens complement of the number being subtracted. If the number represented on a record card contains a zero in the units column, the rotation of the units order wheel through ten steps of movement causes actuation of the carrying mechanism to induce a carry into the higher order wheel, thus automatically carrying the extra unit to the higher orders to fill out the complement.

*The printing mechanism*

The printing devices described hereinafter are set forth in application Serial No. 442,348, filed April 7, 1930, issued as Patent No. 2,042,324.

The type bars are raised by the action of the machine, their upward travel being arrested at various points as a result of an electric impulse actuating a latching device as will be described.

Referring now to Fig. 3 the type bars are shown at 226. Each bar is supported at its lower end, through a link 227, by an arm 228 slotted at the right end to engage a rod 229. A spring 230 attached near the mid-point of arm 228 urges said arm against rod 229 on one side of the spring connection and against a restoring member 231 on the other side. The member normally holds the type bars in a depressed position.

To the end that the type bars may be readily disconnected from their actuating arms, the link 227 is detachably mounted on type bar 226. Near its upper end link 227 is provided with an opening which engages a stud riveted to bar 226.

An outwardly bent and upwardly extending prong 1231 on link 227 engages the reduced lower end of type bar 226 to prevent lateral movement of the parts when in operation.

The restoring bar 231 is carried at each end by an arm 232 having an axis in line with the center of rod 229. Through links 233 these arms 232 are connected to arms 234 fixed to shaft 235 (see also Fig. 2) which has secured at one end an arm 236. A double-armed lever 237 pivoted at 238 is connected to arm 236 by a link 239 and has cam follower rollers cooperating with complementary cams 240 mounted on shaft 56. For each revolution of shaft 56, restoring member 231 is oscillated once, causing the type bars to move upward in synchronism with the movement of the record cards past the sensing brushes. Springs 230 are connected between arms 228 and a bar 241 carried between arms 234, so that as this bar is rocked the type bars follow through the action of the springs. If the type bar 226 is stopped at an intermediate position while the restoring bar 231 continues to rise, the spring 230 will, of course, stretch. The restoration of type bar 226 from any position is accomplished by engagement of arm 228 by bar 231, at which time the shock of impact is taken by spring 230, the slotted end of arm 228 moving away from rod 229 toward a resilient cushion lever 242.

In Fig. 3 the lever 242 is shown contacting the under edge of arm 228 when the latter is in its depressed position, thereby stretching spring 243 which thus helps to overcome the inertia of the descending type bar and assists in starting the bar on its upward stroke until arm 228 passes out of contact with lever 242.

Fixed to each type bar 226 is a toothed member 244 adapted to cooperate with a bell crank stop 245 held in normal position by a latch 246. A spring holds the parts in restored relationship. Each printing magnet PM is adapted, through the associated armature 247, to actuate one of the call wires 248 and latch 246 to release a related stop 245 permitting it to engage member 244.

It may be noted that while a given index point position of the record card being analyzed is passing under the sensing brushes already described, the corresponding type element 249 is at the printing line. The closure of an electric circuit (to be traced hereinafter) through a hole in the card at this point will cause energization of magnet PM to stop the type bar in position to print the proper character. In the absence of any perforations in a card column the type bar associated therewith will rise until it contacts with a stop bar in which position the lowermost type element 249 is presented at the printing line. This element is adapted when actuated to print the character "0".

A positive restoration of stops 245 and latches 246 is obtained by bails 250 and 251. As shown in Fig. 3, bail 250 is link-connected to an arm secured to shaft 252 to which shaft bail 251 is also secured. In Fig. 2 it is seen that shaft 252 carries an arm 253 urged in a counter-clockwise direction by a spring 254. Link 255 and arm 256 connect arm 253 to a short shaft 257 upon which is mounted a lever 258 (Fig. 3) which cooperates with a cam arm and roller 259 mounted on shaft 56. By means of the cam-controlled connections, bail 250 restores stops 245 before bail 251 restores latches 246 and through them the magnet armatures 247.

Operation of the printing hammers

As shown in Fig. 3, the hammers 260 for actuating the type members 249 are loosely mounted on a shaft 261 and urged into printing action by springs 262, connected at one end to said hammers and at the other to a fixed plate between the main side frames.

The hammers are normally locked against such action by latches 263 engaging a lower projection on the hammers. The latches 263 are loosely mounted on a bar 264 and at their lower ends carry pivotally mounted levers 265. Springs urge the latches into operative position. The hooked end 266 of lever 265 is adapted when depressed to engage the bevelled edge of a bail 267 fixed on a shaft 268. In Fig. 2 it is noted that shaft 268 has affixed thereto an arm 269 with pin and slot connection 270 to a link 271 attached to a bell crank 272 secured to shaft 261. Referring now to Fig. 3, a shaft 273 carries a double-armed lever 274 having cam follower rollers cooperating with a pair of complementary cams 275 which serve to actuate bell crank 272 through arm 276 (Fig. 2) attached to shaft 273, and link 277 connecting the arm to the bell crank. Shaft 261 carries a restoring bail 278 (Fig. 3) to restore the hammers to latched position after they have been tripped. As bail 278 approaches the right hand position, link 271 (Fig. 2) causes clockwise rotation of shaft 268 to move bail 267 (Fig. 3) to the left so that if the hooked end 266 is in cooperation with the bail, the latch 263 will be moved to the left to unlatch the hammer whereupon the latter will be actuated by spring 262 to strike the type for printing.

A pin 279 carried by type bar 226 normally engages one end of lever 265 and holds the hooked end 266 out of cooperation with bail 267. The type bar carries eleven type members 249 (Fig. 3) the extreme upper and lower members being adapted to print zero. Should the type bar rise beyond the initial position wherein the upper zero member 249 is in printing position, the pin 279 releases lever 265 sufficiently to permit the same to cooperate with the bail 267. When the type bar is held down in the upper zero printing position, operation of the hammer tripping latch is prevented. If the type bar 226 rises to present the lower zero type to the printing line, pin 279 engages a pivoted bell crank 280 which through a lateral extension 281 tilts lever 265 to inoperative position.

In order that all zeros to the right of a significant figure shall be printed, however, means are provided for tripping the hammers of such type. This means comprises a lever 282 which is pivotally mounted on each hammer latch 263 and is adapted to engage a projection 283 on the next latch to the right, so that any latch 265 which is actuated by bail 267 will in turn cause actuation of the next lower order latch. In order to split the zero control, the lever 282 may be rocked clockwise about 284 out of engagement with the projections 283 of the adjacent hammer latch.

In order to lock any one or more of the printing hammers against operation, a series of levers 285 are adapted to bear down upon separate spring blades 286 so that the blades engage projections on hammers 260 preventing clockwise rotation of the same. The end of lever 285 is shaped with sharp square edges so that when it is shifted to bring the flat end against blade 286, the edges serve as a detent against accidental displacement. With lever 285 in the position shown in Fig. 3, spring blade 286 is released to swing out of engagement with hammer 260.

It is frequently desirable to print zeros to the left of the highest order significant character, as in the case of code numbers or decimals comprising a plurality of figures including the zero, for example as the 0017 in the second line of figures in Fig. 27. To obtain this result, the levers 282 of the hammers associated with the columns between the left and right hand list of figures, as between 9983 and 0017 are moved counterclockwise in position to contact projections 283 and to trip the latches to the right of the left column. This then would cause zeros to be repeated across the sheet to the right of the left column of figures; however, if it is desired to provide a central vertical blank space between two columns of items, certain levers 285 may be moved to hammer locking position, preventing printing in said space, as between 9983 and 0017 in Fig. 27, and only such zeros will appear as are included in the code numbers or other data desired.

Referring to Fig. 3, the record sheet 287 is carried by the platen 288 supported by the paper carriage frame in the usual manner. Spacing of the platen is effected by the usual pawl and ratchet mechanism (not shown) operated under control of a paper feed control magnet PFM to be described hereinafter.

Where listing is to be effected on the record sheet 287, as in Fig. 28, at the same time that data is being accumulated, the printing magnet PM is connected to receive an impulse through the perforation in the card simultaneously with the transmission of an impulse to the accumulator magnet C or magnet D. The amount may be listed whether the item is a debit or a credit. As shown in Fig. 28, minus signs may be printed adjacent certain of the items to identify them as debit items.

Referring to Fig. 2, the printing ribbon 289 is carried by the spools 290 and passes around guide spindles 291 and through guide members 292. The ribbon spools are detachably mounted on rods 293. The rods are actuated by pawl and ratchet mechanism (not shown) in the usual manner when the hammer restoring devices operate.

The total taking devices

When a total is to be taken of a group of items which have been accumulated, and the total or balance is to be printed and a perforated record made thereof, it is necessary to open certain listing circuits and close certain total printing circuits. The mechanism for effecting these circuit changes is shown in Fig. 9 in which a magnet TM is adapted to be energized either by depression of the total key or automatic operation of group control devices whenever a total is to be taken.

Suspended from the base 34 (Fig. 3) is a plate 294 (Fig. 9) supporting a series of contacts arranged in tiers for compactness, each group of contacts comprises an upper blade 295, a center blade 296, and a lower blade 297. The one end of each blade is fastened to the frame plate 294, and insulated from the frame plate and the other blades, by insulation blocks 298 moulded around the blades mounted on the plate. The other ends of the upper and lower blades are free, but the end of each center blade 296 fits in a horizontal slot 299 cut in the side of a bar 300 made of insulation material. The bar 300 is mounted on a vertical link 301 pivotally connected near the upper end to bell crank 302, and connected near the lower end to an arm 303, pivoted on stud 304. The link 301 is urged downwardly by a spring 305, but is normally supported in a raised position by an extension 306 on the link, abutting down against the top shoulder 307 of a latch 308 pivoted at 309 and urged by spring 310 into cooperation with the top of armature 311 associated with magnet TM.

When the magnet TM is energized, the armature 311 is drawn to the left, (Fig. 9) latch 308 is released and swings counterclockwise, withdrawing shoulder 307 from beneath extension 306 and permitting the link 301 to fall and rest on lower shoulder 312. As the link lowers, the bar 300 depresses the ends of blades 296 breaking the upper contact 313 and closing the lower contact 314. Thus, the connections from the analyzing brushes to the printing magnets are opened, and the connections from the total commutators, in the accumulator, to the printing magnets are closed, by the operation of the contacts 313, 314 as explained more fully hereinafter with reference to the wiring diagram.

When link 301 lowers, the bell crank 302 pivoted at 315 is rocked into position to place roller 316 one one arm, into cooperation with a restoring cam 317 mounted on shaft 45. The rise on cam 317 operates crank 302 in a counterclockwise direction, lifting link 301 in a position to be latched. Latch 308 and armature 311 are restored to normal latching position by connections comprising a pin 318 on cam 317, adapted to strike a crank 319 centered at 315 and having a lower arm 320 for pushing a restoring lever 321 to the right. Projections 322 and 323 on the lever 321 cooperate with latch 308 and armature 311 respectively, and serve to restore the same when the lever 321 is operated by the pin 318 through crank 319. A spring 324 restores lever 321 and, through said lever, holds crank 319 in position to be operated by pin 318.

Figure 5:
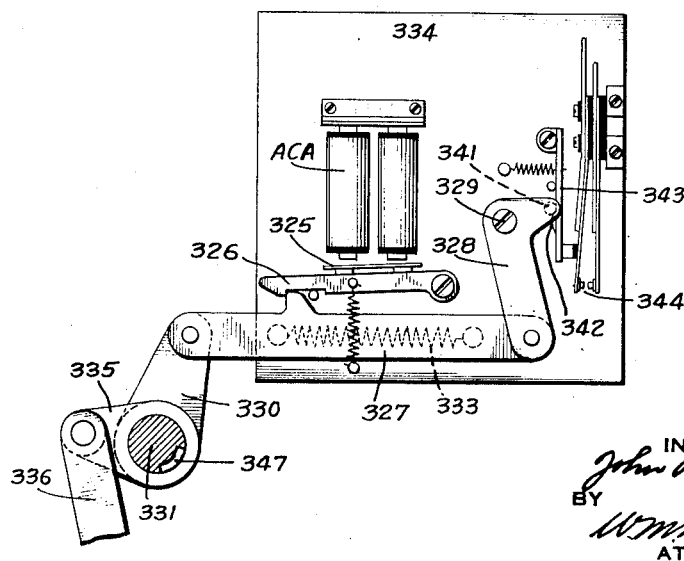
Fig. 5 is a side elevation view of the accumulator control device operated on totals.

When a total taking operation is to be performed, the accumulating mechanism is conditioned to leave the accumulating wheels standing in zero position after the operation. The mechanism controlling zeroizing is in turn controlled by an accumulator cancelling magnet ACA (Fig. 5) which is energized at the same time as magnet TM. The armature 325 of magnet ACA is connected to a latch 326 which, when operated, releases a link 327 for movement to the left. The link 327 is pivotally connected at the ends to bell crank 328 pivoted at 329, and crank arm 330 mounted on shaft 331. A spring 333 fastened to mounting plate 334 urges link 327 to the left, and when the link is released, the spring rocks shaft 331 in a counterclockwise direction, actuating arm 335 and depressing a link 336 connected thereto. The lower end of link 336 (Fig. 3) is connected to a lever 337 pivoted at 338 and carrying a roller 339 cooperating with a cam 340 on shaft 45. The contour of cam 340 is so designed that the shaft 331 does not rock immediately when magnet ACA is energized. However, when the depressed portion of the cam arrives opposite the roller 339, shaft 331 rocks into zeroizing position for purposes described hereinafter. The cam 340 later restores the shaft 331 and the other connected parts.

The bell crank 328 (Fig. 5) is rocked in a clockwise direction, and then in a counterclockwise direction by the connections above noted. In so moving, a pin 341 on crank 328 cooperates with, and then passes, a cam block 342 on a contact closing arm 343. The pin 341 moves up and cams arm 343 to the right to close contacts 344 and energize the record paper feeding magnet PFM (Fig. 26a) to space the paper after printing a total.

In Fig. 2 it is noted that shaft 331 has connections to a similar shaft 332 (Figs. 2 and 3) through link 345 and arms 346 so that both shafts operate together. These shafts extend across the accumulating sections of the machine (Figs. 13 and 14) and are grooved as at 347 to cooperate with the ends 348 of levers 349 pivoted at 350 on the accumulator side plates 113. At the right end of lever 349 is a link 351 having a pin and slot connection 352 with the lever. With the parts in the position shown in Figs. 13 and 14, link 351 is held in its raised position. But during total taking, with shaft 332 rocked into the dotted line position 353 (Fig. 14) the lever 349 is released for clockwise movement and link 351 is allowed to descend.

Figure 15:
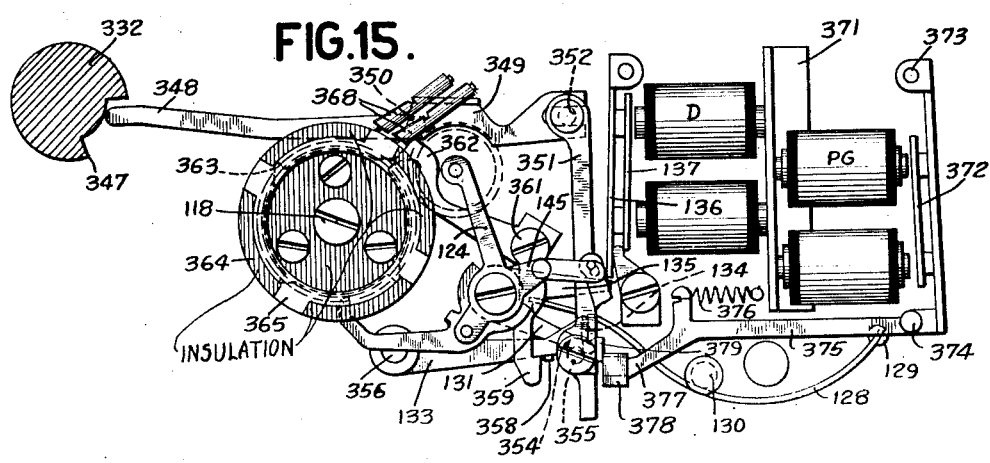
Fig. 15 is a side elevation view of an upper accumulator wheel shown in the zero position during total taking.

Resting in slots 354 in link 351 are screw-headed pins 355 on the free ends of two horizontal arms 133 pivoted at 356 (Fig. 15) and 357 (Fig. 13). The arm 133 associated with the debit accumulator is shown in Fig. 15 and the credit accumulator arm 133 is shown in Fig. 13. The arms are similar in construction and operation, a description of one applies to the other. On the free end of each arm 133 is a fulcrum block 134 in contact with the under side of spring 128. When the parts of the accumulator are in normal position for item entering as in Fig. 13, the arms 133 are held in raised position by vertical link 351 which in turn is supported by lever 349 and the shoulder of notch 347 in shaft 332. Underneath a projection 358 on arm 133, but normally out of contact therewith, is a latch 359 on the lower end of a lever pivoted at 361. Integral with the latch is an upwardly extending arm 362 (Fig. 15) having its free end in the path of a cam 363 fast to accumulator gears 127 (Fig. 13a). From the periphery of cam 363 there extends four cam projections, one of which is adapted to engage and operate latch 359 when the accumulator wheel stands at zero (Fig. 15).

While arm 133 (Fig. 13) is held in the normal item entering position by link 351, the free end of spring 128 is pressed upwardly by fulcrum block 134 and serves, as already explained, to swing the assembly 123, 124 in counterclockwise direction to carry out the adding operation. With the parts in total taking position, shaft 332 is turned to position 353 (Fig. 14) and the arm 133 is released by link 351 but is held in raised position by the engagement of the lateral projection 358 (Fig. 15) with latch 359 (i. e., when the wheel stands in a position other than zero position). When the wheel is rotated during total taking and arrives at the zero position, arm 362 is raised by cam 363 (Fig. 15) and latch 359 is withdrawn from underneath block 358 on lever 133 which thereupon drops sufficiently to release pressure of fulcrum block 134 on spring 128 which then swings with stud 130 as a fulcrum, and urges the assembly 123, 124 clockwise instead of counterclockwise.

In other words, spring 128 tends to rotate the assembly 123, 124 in one direction when fulcrum block 134 is held elevated and in the other direction when the block is lowered. This by reason of the fact that with fulcrum block 134 released, spring 128 bears down upon the block which in turn bears down on arm 131 (Fig. 15) of lever 123 on assembly 123, 124 with greater turning effort than is exerted in the opposite direction by the end 132 (Fig. 13) of spring 128 at the point where the spring fits in a slot in the assembly bail arm 123. This action, as will be explained, takes place to declutch the accumulator wheel from the driving means when the wheel reaches the zero position during the total taking operation.

The total printing and perforating devices include a commutator 364 (Figs. 14 and 15) of insulating material with four metallic inserts 365 in the rim. The commutator is fast to transfer cam 215 and gear 127 as may be seen in Fig. 13a. Since the accumulator gear 127 makes one complete revolution for four complete adding movements of ten steps each, it has four zero positions. Bearing on the rim of each commutator are two brushes 366, 368 so located so that when the commutator is in a zero position both of the brushes are on an insert 365. The circuit including the brushes is opened by the gap between the brushes and closed by an insert 365.

Referring to Figs. 14 and 26b it may be noted that a series of brushes 366 cooperate with the commutators 364 on the credit accumulator wheels, and another series of brushes 368 cooperate with the wheels in the debit accumulator. It may be noted that in Fig. 26b four sets of commutators are shown representing the commutators of two credit accumulators and two debit accumulators. Only three commutators are shown in each set, the accumulators being broken to leave out a few commutators and save space; the two highest order and the lowest order commutators are shown.

Totaling brushes 367 (Fig. 26b) are provided for the purpose of testing whether the total to be printed and punched is a negative or positive balance. These brushes 367 are similar in construction and operation to the brushes 366 and 368, the difference being that brushes 367 are in a different circuit and the accumulator wheel with which they cooperate is the highest order wheel in the credit accumulator. There is a pair of brushes 367 in each credit accumulator and they cooperate with the commutator on the highest order wheel. The brushes 367 are set to close the circuit through them when the wheel they contact stands in the zero position. The minus balance circuit so closed operates switches to change the control of the total printing and punching to the credit accumulator away from the normal control by the debit accumulator. This circuit is used for controlling the printing and punching of a total where the amounts added and subtracted yield a credit balance. That is, where the sum of the various amounts added is greater than the sum of the various amounts subtracted in the machine.

It may be assumed that the capacity of the credit accumulator in addition is one order less than the number of orders provided. The highest order may be reserved for testing for complements.

Where the total is a credit balance, the highest order wheel in the credit accumulator will contain a zero, therefore the gap between an associated pair of brushes 367 (Fig. 26b) will be closed, thus energizing a minus balance magnet MBM which shifts certain total control contacts so that the brushes 366 are connected to the printing magnets P and perforating magnets PU and a total representing a credit balance is printed and punched under control of the credit accumulator.

Where the total is a debit balance, the highest order wheel in the credit accumulator will contain a nine, therefore no circuit is established through brushes 367 and the brushes 368 remain connected to the printing magnets P and punch magnets PU, and a total representing a debit balance will be printed and punched under control of the debit accumulator.

When it is desired to take a total, magnet ACA (Fig. 5) is energized to rock shafts 331 and 332, while magnet TM is made effective to shift the contacts described in connection with Fig. 9.

A pair of make and break cam contacts are arranged to operate to transmit an impulse through the total taking or cancelling circuit at the ten index position in the cycle, i. e., at an instant corresponding substantially to a time one point in advance of instant that the nine position on a card passes the sensing brushes during item entering operations. These cams are mounted on continually operating shaft 45 driven by gear connections to the continually running shaft 41 (Fig. 1). The cancelling circuit has connections to the accumulator magnets C and D of both accumulators through which impulses are sent at the ten index position in a manner more fully described hereinafter.

This energization of magnets C and D early in the total taking operation engages all the credit and debit accumulator wheels for rotation and restoration to the zero position. In Fig. 15 the accumulator parts are positioned as they appear during total taking just as the accumulator wheel reaches the zero position. It is seen that lever 362 is rocked clockwise by a projection on cam 363, thus withdrawing latch 359 from under projection 358 on arm 133 which then may lower since it is not supported by link 351 during total taking. As arm 133 lowers under the pressure of spring 128 on fulcrum block 134, the lower edge of the block strikes the upper edge of the arm 131 and urges the gear clutch frame 124 in a clockwise direction to disconnect the accumulator wheel from the driving gear and leave it at zero.

During the rotation of the accumulator wheels in total taking, the type bars and punch interposing bars are rising in synchronism with the movement of the wheels, which in this instance may be considered to be the commutators 364. The motion of each type bar is arrested by a mechanism (Fig. 3) controlled by an impulse through a printer magnet PM at the time the connected circuit is closed by an insert 365 (Fig. 15) bridging the gap between the totaling brushes 366 when the related accumulator wheel arrives at zero. In a similar manner a related punch bar is controlled by an impulse through a punch magnet PU at the same time. Thus the accumulator wheel will rotate with one of the commutator inserts 365 approaching the totaling brushes until at zero the insert closes the circuit to send an impulse through the printer and punch magnets in the same differentially timed manner that a perforation in a record card column closes a circuit to the magnets in item printing. Simultaneous with total printing and perforating, and the arrival of commutator 364 at zero position, cam 363 rocks latch 359 releasing frame 123, 124 which is rocked clockwise by spring 128 to throw the accumulator driving elements out of operative engagement, leaving the accumulator wheel in a reset or zero position, in a manner already described in connection with Fig. 15.

The progressive totaling devices

For certain classes of accounting work it is desirable to be able to secure a printed and perforated record of the total or balance of a group of items entered into an accumulator, without resetting the accumulator wheels to zero. This is known as taking a progressive, sub, or running total. The amount registered by the accumulator wheels after the taking of such a total is the same as the amount registered thereon before the totaling operation was performed. An example of a progressive totaling operation is shown in Fig. 28. There it is noted that after the accumulation of the first four items a printed record of the debit balance 54 is made without resetting the accumulator wheels in accumulators C or D (Fig. 27). The debit balance 54 is then retained as an old balance and accumulated with a subsequent set of items, the result being a credit balance of 165.

To secure progressive totaling control in the machine illustrated, the gear clutching frame 123, 124 is prevented from going out of mesh with the driver gear at zero during total taking.

In Figs. 13 and 15 it is noted that to the right of each accumulator magnet is a progressive totaling magnet PG supported by a bracket 371 fastened to plate 113. The magnets PG are energized during total taking when a progressive total is desired. The armature 372 of the magnet is pivoted at 373 and at the lower end is pivotally connected at 374 to a slide 375. A spring 376 connected between a tab on slide 375 and a stud on plate 113 normally holds the slide to the right and the armature away from magnet PG. The lower forward end 377 of slide 375 is sheathed in a fixed slotted stud 378 on plate 113. When magnet PG is energized, armature 372 is urged in a clockwise direction and pushes slide 375 before it until the end 377 protrudes beyond the left side of stud 378 and projects into the path of a projection 379 on the arm 133.

During the taking of ordinary clearing or zeroizing totals, the projection 379 is not obstructed by end 377, therefore when the accumulator wheel reaches zero position, (Fig. 15) arm 133 is free to descend, and spring 128 pressing fulcrum block 134 down on arm 131 serves to rock frame 123, 124 disengaging gear 120 and restoring the accumulator wheel to zero position.

If, however, a progressive total is desired, connections are made to energize the magnets PG during total taking. The projection 379 will then be obstructed by end 377 so that when arm 133 is released at zero by latch 359, the arm will not descend but fulcrum block 134 will continue to support the spring 128 to hold the gear frame 123, 124 with gear 120 in mesh with gear 119. The accumulator wheel will continue to rotate after passing the zero position, for the entire adding movement of ten steps bringing it into a position similar to the position it occupied before total taking. The gear 120 is disengaged by cam face 140 on cam 139 striking arm 142 of frame 123, 124 to positively restore the frame with arm 135 under armature 136.

As may be noted in Fig. 26b, each accumulator magnet C and D may be associated with a progressive total magnet PG. Each magnet PG is provided with a separate plug connector 380 (Fig. 26b) for making the connection necessary to put the magnet in the circuit energized during total taking. By connecting all the plugs 380, both accumulators are adapted to provide progressive totals. If desired, the plugs forming connections to the magnets PG in one accumulator may be disconnected, thus adapting the said accumulator to take clearing totals while the other accumulator takes progressive totals. An accumulator may be split into two or more sections for totaling, certain sections taking clearing totals and other sections taking progressive totals, by merely disconnecting the magnets PG of certain orders in the accumulator.

The automatic group control devices

In this art the record cards are usually grouped according to transactions or commodities or salesmen identifications. In such instances the cards of each group are given special designations that usually take the form of numbers perforated in certain columns on the card. These numbers are utilized to control the stopping or other operations of the machine so that when the last card of a group passes through the machine, the machine may be caused to stop or print and punch the total of the group. The printed list in Fig. 29 shows the operations performed by groups of cards.

A number of contacts 381 (Figs. 26a and 31) are arranged to be controlled by magnets placed in series circuits between upper and lower card brushes to detect changes in card groups and initiate subsequent machine operations accordingly. In this machine such magnets GCM are mounted, as shown in Fig. 31, upon plates 386 fastened to the base of the machine. Magnet GCM has associated therewith an armature 387 cooperating with a pivoted interposer member 388 to hold contact 381 normally closed. Springs 389 connected to the armatures of opposed magnets GCM normally hold the armatures against their respective pin stops. Energization of any magnet trips the related armature to open the associated contact 381 the function of which is explained hereinafter in connection with the electric circuit of the machine.

Mounted on shaft 45 (Fig. 31) is a cam 390 cooperating with a follower crank 391 to rock the crank once each cycle of the machine in order to restore such magnet armatures as may have been tripped earlier in the cycle. A restoring bar 392 (Fig. 31a) is pivoted to crank 391 at 393 and is guided at its free end by shouldered screw 394 and a pin. A spring 395 tends to hold the parts in cooperation with cam 390.

Restoring bar 392 is provided with shoulders 396 which cooperate with the free ends of interposer members 388 to rock them about their pivot points, while other shoulders 397 on bar 392 operate pivoted bell crank members 398 to positively restore armatures 387.

Each magnet GCM (Fig. 26a) may be connected by plug wires to an upper brush 103 and a related lower brush 104. The magnets may be plugged to any of the banks in the machine where such banks are selected to control the operation of the machine. Thus, each magnet is connected in series with the brushes cooperating with the particular column selected on the record card for controlling. The record card feeding device is arranged so that while one record card is passing under the upper brushes the next card is passing under the lower brushes, and the timing is so arranged that as any index position is passing under the lower brushes the corresponding position on the succeeding card is passing under the upper brushes. If the perforations in the two cards coincide, the upper and lower brushes will make contact simultaneously, establishing a circuit through the connected magnet GCM and energizing the same, which, through the connections shown in Fig. 31, operates to open the related contact 381 and prevent the taking of an automatic total.

In Fig. 26a the arrangement of the contacts 381 in multiple and the possible plug wire connections to group control total taking magnets MA, INT, and MI are illustrated. There it is noted that by plugging any of the above mentioned control magnets to a plug connection 398 terminating at one side of the contact arrangement 381, one or more of the contacts 381 are connected in multiple for energization of the control magnet when one or more of the contacts 381 fail to open, because the related magnets GCM are not energized, which in turn is due to a change in the designation datum perforations on the record cards.

Certain of the banks of control may be selected for minor group control, others for intermediate control, and others for major group control.

The energization of the group control magnets FI, MA, INT, and MI (Figs. 6 and 26a) control the opening and closing of a plurality of contacts governing the operation of the machine when normal accumulating operation is interrupted by group control. In Fig. 6, the relationship between various group control magnets and the contacts which they control is shown with the contacts in the position they assume under normal conditions. The control exercised by the contacts is more fully explained hereinafter with reference to the wiring diagram Figs. 26a and 26b. The contacts and magnets are mounted on a frame plate 399 suspended beneath the base of the machine adjacent to the constantly running shaft 45 and the shaft 62 which operates during the printing of totals. The contacts are mounted on insulation blocks secured to the side of frame 399 and are opened and closed by insulation strips 400 riveted to the sides of vertical slides 401, 402, 403, and 404, (Figs. 6b, 7 and 8). The slides are guided by upper and lower brackets 440 on plate 399 and are urged to lower under the tension of springs 405. They are held up by the armatures of the various control magnets.

The armature 406 of the minor control magnet MI cooperates with an extension 407 riveted to the side of slide 401 upon which is held an insulation bar 400 cooperating with the seven minor control contacts MI1—MI7. When the minor control magnet is energized, the slide 401 lowers one step closing contacts MI1, MI2, MI6, MI6′, MI7, MI7′ and opening contacts MI3, MI4, and MI5. When the slide 401 is lifted after the total printing and perforating cycle, in a manner described hereinafter, the contacts assume the normal position, Fig. 6.

The minor control magnet armature 406 is pivoted at 408 and carries a horizontally extending arm 409 carrying a pin 410 normally positioned in the upper end of a slot in link 411. It is obvious that when the armature operates, the pin 410 moves in the slot without operating link 411. At the end of the operating cycle, under minor control, the slide 401 is restored to the upper position under control of a cam 412 secured to the shaft 62. The cam 412 cooperates with a bail 413 in the shape of a bell crank, one arm of which carries a roller cooperating with the cam and the other arm forming a pair of side frames between which a shaft 414 is supported. On shaft 414, four pawl members 415 are mounted and cooperate with projections 416, 416′ on the sides of slides 401, 402, 403, and 404. The pawl 415 cooperating with the slide 401 for the minor control contacts, engages a single toothed projection 416 secured to the side of slide 401. The three other projections 416′ are riveted to slides 402, 403 and 404. As the bail 413 is rocked by the cam, pawl 415 is lifted and carries with it slide 401. The other slides are lifted two steps in two cycles of operation of cam 412 in a similar manner. The spring 417 urges the bail into cooperation with the cam. A pin 418 projecting from the side of frame plate 399 cooperating with a cam face on the side of pawls 415 to cam the pawls out of the path of the projections on the slides when the parts are in normal position.

The intermediate group control magnet INT, when energized, operates to withdraw the armature 419 from under the projection 420 secured to the side of slide 403 (Figs. 6a and 6b). The slide 403 when released drops two steps and requires two operating cycles of the machine, two operations of cam 412, before the slide is restored to the normal position. After one operation of cam 412, slide 403 is held up by the co-operation of the upper end of armature 419 with the notch in projection piece 420. When the slide 403 (Fig. 6a) drops to the lowest position, intermediate contacts IN1 and IN3′ are opened while contacts IN2, IN2′ and IN3′ are closed. When the slide 403 is lifted one step into its intermediate position, the contacts IN3′ are again closed. Then, on the second cycle of the machine when the slide is raised to its normal position, contacts IN2, IN2′ and IN3 are opened and contact IN1 is closed.

Referring again to Fig. 6, it is noted that the armature 419 cooperating with the intermediate group magnet INT is pivoted at 421 and carries an arm 422 engaging a pin 423 on link 411. By means of this connection, when the control magnet INT is energized, the link 411 is lowered pulling on pin 410 and rocking the minor control armature 406 in a counterclockwise direction. Thus, by the removal of armature 406 from beneath projection 407, the slide 401 is released to operate all the minor control contacts when the intermediate control magnet is energized.

When the major control magnet MA is energized due to a change in group designation associated with major control, the armature 424 is rocked in a counterclockwise direction about pivot 425 to move the armature from beneath the projection 426 (Fig. 6a) allowing the slide 404 to drop two steps below normal position. The insulated bar secured to bar 404 cooperates with a single contact MA1 which closes as the slide drops. The contact MA1 is not opened with the first upward movement of slide 404 by pawl 415; a second operation of the machine is required before the contact MA1 is opened. After the first operation of cam 412, slide 404 is supported by armature 424 which engages in the notch cut in the side of projection 426.

Referring again to Fig. 6, it is noted that the major control armature 424 is provided with a horizontal arm 427 from the end of which projects a stud 428 in the lower end of a slot cut in link 411. By means of the pin and slot connection 428, energization of the major control magnet MA serves to lower the link 411 and through the link operate the intermediate and minor control armatures 419 and 406. Thus slide 401 and slide 403 are lowered at the same time that slide 404 is allowed to lower by energization of the major control magnet MA, and the minor, intermediate and major control contacts are operated.

The final group control magnet FI (Fig. 6) is energized by depression of a final total key 429 (Fig. 26a). This key is operated when a complete clearing total operation of the machine is desired. When the magnet FI is energized, the cooperating armature 430 (Fig. 6) is withdrawn from beneath a projection 431 secured to the slide 402. The slide then drops two steps allowing the contact FI1 to close. At the same time that magnet FI is energized by the final total key, the magnet MA is energized to allow the three slides 401, 403, and 404 to assume their lower positions, thus operating all control contacts. After the first upward movement of the final control slide 402, the contacts FI1 remain open. The slide 402 is held up in the intermediate position by cooperation of the upper end of armature 430 with the notch in projection 431. They are closed by the second step of upward movement of the slide into normal position.

A pressure release device is provided to lift the four slides and relieve the pressure of the projections on the slides from the ends of the armatures at the time the armatures are adapted to be actuated by the energization of the related magnets. Projections 432 (Fig. 6) secured to the uper ends of the slides overlie the ends of pawls 433 pivotally mounted on a shaft 434 secured between two arms of a bail frame 435 pivoted at 436.

An arm 437 on the front end of the frame carries a roller in cooperation with a cam 438 secured to the constantly rotating shaft 45. A spring 439 holds the bail frame in cooperation with the cam. At the proper point in the cycle the frame 435 is rocked in a counterclockwise direction by cam 438 to lift the pawls 433, which in turn raise the four slides a slight amount to withdraw the pressure of the slides from the top of the armatures.

*The subtraction and class selection control magnets*

The subtraction control magnets SCM (Figs. 26b and 32) are energized under control of perforations such as control perforation 112 (Fig. 19) in the record cards. The magnets SCM in turn operate contacts SC (Figs. 26a and 32) which remain closed for a substantial part of the operating cycle to energize subtraction magnets SM which in turn condition the accumulator to receive a credit item (as shown in Fig. 4) and operate contacts 444 (Fig. 26b) to properly direct the accumulator controlling impulses during the entry of a credit amount.

A control perforation such as perforation 112, Fig. 19, also controls the energization of each of the class selection control magnets CSC (Figs. 26b and 32). The magnets CSC in turn, operate to close contacts SC', Fig. 26a, associated with class selection magnets CSM and class elimination magnet CEM. The magnets CSM and CEM (Fig. 10) operate to open and close contacts 445 and 446 for the purpose of selectively distributing classified items that appear in a single perforated field on the record card, to various banks of the accumulator, printer or perforator; and to prevent the accumulation, printing or punching of certain of said classified items.

The effect of the opening and closing of the various contacts is more fully explained hereinafter with reference to the wiring diagram. The mechanical connections associated with magnets SCM and CSC are about to be described with reference to Fig. 32.

The magnets are mounted upon a plate 447 secured to the bottom of the base of the machine. Each magnet has associated therewith an armature 448 cooperating with a pivoted interposer member 449 to hold the contacts SC, SC' normally opened. Springs 450 connected to armatures of opposite magnets normally hold the armatures against their respective stopping pins. Energization of any magnet trips the related armature 448 to release the interposer member 449, allowing the associated contact SC or SC' to close.

Mounted on the shaft 70 (Fig. 32) is a cam 451 cooperating with a cam roller on a crank 452. The cam is adapted to rock the crank at the end of each card reading cycle of the machine in order to restore such magnet armatures as may have been tripped earlier in the operation. A link 453 connects the crank with a bell crank member 454 pivoted at 455 on the plate 447. The vertical arm of the bell crank 454 is connected to one end of a restoring bar 456 which is guided at the opposite end by a shouldered screw and a pin. A spring 457, fastened to the plate 447 and restoring bar 456, tends to hold the parts in cooperation with cam 451. Restoring bar 456 is provided with shoulders which cooperate with the free ends of the interposer members to rock them about the pivot points and restore them to normal position wherein they are engaged by the end of the armature. Other shoulders on restoring bar 456 operate bell crank members 458 to positively restore the armatures 448.

The magnets CSM and CEM, which are energized by the closing of the contacts SC' under control of the magnets CSC as described above, are shown in Fig. 10. There it is noted that a plate 459, which is adapted to be secured to the bottom of the base of the machine, carries a plurality of three-bladed contact groups, and mechanism between the groups and the magnets for operating the contact blades. The groups of blades are arranged in two vertical columns on the plate 459 and mounted on insulation blocks 460 attached to the plate. The upper column of contacts obstructs the view of the lower column in Fig. 10. Each group of contacts comprises three blades; an upper blade 461, a lower blade 462, and a center blade 463. The upper and lower blades are held fixed at one end, between the insulation blocks 460, with the opposite ends free. The center blade is confined at one end by the insulation blocks 460 and at the other end is held in a slot 464 cut in an insulation bar 465 fastened to a vertical link 466 pivoted on the ends of two arms 467 pivoted at 468 on plate 459. Two such linkages, including pairs of parallel arms 467 connected by vertical links 466, are held on the plate 459. The top linkage shown in Fig. 10 cooperates with the upper magnet CSM while the other linkage cooperates with the two lower magnets CEM and CSM. A spring 469 urges the link 466 into a lowered position. However, the link is normally held up by a stop member 471 which cooperates with a projection 470 on the link. The member 471 is held in stopping position by an armature 472 associated with the upper magnet CSM. When the upper class selection magnet CSM is energized by the closing of contacts SC' under control of a related magnet CSC in the manner disclosed with reference to Fig. 32, the armature 472 is moved in a counterclockwise direction about pivot 473, releasing stop member 471 which is then spring urged out of cooperation with the projection 470 on the link 466.

The link is then allowed to drop as urged by spring 469, carrying along the insulation bar 465 and lowering the center contact blades 463, to open contacts 445 and close contacts 446.

Figure 10:
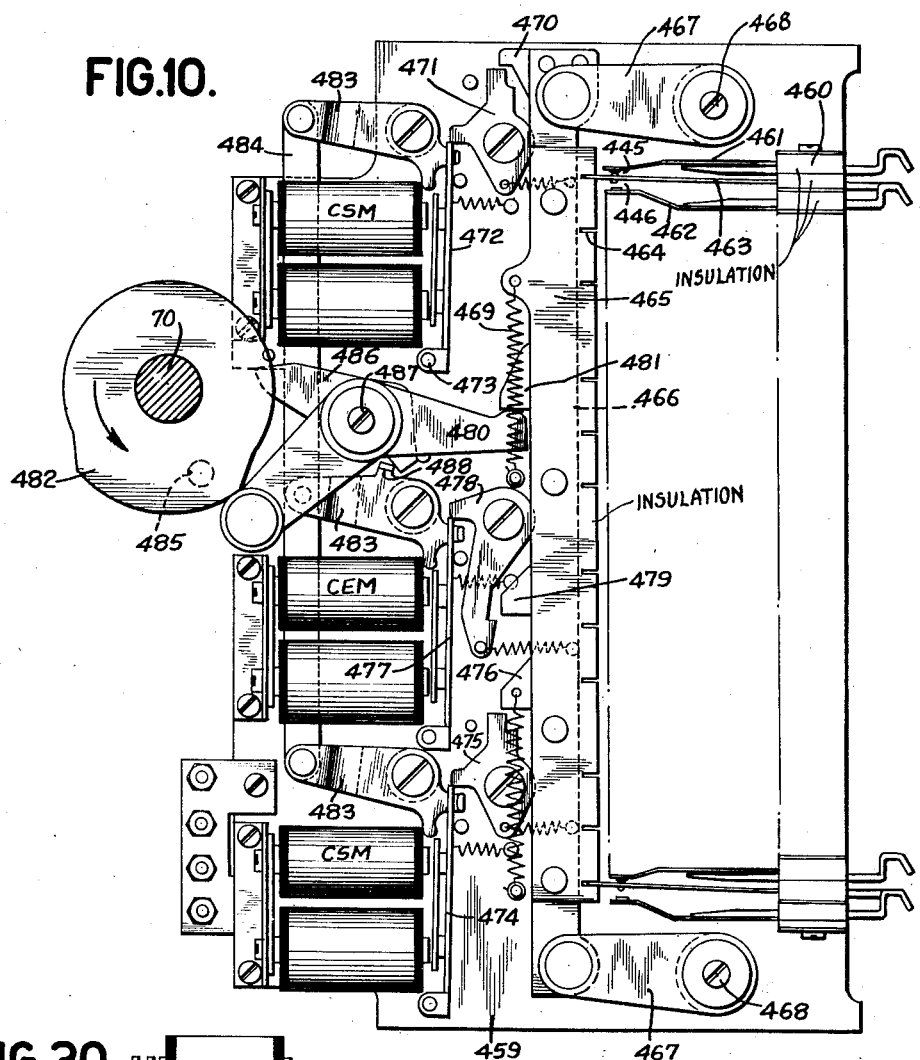
Fig. 10 is a side elevation view of the class selection switch.

The linkage cooperating with the other set of contact blades, behind the linkage and blades shown in Fig. 10, is operated under control of the two lower magnets CEM and CSM. The two magnets are energized when a pair of control perforations such as perforation 112, Fig. 19, appear in a record card and allow energization of a pair of magnets CSC (Fig. 32) which in turn close the contacts SC' in circuit with the two lower magnets (Fig. 10). The classification control perforations are provided for purposes of class selection and class elimination of data on the cards. One perforation affecting magnet CSM is provided for the purpose of selectively distributing classified items that appear in a field on the record card, to various banks of the accumulator, printer or perforator; while the other perforation, which when sensed affects magnet CEM, is provided to eliminate accumulation, printing or punching of certain classified items. Two control perforations are punched in each card that contains items which are not only to be selectively distributed, but such items are also to be eliminated from effecting accumulating, printing or punching when plug connections are made for class elimination control. If the lower magnet CSM is energized alone, it attracts armature 474 to release stop member 475 which then moves out of the path of projection 476 attached to the link similar to the link 466. The associated contacts are then operated in a way similar to the operation of the other bank of contacts under control of the upper class selection magnet. If, however, the class elimination magnet CEM is energized at the same time that the lower magnet CSM is energized, by a pair of control perforations appearing on the record card, devices are operated to prevent the contact operating linkage from falling to the lowest position. The linkage is obstructed so that the center contact blade is moved a small amount, enough to break the upper contact 445 but not far enough to make contact 446. The operation is performed by the CEM magnet attracting armature 477 which then releases a latch 478 which is adapted to obstruct a projection 479 fastened to the side of the link similar to link 466. The distance between the projection 479 and the hook end of latch 478 is gauged to place the center contact blades 463 in intermediate positions.

At the time the magnets are adapted to be energized, the pressure of the contact blade actuating linkage is removed from the stop members by means of a pressure release device. This device comprises the bell crank 480, one arm of which cooperates with projections 481 on the vertical linkage members and the other arm carries a roller cooperating with a cam 482 mounted on the card feed operating shaft 70. A cam face on the cam 482 rocks the crank 480 in a counterclockwise direction to lift the linkage at the time of energization and relieve the pressure on the stop members.

At the end of the cycle the armatures and stop members are adapted to be restored to normal position by means of a series of restoring members 483. The three restoring members 483 are connected by a link 484 and are adapted to be rocked simultaneously in a counterclockwise direction into restoring position. The restoring members are operated by connections comprising a pin 485 on cam 482 in cooperation with the lever 486 pivoted at 487 on frame 459. The one arm of the lever 486 cooperates with a projection 488 extending from the top of the middle restoring member 483. When the pin 485 strikes the lever 486, the lever is operated in a clockwise direction to strike the projection 488 and urge member 483 in a counterclockwise direction. By means of link 484 connection to the other two members, the three sets of armatures and stop members are restored simultaneously.

The subtraction magnet SM which is energized by the closing of contacts SC under control of magnets SCM as described above, is shown in Fig. 4. A plate 746 mounted near shaft 70 carries a series of groups of contacts insulated from each other and operated under control of magnet SM on the plate. There are three contact blades in each group; an upper blade 747, a center blade 444, and a lower blade 748.

A contact 749 is normally made between the upper and center blades, while an opening 750 exists between the center and lower blades. The ends of the center blades 444 are in engagement with slots cut in an insulation bar 751 which is fixed to a vertical link 752. A spring 753 on link 752 urges the link downwardly with a projection 754 on the link resting on the top of a stop member 755 pivoted at 756. The member 755 is held in stopping position by contact with the end of an armature 757 associated with magnet SM. When the magnet is energized, the member 755 is released to be rocked in a counterclockwise direction by spring 758, allowing projection 754 to descend into notch 759 and link 752 to operate blades 444 closing contacts 750 and opening contacts 749.

At the time the magnet is energized, the pressure of projection 754 on member 755 is relieved by pressure release connections for operating link 752. At center 760 one end of link 752 is connected to the bell crank 200 which is pivoted at 199 and carries a cam roller adapted to be engaged by cam 761 mounted on shaft 70. At the proper time the cam rocks the bell crank in a counterclockwise direction, lifting and restoring the link 752 and bar 751 and relieving the pressure between 754 and 755. The counterclockwise restoring movement of crank 200 is also used to unlatch and restore latch 198 which has arm 201 overlying the horizontal part of the crank. If the magnet is energized, the link is allowed to drop and rock crank 200 in a clockwise direction, also carrying latch 198 in the same direction.

The stop member 755 and armature 757 are restored after each operation by a double ended arm 762 centered at 763. A lug 764 on a crank 765 operates the arm 762 when a pin 766 on cam 761 strikes the end of one arm of the crank. The crank is rocked in a clockwise direction to push arm 762 which in turn rocks member 755 and armature 757 back to normal position.

Minus balance magnets

The minus balance magnets MBM and the various contacts controlled thereby are shown in Fig. 33. These magnets are adapted to be energized under control of the total brushes 361 (Fig. 26b). The brushes 361, as explained hereinbefore, cooperate with the commutator 364 (Fig. 14) on the highest order credit accumulator wheel. When taking a total, if a "0" is registered on the highest order credit wheel, a circuit is completed through brushes 361 and through contacts SS2 closed by the manipulative subtraction control lever 176, and magnet MBM is energized. The magnet MBM when energized, opens certain contacts and closes other contacts to direct the total reading impulses from the credit accumulator to the printing and perforating devices. The mechanical connections between the magnets MBM and the associated contacts are shown in Fig. 33. The magnets and contacts are mounted on a plate 489 adapted to be secured to the bottom of the base of the machine adjacent to the constantly rotating shaft 45. Each magnet MBM has associated therewith an armature 490 cooperating with a pivoted interposer member 491. An insulated block on the interposer member normally holds contacts 492 closed and contacts 493 open. Spring 993 connected to the armatures of opposite magnets MBM normally holds the armatures against stops in position to obstruct movement of the interposer members. When a magnet MBM is energized, the related armature 490 is moved to release the interposer member which then swings to allow contacts 492 to open and contacts 493 to close.

The armatures and interposer members are positively restored by means of connections to the driving mechanism. Mounted on shaft 45 (Fig. 33) is a cam 494 cooperating with a roller on one arm of a bell crank 495 pivoted at 496 on the frame plate 489. A restoring bar 497 is connected to the vertical arm of crank 495 and is guided at the right end by a pin and a shouldered screw. A spring 498 connected between the bar 497 and plate 489 tends to hold the crank 495 in cooperation with the cam 494. Shoulders on the bar 497 cooperate with the free ends of the interposer members 491 to rock them about the pivot points to restore them to normal position wherein they hold contacts 492 closed and contacts 493 open. Other shoulders on bars 497 cooperate with pivoted bell crank members 499 to restore armatures 490 in a positive manner.

The card perforating operation

The machine of the present invention is provided with devices for perforating records of the data gathered from the record cards presented to the analyzing devices. A total, summary or balance card may be punched by the perforating devices under control of the accumulating devices, to furnish a record of the total or balance accumulated in the duplex accumulators. Or, the perforating devices may be connected to act as a duplicator, i. e., the perforating devices may be controlled by the analysis of data on a record card to duplicate the card.

When the lrst record card of a group is fed under the analyzing devices, a blank card is fed in the perforating devices, and the classification designation perforations appearing in the record card may be duplicated in the summary card. The summary card remains in the perforating devices. Then, after one or more accumulating operations, a total may be taken as initiated by the depression of a total key or by actuation of the automatic group control devices.

The perforating devices are controlled by the accumulators to punch the summary card with the total, debit balance, or credit balance registered in the accumulator. If the total is a credit balance, devices are provided to punch a control perforation such as hole 112 (Fig. 19) in the summary card. The column position of the control perforation is adjustable under manipulative control. After the total punching operation the card is fed to a stacker.

The filling in, or elimination, of zero perforations on the summary card is controlled by zero punch selection devices in each column of the perforating device. The selection devices may be adjusted so that zero perforations are punched in all columns on the summary card not representing a significant figure. Another adjustment of the devices sets the perforating means to cause the perforations of zeros to the right of a particular point in the classification or amount data perforated in the summary card. A third adjustment of the zero control devices, splits the zero control so that zero perforations are not punched to the right of a certain column on the card.

The perforating devices are described in more detail in the sections of the description given hereinafter.

Summary card feeding mechanism

The card feeding mechanism is driven by the gearing (Fig. 20) connected with the gear 82 on shaft 76 which is clutched to the driving means under control of magnet PUC, as explained in connection with Fig. 1. In Fig. 22 the blank cards 500 are shown stacked in a magazine 501 mounted between the supporting plates 502. The usual weight presses the cards down in the magazine.

A narrow slot in the bottom of the magazine is adapted to permit but one card to pass through the machine at a time. A picker 503 is adapted to engage the bottom card in the stack and advance it through the slot. The picker is mounted on sliding member 504 carried in the grooves 505 in the frame of the machine. The sliding member 504 is provided with rack teeth meshing with a segmental gear 506 mounted on a shaft 507 and adapted to oscillate to move the picker back and forth. The shaft 507 has fixed thereon outside of the supporting plates, an arm 508 (Fig. 20) having a roller cooperating with a cam 509 fastened to gear 88. A spring 489 urges the arm 508 into contact with cam 509. The cam is shaped so that one complete cycle of operation causes the card picker to move once to the right (Fig. 22) to feed the card through the slot, and then back to the left.

When the card is advanced from the bottom of the stack, it is gripped between feed rollers 510 (Fig. 22) and fed by these rollers to the next set of feed rollers 511 which in turn feed it between the die plates 512, 513 (Figs. 22b and 22c) of the punch. In passing from rollers 510 to rollers 511, the blank card operates a card lever 531 (Fig. 22) and closes a contact 532 (Fig. 20) which closes the record card feeding circuit. The card is fed downwardly until it is stopped by a gate 514 mounted on arms secured to shaft 516. Fixed on shaft 516, as shown in Fig. 20, is a cam follower arm 518 having a cam follower roller cooperating with a cam 519 integral with the cam 509. A suitable spring 520 is provided to hold the follower against the cam. The cam 519 is adapted to cause the gate 514 to move into the path of the card to stop it between the plates 512 and 513 and to rock counterclockwise to permit the card to pass out from between the plates late in the cycle. At such time, feed rollers 521 and 522 (Figs. 20 and 22) feed the card from between the plates 512, 513.

A curved guide plate guides the leading edge of the card into cooperation with the clips 523 of a rotary card stacker 86 mounted on a shaft 85. This stacker is well known in the art and need not be described in detail. The stacker shaft 85 is actuated by the gearing shown in Fig. 20. The timing of the stacker is such that the clips are open to receive the card as it feeds downwardly over the guide plate. The clips then grip the card and pull it into the discharge pocket 528.

Operation of the feed rollers 510, 511 and 521 is effected by gear 89 which is fast to gear 88 and meshes with pinion gears connected to the various feed roller shafts, as shown in Fig. 20. The inner feed rollers are not positively driven but are driven by being pressed against the card and in turn pressing the card against the outer rollers which are positively driven.

The rollers 522 (Fig. 22) are carried on arms 524 which are loose on shaft 516 and which are provided with pins 525 engaged by levers 526 which are loose on shaft 516 and are urged in a counterclockwise direction by springs 529. The levers 526 are normally out of contact with pins 525. Springs 527 attached to arms 524 normally tend to rock the rollers 522 against the card lightly, to keep the card pushed against the top of the gate 514. When the shaft 516 rocks to move the gate 514 to permit the card to be fed out of the punch, pins in a pair of arms 530 secured to shaft 516 release the levers 526 and allows the heavy springs 529 to press the rollers 522 firmly against the card to insure feeding thereof.

Figure 23:
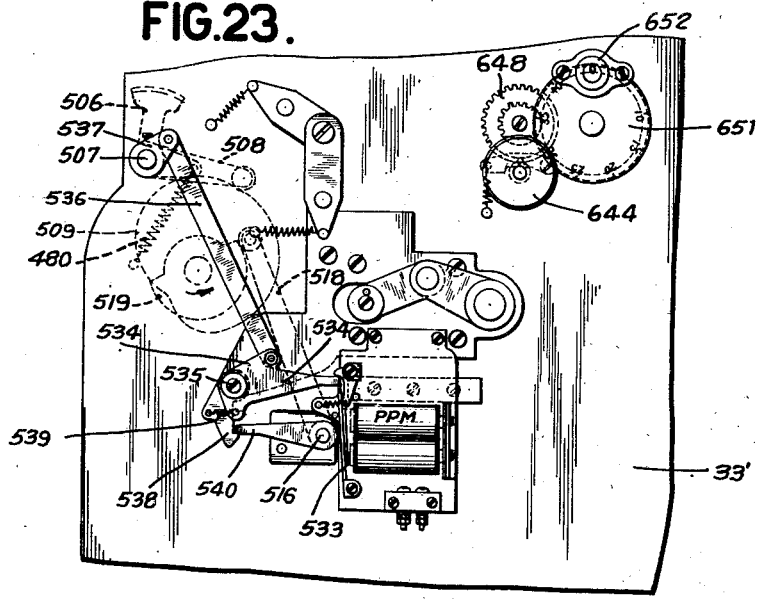
Fig. 23 is a side view of the summary card feeding control devices

The summary card feed shaft 507 and the gate operating shaft 516 are released for operation under control of a punch picker magnet PPM (Fig. 23) which is energized by a total taking operation. The armature 533 associated with magnet PPM normally obstructs the movement of an arm 534 pivoted at 535 and connected by a link 536 to an arm 537 secured to shaft 507. With shaft 507 thus held from clockwise movement, arm 508 is prevented from following cam 509 and summary card feeding is prevented. Also pivoted at 535 is a latch arm 538 urged by a spring 539 into contact with a stud on arm 534. The latch 538 cooperates with an arm 540 secured to shaft 516. Thus, the shaft is normally held from movement in a counterclockwise direction, and lever 518 cannot follow cam 519 to open gate 514. However, when magnet PPM is energized arm 534 is released and the arm and latch 538 are swung clockwise by spring 480 to release shafts 507 and 516 and allow a summary card feeding operation to be performed.

*The summary card perforating devices*

When a summary card 500 is in position between the die plates 512, 513 (Fig. 22b) the punch devices are operated two times; first to perforate the designating data, the next to perforate a record of the total or balance of the amounts accumulated. The perforating device may be operated to punch all the data in a single operation when acting as a duplicator under control of the record card 94.

Figure 22B:
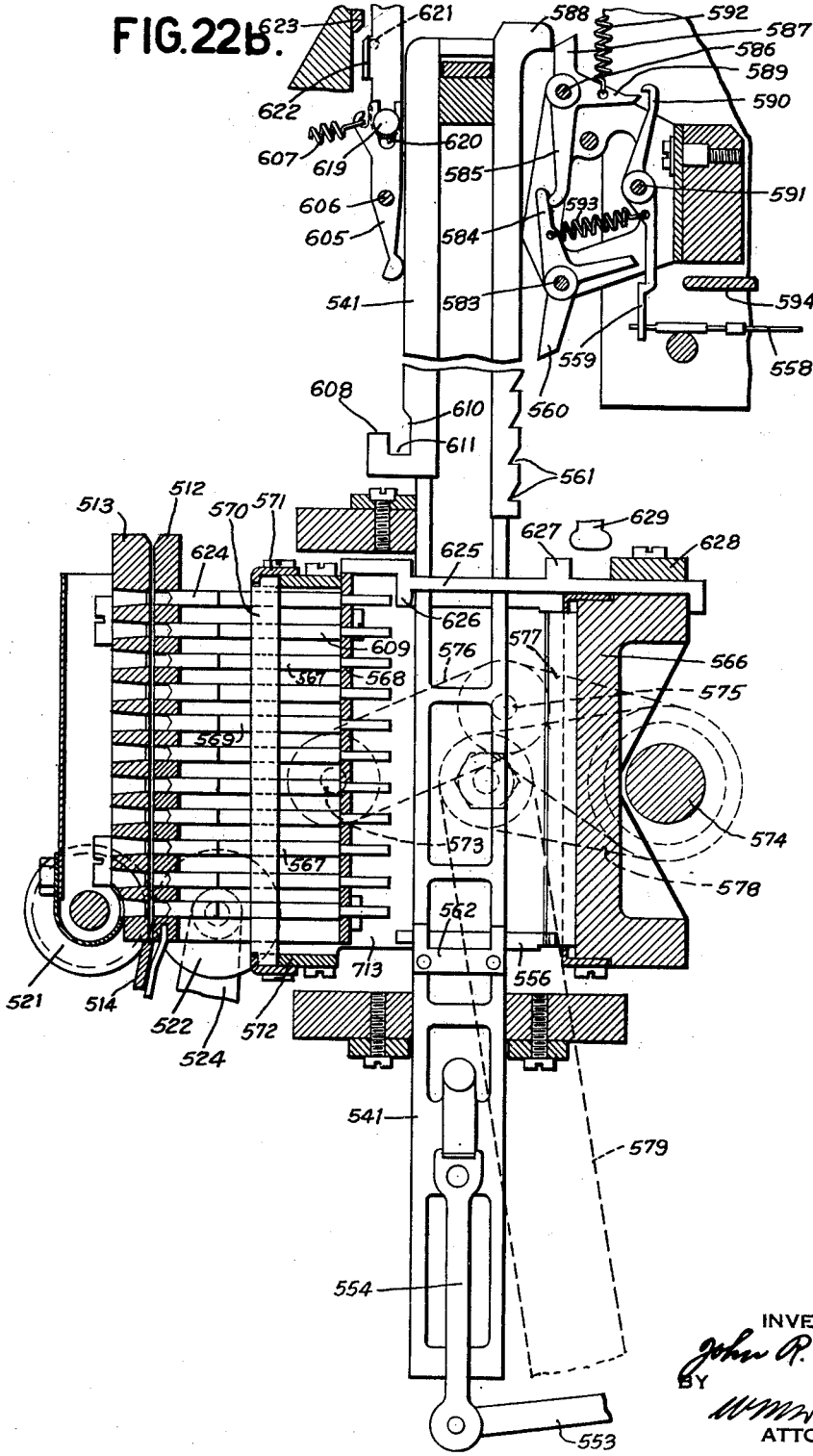
Fig. 22b is a sectional elevation view of the summary card perforating devices, showing the zero perforating control devices.

The proper punches 567 are selected by means of a group of movable punch bars 541 (Figs. 22, 22b and 22c). These bars are lifted in synchronism with the feeding of a record card under the analyzing brushes of the machine. They also move in synchronism with the rotation of the total reading commutator disk 364 (Fig. 15) during total taking operations. The devices for lifting the bars 541 are illustrated in Figs. 22 and 22a. There it is noted that a pair of rollers on a cam follower arm 542 cooperate with a pair of complementary cams 80.

The cam follower is secured to a shaft 543 which also carries an arm 544. Pivoted to the end of arm 544 is a link 545 which at the upper end (Fig. 22) is pivoted to an arm 546 secured to a shaft 547. The shaft carries another arm 548 to which is attached a link 549 connected to a restoring arm 550 pivoted at 551. Between a pair of such arms 550 there is held a restoring bar 552 overlying a series of long arms 553 also pivoted at 551. The arms are urged into contact with the lower edge of bar 552 by springs 554 connected between the arms 553 and a spring holding frame secured to arms 548. The left ends of the arms 553 are pivotally connected to the punch bars 541 by links 554. A boosting lever 555 is pivoted on the base of the machine and spring urged into contact with the lower edge of arm 553 to urge the arm and punch bar 541 in an upward direction. The complementary cams 80 are so designed that through the linkage described, the bars 541 are raised in synchronism with the movement of the record card and the total reading commutator.

The punch bar 541 may be stopped in any of the differential positions wherein a punch interposer member 556 is aligned with a certain one of the punch bars 567 by means of the timed energization of the punch bar control magnet PU. The magnet may be energized by connections closed by a sensing brush 104 (Fig. 26b) through a perforation in a record card; or a timed impulse may be directed through the magnet on totals by a commutator segment 365 (Fig. 15) contacting two total reading brushes 366.

When a magnet PU is energized, the associated armature 557 moves a call wire 558 to release a latch member 559 allowing the pawl 560 to drop into one of the notches 561 cut in the side of the punch bar 541. When the punch bar is so held, the operating frame may continue the regular movement, merely stretching the spring 554. On the return movement of the operating and restoring linkage the restoring bar 552 contacts the upper edge of the arms 553 and pushes the arms and the connected punch bars 541 down to the normal position.

The punch construction is illustrated in detail in Figs. 22b and 22c. There it is noted that the interposer member 556 on each of the punch bars 541 is held thereon by a bracket 562 riveted to the bar 541. The interposer carries a projection 563 which is adapted to cooperate with the sides of the punch bar to limit the movement of the interposer member. One end of the interposer member is provided with a projection 564 which is engaged by the L-shaped extension 565 secured to the frame 566 of the punch. The frame 566 serves to move the interposer member 556 into cooperation with the punch 567 mounted between plate 568 and stripper plate 512. The selected punches are pushed thru the card and die plate 513. The interposer member is retracted by the return movement of frame 566 through the engagement of the L-shaped projection 565 with the shoulder 564. Along side of each of punches 567, and in cooperation with the ends of slots 569 cut in the side of the punches, there is a vertical bar 570 connected between upper and lower frame plates 571, 572 (Fig. 22b) of the movable frame of the punch. The bars 570 move in the direction of the punch during the perforating operation. After the perforating operation, the punches 567 are withdrawn from the die plate 513 by the cooperation of bars 570 with the rear end of the notches 569 cut in the punches 567.

From the foregoing description it is apparent that an interposer 556 may be raised to cooperate with any one of a bank of punches 567, and it serves as a means for causing the punch to be pushed through the card 500 under the action of the punch frame 566.

The side frames 713 of the punch carry the cross members 566, 571, and 572, and are operated to move to the left (Fig. 22b) by means of a toggle mechanism. One side of the toggle joint is pivoted to the punch side frame at 573. The other end of the toggle is attached to the shaft 574. A moving center 575 connects link 576 and arm 577 of the toggle. An arm 578 fixed to the shaft 574 is connected to one end of the link 579 which at its lower end is connected to an arm 580 (Fig. 20) secured to a shaft 581 carrying a cam follower 582 (Figs. 22 and 22a) in cooperation with a pair of complementary cams 81. When the summary card punching devices are connected to the main operating mechanism by the energization of magnet PUC to operate the clutch 74, (Fig. 22) the complementary cams 81 operate the toggle linkage connected to frame 566 (Fig. 22b) to render effective certain of the punches 567 as selected under control of the punch bars 541 which are set by the sensing devices or the accumulators.

When a summary card is punched with a total under control of the commutators 364 (Fig. 15) certain of the commutators are liable to be in zero position. When the commutator is in the zero position as shown in Fig. 15, the contact segment 365 on the commutator makes contact with both of the total reading brushes 366 and conditions the total reading circuit so as to send an impulse through the connected magnet PU immediately after the initiation of the total punching operation.

The time of energization of magnet PU (Fig. 22) under such conditions is an instant before the nine index position during the operation of the machine. With the summary card 500 designed as the card 94 shown in Fig. 19, there is no provision for a perforation below the nine index position on the card. The zero index position is located at the top of each column of positions. For this reason a punch bar is not stopped immediately when the magnet PU is energized by the impulse directed through the total reading commutator standing at zero. Provisions are made to allow the punch bar 541 to escape ten steps to a position where it may be placed with the interposer member 556 in cooperation with the zero punch 569 or allowed to move further out of cooperation with all the punches and thereby prevent the perforation of the column. The devices for allowing the punch bar 541 to escape when a zero is sensed during a total reading operation, are shown in Fig. 22b. There it is noted that each pawl 560 pivoted at 563 has an upper arm 564 in contact with an arm 565 on a crank pivoted at 566. An upper arm of the crank 567 cooperates with a projection 568 protruding from the top end of the punch bar 541. The cooperation of the parts is such as to hold the pawl 560 out of cooperation with the notches 561 in bar 541 when in normal position. A rearwardly extending arm 589 on crank 587 cooperates with a latching arm 590 on latch 559 pivoted at 591. If latch 559 is operated early enough in the cycle by the pulling of the call wire 558 at the instant before the nine index position, the upper latching arm 590 engages arm 589 of the crank 587 holding the crank which in turn holds the pawl 560 from swinging into any of the notches 561. Should the bar 541 rise to any index position before the pulling of the call wire 558, the crank 587 is released by the movement of projection 588 and operation of spring 592 rocking the crank 587 in a counterclockwise direction and releasing pawl 560 which then is latched on the shoulder of the lower arm on latch 559.

The operation of the latch 559 at any of the significant digit positions releases pawl 560 to drop into the related notch 561 and hold the punch bar 541 in differentially adjusted position. A spring 593 is connected between pawl 560 and latch 559 to urge the parts into operated position.

The pawls 560 are restored by cranks 587 when the projections 588 on the punch bars 541 strike the cam face on the upper arm of the cranks 587 when the bars are brought down into normal position. Other means are provided for restoring latches 559 and the connected armatures 557. These devices are shown in Fig. 22. There it is noted that a bail 594 cooperating with all of the latches 559 is pivoted at 595 and carries a rearwardly extending arm 596. Pivoted to the arm is one end of the link 597, the other end of which is connected to a lever 598 pivoted at 599 and carrying a roller in cooperation with a cam 600 mounted on the continually rotating shaft 45. A spring 601 urges the lever 598 into cooperation with the cam 600. A depression in the cam allows the lever to rock in a clockwise direction pulling down link 597 and moving bail 594 to the left (Fig. 22) restoring latches 559 and armatures 557 to normal position. It is remembered that the perforating operating devices are geared to operate once in two cycles of the main operating mechanism. Since cam 600 is mounted on the main operating shaft 45 it will allow two operations of the bail during one perforating cycle unless prevented from so operating. In order to prevent the first operation of the restoring linkage a means is provided on shaft 547 (Fig. 22) preventing the first downward movement of link 597 during a perforating operation but allowing the second downward restoring movement of the link during the same operation.

The shaft 547 carries an arm 602 adjacent to a loosely mounted latching lever 603 connected by a spring with arm 602. The spring urges the latching lever 603 against a pin on arm 602. When the arm 602 is rocked in a clockwise direction during a perforating operation, the latch 603 is placed under a projection 604 riveted on the lever 597. The operation is so timed that the latch prevents the first downward movement of the link during the perforating operation and allows the movement of the link on the second cycle of operation of shaft 45.

Devices for controlling the perforation of zeros in the summary card

It is mentioned hereinbefore that when an accumulator commutator controlling the perforating devices stands at zero, the impulse initiated by the commutator is adapted to release a punch bar 541 for a free movement to a punch disabling position or obstruction of the bar in a zero punching position. The devices for controlling the punching of zeros are shown in Figs. 22 and 22b. In Fig. 22b, a lever 605 is shown pivoted at 606 and urged by a spring 607 into cooperation with the side of the associated punch bar 541. There is provided a lever 605 for each punch bar of the perforating device. If the lever 605 is held in the position shown in Fig. 22b, the lower end of the lever is adapted to obstruct the upward movement of the punch bar 541 by striking the shoulder 608 on the punch bar. When the bar is stopped in such a position, the interposer member 556 is positioned directly in the path of the punch 609 for perforating the zero index position. If the lever 605 is permitted to follow the contour of the side of the punch bar 541, it will rock in a counterclockwise direction with the lower end of the lever moving to the right at the depression 610 in the type bar, causing the end of the lever to miss the shoulder 608 and allowing the bar 541 to rise to a position wherein the end of the lever rests in the notch 611 cut in the punch bar.

When the punch bar rises to such a position, the interposer member 556 is positioned between the punch 609 and the next higher punch, thus disabling the perforating devices in that particular column.

The movement of levers 605 is controlled by manipulative devices comprising adjustable cranks 612 (Fig. 22) connected to the levers by links 613. The adjustable connections are provided in each order of the perforating devices where control is desired over the perforation of zeros. The cranks 612 are pivoted at 614 and are cut with three notches 615, 616, 617. Detents 618 cooperate with the notches to hold the cranks 612 in one of the three adjustable positions. The link 613 carries a stud 619 (Fig. 22b) cooperating with a slot 620 in the lever 605. Each link carries a pin 621 and a vertical offset shoulder 622 overlapping the pin 621 on the link of the next higher order. If the parts are adjusted to the position shown in Fig. 22, zero designations will be perforated to the left of any significant figure digit perforation and to the left of any order wherein the devices are adjusted for zero perforation; and zeros are eliminated to the left of any point of split as described hereinafter. These various types of control are brought about by means of the overlapping relation of studs 621 and shoulders 622 on the links 613. If one of the punch bars 541 rises to perforate a significant digit, the left side of the punch bar supports the lever 605 and prevents it from moving in a counterclockwise direction. The shoulder 622 on link 613 connected to such a lever 605 is thereby prevented from movement to the left and holds the next higher order link through the pin 621 from such movement. All the other higher order links in turn are held by the overlapping of shoulders 622 and pins 621. Thus the higher order levers 605 are held in position to strike shoulders 608 and cause zero perforations.

The lever 605 of the order lower than the lever held in position, is free to move in a counterclockwise direction since the pin 621 on the link of the stationary lever does not obstruct the movement of the shoulder 622 on the lower order link. The related bar 541 is permitted to rise until lever 605 is pointed into notch 611. Thus the zeros are perforated in the summary card orders higher than the lowest order containing a significant digit and the lower order columns are not perforated at all unless a crank in such a lower order is positioned to call for zeroes as is about to be explained.

When the crank 612 is moved in a clockwise direction to a position wherein the notch 615 is engaged by the detent 618, the link 613 is raised so that the shoulder 622 is placed in contact with a bar 623 mounted on the framework of the machine. When the link is placed against the bar 623, it is prevented from movement to the left (Fig. 22b) thus holding the connected lever 605 in zero perforating position. With the link of any order so positioned, all the higher order devices are held in zero perforating position by means of the shoulders 622 and pins 621.

If it is desired to split the control of zero perforation, the crank 612 (Fig. 22) is moved in a counterclockwise direction bringing notch 617 into cooperation with detent 618. The link 613 connected to the crank moved in this manner is lowered, moving shoulder 622 out of cooperation with the pin 621 on the next higher order link. With the control parts in such position, the holding of a lower order linkage in zero perforating position does not serve to hold the higher order banks on the other side of the split point in zero perforating position since the connection 621, 622 is broken at the split point.

In the punching of a perforated record card, the area of the card is divided into fields with a field of one or more orders for each class of data to be punched. The fields may be spaced with one or more unused orders between adjacent fields. Where small numbers are punched in a field it is advisable to fill out the field with zero perforations so that there is no question as to the omission of an amount perforation. At the same time it is well to define the several fields by eliminating the perforating of zeros in the unused orders between fields. To do this the zero punching control devices described hereinbefore are brought into play. The crank 612 at the right order of each field is moved to detent in notch 615, thus filling in zeros to the left, and the crank 612 at the extreme left is moved to detent in notch 617, thus splitting at the end of the field and preventing the punching of zeros to the left. Since the cranks 612 between and in the field are set to detent in notch 616, they control according to the crank adjustments at the right to fill in zeros in the fields and eliminate them between fields. An illustration of an example of controlled zero punching may appear as follows:

```
0086100    007    06230710
```

If alternate cranks 612 are moved to the split position, then the connections between adjacent levers 605 are broken and each order is independent. In this way punching is eliminated in all orders registering zero because in all such orders the punch bar 541 rises until lever 605 touches the bottom of notch 611. If the parts 605 are removed, the same purpose is served since then the punch bars rise to bring interposer 556 against 626 and out of cooperation with punches 609.

Devices for placing a control perforation in a summary card

Devices are provided for controlling the perforating devices to punch a special control perforation such as perforation 112 (Fig. 19) in the summary card. A special perforation in the summary card is placed there under control of the minus balance control devices. When a control perforation appears in the summary card, it is an indication that the accompanying data is a credit balance.

In Fig. 22b it is seen that an interposer member 625 cooperates with the control perforating punch 624 in each column of the device. The member 625 is guided by plate 568 and frame 566. A shoulder 626 on the member cooperates with the end of the punch 624. A projection 627 on the member is spaced from a bar 628 on punch frame 566 an amount sufficient to receive the end of an interposer link 629. When the link 629 is placed between the bar 628 and the projection 627 on one of the members 625, the member is adapted, when operated by movement of frame 566 to the left, (Fig. 22b) to push punch 624 before the extension 626, causing a control hole to be perforated in the related column on the summary card.

The link 629 is dropped into position between bar 628 and extension 627 under control of a magnet PX (Fig. 21). The magnet is adapted to be energized when a total punching operation is being performed and when the amount of the total is a credit or minus balance. The link 629 is pivoted at 630 on an arm 631 secured to a tapped carriage block 632 guided by rail 658 and movable along a threaded shaft 633. The link is urged by a spring 634 into normal position against a rod 635. The link is free to move during the perforating operation because of a pin and slot connection 718 with the arm 631.

A restoring bail 636 mounted on bearings 637 at the two ends of shaft 633 (Fig. 24) reaches across the perforating devices to engage arm 631 in any of the positions across the punch. The bearing hub 637 to which the bail 636 is connected, carries an arm 638, (Fig. 21) the end of which is latched by the armature 639 associated with the magnet PX. The arm 638 is held from operating by another connection comprising a link 640 pivoted on the arm and having a pin and slot connection 641 with an arm 642 fastened to shaft 547 which, as noted hereinbefore, is rocked only during perforating operations. If the armature 639 holds the arm 638 from operating, a spring 643 is tensioned when arm 642 rocks during the perforating operation. When the arm 638 is released by energization of magnet PX and the clockwise rocking of shaft 547, the bail 636 is lowered allowing link 629 to drop into position to make an interposer member 625 effective to punch a control perforation in the summary card.

Figure 24:
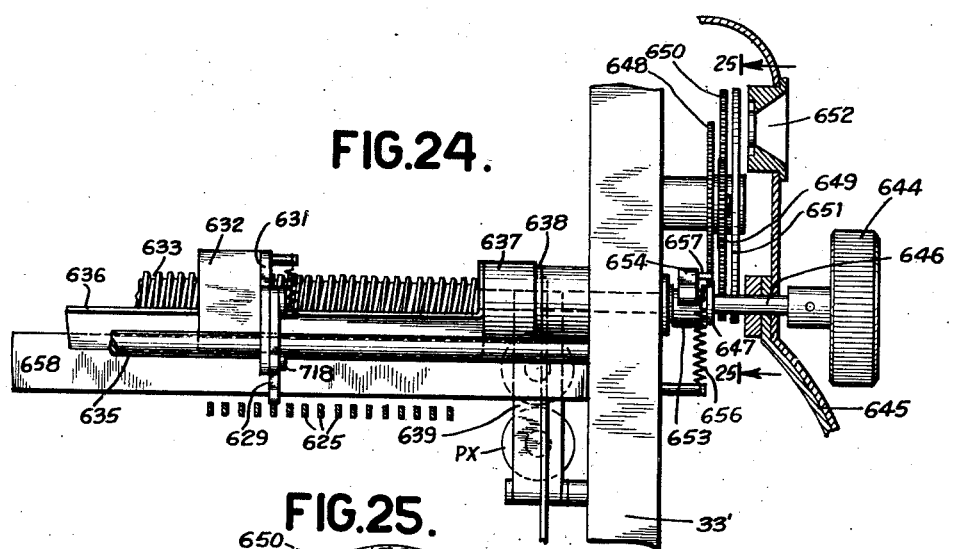
Fig. 24 is a front elevation view of devices for adjustably positioning the means for perforating a special control perforation in a summary card.
Figure 25:
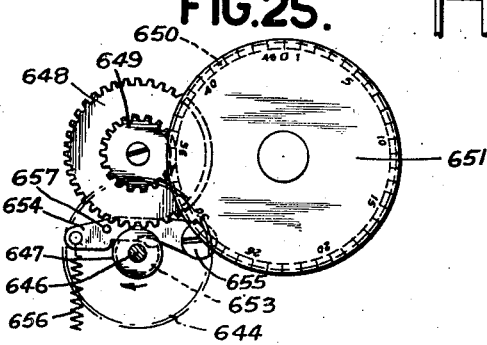
Fig. 25 is a detail view of the indicating devices for showing the location of the special perforation control devices.

The carriage 632 carrying the link 629 is movable along the length of shaft 633 to place the link 629 in cooperation with any of the interposer members 625 (see Fig. 24). Movement of the tapped carriage block is accomplished by turning the threaded shaft 633 by a manipulative knob 644 extending from the case 645 of the machine. The knob 644 (Figs. 23, 24, and 25) is secured to an extension 646 of shaft 633 which also carries a single toothed disk 647 cooperating with a gear 648 connected to a pinion 649 meshing with a gear 650 secured to an indicating wheel 651. A sight opening 652 is provided inside of the case 645 in order to permit a view of the markings on the indicator wheel 651 to determine the position of the carriage 632.

A complete revolution of the knob 644 serves to move the carriage along the threaded shaft from a position wherein the link 629 cooperates with one of the members 625 to a position wherein it cooperates with the next member. Through the gearing shown in Fig. 25, the indicator wheel is moved to bring the index mark adjacent the opening 652 to show the column position assumed by the link 629. The shaft 633 also carries a notched bushing 653 cooperating with a detent arm 654 pivoted at 655 on the machine side frame 33'. A spring 656 urges the detent 654 into cooperation with the notched bushing 653. The detent drops off a shoulder on the bushing after each revolution of the shaft 633, thus forming an indication of the amount of movement necessary to position the carriage.

A pin 657 on the detent cooperates with the teeth cut in gear 648, during the operation of the knob 644. In turning from one position to another, the detent is lifted on a high portion of bushing 653 and pin 657 is placed between two of the teeth on gear 648 preventing movement of the indicating devices while the single tooth on disk 647 is out of cooperation with gear 648 during the adjustment of the devices.

The first card elimination control devices

With the perforation of a record of a balance in a summary card and printing of the same balance on the record sheet, devices are made effective to render the machine operative to perforate and print the classification or designating data presented by the next first record card of the succeeding group to be fed through the machine. The printing and perforating devices are disabled by the feeding of the first record card and remain disabled until the taking of the next total.

The devices for operating the first card elimination contacts FC and group indicating contacts GIC are shown in Fig. 12. There it is noted that a plate 659 is secured to the base of the machine adjacent the shafts 45 and 70. Secured to the plate 659 by insulation blocks 660 are a series of groups of contact blades arranged three blades in a group, a group comprising an upper contact blade 661, a center blade 662, and a lower blade 663. The upper and lower blades are held at one end between insulation blocks 660 and at the other end are free to make contact with the center blade. The center blade 662 is held at one end between the insulation blocks and at the other end is inserted in a notch 664 cut in the side of a long insulation bar 665 secured to a link 666 pinned to a bell crank 667 at 676. When the link 666 is lifted to an upper position, closing contacts FC, a projection 669 on the link is held up by a stop member 670 which is normally held in stopping position by contact with an armature 671 associated with magnet FCE. Magnet FCE is energized by the taking of a total and attracts the armature to release stop member 670 allowing insulation bar 665 to lower, closing the contacts GIC and conditioning certain printing and perforating circuits to cause the registration of the information contained on the first record card of a group presented to the machine after the taking of a total. The connection of contacts FC and GIC in the control circuits by means of plug sockets J6, J7 and J8 (Fig. 26b) is described hereinafter with reference to the wiring diagram.

The projection 669 is prevented from frictionally holding stop member 670 during the release of armature 671, by a pressure release device comprising a cam 672 mounted on the constantly rotating shaft 45. The cam is adapted to rock a lever 673 pivoted at 674 and carrying a latch which engages the stud 676 projecting from the link 666.

A pin 725 in plate 659 engages a tail on latch 675 and rocks the latch out of the path of stud 676 when the lever 673 is out of operating position. When the high point of the cam strikes the follower roller on lever 673, the lever is rocked in a counterclockwise direction to lift the link 666 against the pull of spring 719, and raise projection 669 a short distance above stop member 670.

A means is provided to restore the link 666 to the upper position closing contacts FC and opening contacts GIC late in the operation of feeding the first record card of a group presented after total taking. The restoring means comprises a cam 677 secured to the card feed shaft 70. The cam cooperates with a roller on one arm of the crank 667, the other arm of which is connected at 676 to the link 666. When the projecting cam face strikes lever 667 it is rocked in a counterclockwise direction to lift the contact operating link into normal position. At the same time that the link is being lifted, the stop member 670 and the armature 671 are restored by the double-ended arm 678 pivoted at 679. The arm 678 is operated by a crank 689 which in turn is operated by pin 690 projecting from the side of cam 677. When the pin 690 strikes the crank 689 it is rocked in a clockwise direction and pushes a projection 691 against the side of arm 678 rocking the arm in a counterclockwise direction. The two projecting ends on arm 678, rock stop member 670 and armature 671 in a clockwise direction restoring them to normal position.

The clutch device 74 (Fig. 22) for the punch driving mechanism is made effective by the energization of magnet PUC and movement of armature lever 79, as explained hereinbefore. When armature 79 is attracted, it moves before it a plunger 692 closing contacts PCI.

The contacts are held closed after the total taking operation in order to condition the punch for operation under control of the first record card of the next group. In Fig. 30 is shown the devices for holding the contacts PCI closed. It is seen that a latch 693 pivoted at 694 cooperates with a collar 695 on plunger 692. A spring 696 normally holds the plunger in retracted position against the clutch armature lever 79. When plunger 692 is moved to the right (Fig. 30) closing the contacts PCI, the lever 693 is rocked by spring 720 in position behind collar 695 locking the plunger and holding it from movement to the left. During the feeding of the first record card after taking a total, a circuit is established to energize a magnet PUH. The armature 697 associated with the magnet PUH cooperates with a lever 698 pivoted at 699 and having an arm contacting the side of a pin 700 projecting from one arm of the latching lever 693. The clockwise rotation of lever 698 under control of magnet PUH serves to lift latch 693, releasing the plunger 692 and allowing contacts PCI to open.

A construction similar to that shown in Fig. 30 is provided to cooperate with the printer clutch devices to make the printing mechanism effective with the feeding of the first record card of a group. The devices are shown in Figs. 1, 2 and 26a and include magnets PRC and PRH and contacts MCI.

If there is but one card in a group, i. e. a single card with group number perforations differing from the group numbers of the groups of cards fed before and after it, the punching operation takes place in the usual manner to record the classification data of the group. Meanwhile the printing operation is effected; but the total taking operation does not follow immediately thereafter. As explained hereinbefore, the perforating devices are geared for one complete operation in two cycles of the tabulating portion of the machine, so there is required a holding up of the total taking operation until the perforating operation attending the presence of the first record card is finished.

Disabling of total taking, as explained hereinafter, is controlled by circuit breaking contacts P1—P5 (Fig. 26a) operated by the perforating mechanism. At the end of the perforating operation certain of the contacts are closed to allow the taking of a total. The contacts are operated by cams 714 (Fig. 22) on shaft 715 which is driven by a gear 716 in mesh with gear 717 (Fig. 1) on the punching control shaft 76.

*The plug board circuit breaker switch*

During card sensing operations it is necessary to break the connections between the sensing brushes and the accumulator magnets in order to prevent back circuits while carrying impulses are directed through the magnets. The devices for opening the contacts PBC (Fig. 26b) arranged in series with the brushes 104 and magnets C and D as connected by plug wires between sockets J2 and J16, are shown in Fig. 11. A plate 701 is fastened to the machine frame near the card feed operating shaft 70, and carries a series of contact blades arranged in pairs. The upper blade 702 of each pair is free at the end but the lower blade 703 projects into a slot 704 cut in the side of a vertical insulation bar 705 riveted on a link 706. An arm 707 and a crank 708 pivoted at 709 and 710, respectively, hold the link 706 in a lowered position. A spring 712 urges a follower roller on crank 708 into cooperation with a cam 711 fastened to the card feed shaft 70. Early in a card feeding operation, cam 711 rocks crank 708 in a counterclockwise direction to lift bar 705 and blades 703, thereby closing contacts PBC. At an instant immediately after the zero index position on the card passes under the sensing brushes, cam 711 allows bar 705 to descend and open contacts PBC. The contacts remain open for the remainder of the operation.

*The machine operating connections*

The wiring diagram in Figs. 26a and 26b shows the control of the machine for effecting card feeding, adding, subtracting, totaling, printing and perforating. Only so much of the control as is necessary to understand the operation of the present invention is included in this diagram as the complete control wiring diagram would be so much more complicated that it could not be readily understood without an unnecessary amount of study.

The source of energy is at PS and includes the lines 721 and 722. When a switch at PS is closed the operating motor 36 of the machine is energized and operates connected shafts to which the various mechanisms in the machine may be clutched.

When the start key 723 is depressed contacts K1 are closed. Then a circuit is established from the line 721 through line 726, closed contacts K2, conductor 727, contacts IN1 and MI4, contacts PFCL closed by the presence of cards in summary card magazine or by switch S21, contact P5 closed when punch is not operating, card feed clutch magnet CFC, wire 728, contacts K1 now closed, and wire 729 to the line 722. The energization of magnet CFC will cause operation of the card feed mechanism to feed cards through the machine. This magnet also controls the contacts CFC1, closing them when the magnet is energized. As the cards commence feeding through the machine they will depress the upper card lever 106 (Fig. 18), closing contacts UCL1, UCL2 and opening contacts UCL3. After passing lever 106, each card encounters another lever 109 which when depressed closes the lower card lever contacts LCL1, LCL2 and LCL2'. The start key 723 (Fig. 26a) may then be released and the circuit through the magnet CFC will be maintained from line 726, contacts K2, through wire 727, contacts IN1, MI4, PFCL, P5, magnet CFC, contacts CFC1, wire 732, contacts FCL1 closed by cards in magazine for record cards, contacts LCL2 closed by card entering lower brushes, and wire 733 to the line 722.

If printing is to be effected under control of the cards being fed through the machine, the switch S4 is closed so that the printing clutch magnet PRC is energized when cards feed under the lower brushes. The circuit is as follows: from the line 721, through wire 726, contacts K2, magnet PRC, wire 767, switch S4, contacts MC1 closed during listing, contacts CFC2, contacts MI5, wire 734, contacts LCL closed by a card under the lower card lever 109, and wire 733 to the line 722. The energization of magnet PRC causes the printing operating devices to be clutched to the main operating mechanism so that the type bars and associated mechanisms are operated. If cards fail to feed the lower card lever will permit its contacts to open, breaking the circuit through the magnet PRC. The stoppage of the card feed mechanism by deenergization of magnet CFC also causes opening of the contacts CFC2 so that the connections are open at two points.

After listing if the total key 768 is depressed to reenergize the magnet PRC to print a total, the circuit established is from line 721, contacts K2, magnet PRC, wire 767, wire 769, wire 739, contacts MI6', MI6 closed for total printing control, contacts P3 closed when the punch is not operating, switch S13 closed for hand totals, wire 770, contacts K3 and wire 740 to line 722. Before key 768 can be effective to initiate a manual total printing cycle, the contacts MI6', MI6 or IN2', IN2 must be closed. These group control contacts are closed in either of two ways; automatically by the occurrence of a group change, and manually by the depression of the final total key 429 to energize magnets FI and MA which operate the control contacts as explained hereinbefore.

Minor switches S12 and S13, and intermediate switches S14 and S15 can be opened to prevent total printing on respective group changes; switches S13 and S15 when opened prevent the taking of key selected totals by key 768, and switches S12 and S14 when opened prevent automatic total taking cycles on group changes.

While the machine is in operation and cards are being fed, the machine may be stopped at any time by depression of the stop key 771 to open the contacts K2. This will break the circuit through the card feed clutch magnet, the printing clutch magnet and other control magnets. The operating motor will, of course, continue to operate until the switch at PS is opened.

A platen feed mechanism such as that shown in Patent 2,042,324 is provided to feed the record paper before printing in both listing and total operations. A platen feed magnet PFM, when energized acts to clutch the platen spacer to the driving mechanism. The circuit through the platen feed magnet is as follows: line 721, wire 772, wire 773, switch S2 closed for listing, contacts PM6 closed before printing hammer operation, magnet PFM, and wire 774 to the line 722. If the switch S1 is closed, the paper feed devices are adapted to act to space the record sheet after total printing. The contacts 344 in series with switch S1 are closed by actuation of interposer 342 (Fig. 5) on total taking operations. The switch S1 and contacts 344 are in shunt around contacts PM6, and when they close, magnet PFM is energized.

Two other connections for energizing the paper feed magnet PFM are shown in Fig. 26a. The one connection is made through minor group control contacts MI3 which are automatically restored and closed by cam 412 during the taking of a minor total at a time when switch S2 is open. The other connection is made through contacts K4U and wire 775, the contacts being closed by the depression of the final total key 429.

A number of the circuit closing contacts shown on the wiring diagram are operated by different parts of the machine, depending upon whether the contacts are to be operated on all cycles, during a card feeding cycle, or during a total taking cycle when card feeding is not being effected. The contacts and cams that are operated during the card feeding cycle of the machine when the machine is either adding or subtracting, during which operation listing of the amounts added and subtracted may also be effected, are designated CB cams and contacts. All of the CB cams may be mounted on the shaft 70 of Fig. 1, which shaft is operated while cards are being fed through the machine.

Other cams and contacts are designated as CR cams and contacts. These cams are continuously operating whether the machine is adding, subtracting or totaling. These cams may be mounted for operation on shaft 45 (Fig. 1) which shaft is always turning. Certain contacts not operated by cams, and designated TS contacts are controlled by the devices shown in Fig. 9. When the machine goes into a total taking operation magnet TM is energized to shift the parts so that the TS contacts shown opened in Figs. 26a and 26b become closed and those that are closed become opened. Certain other contacts are adapted to be opened or closed when the subtraction magnet SM is energized. Other contacts are affected when the minus balance magnet MBM is energized.

*Accumulating and listing*

When cards are fed through the machine, they first pass under the upper brushes 103 at UB (Fig. 26a) and then under the lower brushes 104, at LB (Fig. 26b). While a card is under the brushes 104 the contacts CB2 are permitted to close. If a perforation appears in any column on the card, when such perforation passes under a brush 104 a circuit will be set up through the perforation as follows if the card is a debit card: from line 721, through the contacts LCL2' which are held closed by the cards while feeding, through contacts CB2 and through the wire 776 to the common contact roller 777, then through the perforation in the card to the brush 104, to plug socket J2, through a plugging wire to the socket J16, through cable 825 and wire 825', through contacts 749, contacts PBC, magnet D, wire 826, to bus bar 781 and wire 782 to bus bar 783 and through contacts CB8 to the line 722.

The series of contacts CB8 make contact at each index point position and break before a perforation passes a brush 104, thus preventing sparking at the brushes. A plurality of contacts are provided to ensure the passage of an impulse.

During the same cycle in which the debit accumulator magnet D is energized by an impulse through brush 104 during debit item entering, the related credit accumulator magnet C is energized early in the operating cycle to start accumulating the complement of the debit amount. Taking, for example, the complemental operation of the related pair of credit and debit accumulators at the lower right hand corner in Fig. 26b, the operation of the credit accumulator magnets C may be explained with reference to the related debit accumulator magnets D by reference to the units, tens and hundreds order denominations of these accumulators which are designated by the letters U, T and H, respectively. The circuit for energizing the magnets C is: line 721, contacts LCL2', wire 784, and then through two branches of the circuit; the one closed by contacts CB13 sends an impulse through wire 785 to the higher order magnets C at a time corresponding to the 9 index position on the card, the other closed by contacts CB14 sends an impulse through wire 786 to the units order magnet C at a time when the 9 index position on the card is one step above the brush 104, thus enabling the units wheel to turn through ten steps of movement. The circuit for the units order continues through wire 786, contacts SS, contacts 749, wire 827, magnet C, wire 826, bus bar 781, and wire 782 to line 722. The tens order magnet is energized by an impulse through wire 785, the middle pair of contacts SS, contacts 749, a wire in cable 828 leading to the second jack J17 from the right, a wire in cable 825 leading to wire 829, contacts PBC, magnet C, wire 826, bus bar 781, wire 782 to line 722. All higher order magnets C are energized by similar circuits connected to wire 785 by bus bar 785' between the higher order contacts SS. The hundreds order wire in cable 828 goes to the third jack J17 from the right, and a return wire therefrom in cable 825 leads to the hundreds order magnet C. Each credit accumulator wheel will continue to rotate until the related debit magnet D is energized. When the debit wheel clutching frame 123, 124 moves to connect the debit wheel with the driver, the related credit clutching frame will disengage the credit accumulator wheel from the driver by means of the mechanism described with reference to Fig. 13.

The energization of magnet D, as we have seen in connection with Figs. 13 and 13a, causes the accumulator gear 127 to commence to turn in accumulating. It commences to turn at a point in the cycle when a perforation passes under the brush 104, and ceases to rotate when the cam point 140 (Fig. 13) causes the gear 120 to be disengaged from gear 119.

Thus, the amount represented by the position of the perforation is added in the debit wheel and, by means of the added complement, subtracted from the credit wheel.

The circuit through the brush 104 also effects item printing through the following circuit: from the plug socket J16, through contacts 313 closed during listing, socket J19, socket J20, wire 787, through printing magnet PM, to bus bar 788 and through wire 789, bus bar 783, and contacts CB8 to the other side of the line 722. The energization of printing magnet PM, as described in connection with Fig. 3, controls the setting of the type carrier 226 to cause printing of the character represented by the position of the perforation in the card. The sockets J19, J20 are arranged so that by cross plugging from one column to another, the printed data may be placed in position across the record sheet 287, Fig. 28.

Carrying from one order in an accumulator to the next higher order is effected as explained in connection with the mechanism shown in Figs. 16 and 17. The wiring connections are shown in Fig. 26b. If the accumulator wheel of any order passes from nine to zero during an adding operation, it will cause the brush 207 to rock into position to be later engaged by the projection 210 on disk 211 as described hereinbefore. After the accumulator wheel is disengaged, the contacts CB3 (Fig. 26b) are closed momentarily. This closure takes place at the moment when the projection 210 is passing the position of brush 207. If the brush has been rocked so as to be engaged by the projection, a circuit will close at this moment; the circuit includes the line 721, contacts CB3, wire 790, bus bar 791, through a brush 207 of the units order, disk 211, brush 219, through a wire in cable 792 leading to magnet C of the next higher order or, if the carry occurs in the debit accumulator through cable 792 to magnet D of the next highest order, then to bus bar 781, wire 782, bus bar 783, contacts CB8, and then to the other side of the line 722. The units order brush 219 identified in Fig. 26b is connected to a wire in cable 792 leading to the magnet C which is second from the right. The next brush 219 of the tens order is connected to the hundreds order magnet C at the extreme right.

As soon as one step of carry movement is imparted to one of the wheels, the cam point 141 (Fig. 13) will cam the pinion 120 out again so that the accumulator wheel again stops after having received the additional movement. If any accumulator wheel is standing at nine when a carry impulse is directed through the related magnet, the impulse is carried on to the next higher order. With a wheel at nine, the related brush 212 (Fig. 16) will be in position to be engaged by projection 213 on disk 211. This engagement also takes place during the moment that contacts CB3 (Fig. 26b) are closed. Thus, when current passes from the brush 219 to a wire in cable 792 it will also pass on to brush 212, through disk 211 of the next higher order, then to brush 219 of that order and out to the next wire in the cable, and on to the magnet C of the order above, to cause one to be added to the hundreds order. In a similar way, a carrying impulse going through the tens order debit disk 211 passes through wire in the cable to the hundreds order debit magnet D. Thus, if the accumulator wheel of the tens order is standing at nine at the end of an accumulating operation and the wheel of units order passes from nine to zero, a unit will be carried into the accumulator wheel of the tens order and another unit will be carried through the tens order into accumulator wheel of the hundreds order.

Contacts SS connect the carrying mechanisms of both accumulators to extend the capacity when operating in adding. For subtraction control the lever 176 (Fig. 3) opens the contacts SS and separates the accumulators.

If the card carries a credit amount, one of the columns will be punched with a control perforation 112 in a position above the amount perforation positions. In the upper brushes (Fig. 26a) the brush 103 which reads this particular column is connected by a plug line to the socket J9 which in turn is connected by manually arranged plugging to a class selection magnet CSC which serves to control the distribution of accumulating, printing or punching control impulses and a subtraction control magnet SCM which serves to set the devices so that the number on the card is added in the credit accumulator while the complement of the number is added in the debit accumulator shown in Fig. 13. Thus, if there is a perforation in this position, and the machine is plugged for subtraction control, brush 103 will make contact with the common contact roller 194 and set up a circuit from the line 722, contacts CB8, bus bar 783, wire 795, roller 794, brush 103, jack J1 and a plug wire (not shown) to J9, subtraction control magnet SCM, contacts CB10 closed while the brushes are passing the extra perforation, contacts UCL1, wire 793 to line 721. The operator may selectively plug one or more or all of the seven relay magnets CSC and SCM shown at the top of Fig. 26b to be energized when a perforation 112 is sensed.

When the magnets SCM or CSC are energized, they act to close contacts SC or SC' in series with subtraction magnets SM, class selection magnets CSM and class elimination magnet CEM. The circuit through magnets SM, CSM and CEM runs from line 721, contacts LCL2', wire 735, wire 796, contacts CB12, certain contacts SC or SC', certain magnets SM, CSM, CEM, and wire 774 to line 722.

The energized magnets SM act to shift related subtraction control contacts, closing contacts 750 and opening contacts 749 in the accumulation control wiring. The changed relation of contacts 750 directs the accumulating impulses from the card through the credit accumulator. The closing of the same contacts switches the impulses flowing through wires 785 and 786 to the debit accumulator magnets D which then start revolving early in the operation to add the complement. The debit accumulator wheels are disengaged from their drivers by the meshing of the credit accumulator wheels as explained hereinbefore.

Since the units order wheel of either accumulator when adding a complement is adapted to rotate through ten steps of movement instead of nine, the complement received by the accumulator will be the full complement and not merely the nines complement.

When the credit card is passing through the lower brushes the amount readings sensed by brushes 104 will be transmitted the same as debit amounts by a circuit through the brushes to plug sockets J2 and thence through a plug wire (not shown) to plug socket J16 and through cable 825, wire 829, contacts PBC, magnet C, bus bar 781, wire 782, bus bar 783, contacts CB8 and line 722. The printing of the credit amount is performed by energization of magnet PM by impulses transmitted over the same circuits used in listing debit amounts.

The effective magnets CSM are controlled by the shifting of contacts SC', Fig. 26a, and in turn operate blades 463, Figs. 10 and 26b, closing contacts 446 and opening contacts 445 to selectively distribute the impulses received at socket J3 to sockets J4, J5. Magnet CEM, as explained hereinbefore, Fig. 10, acts to hold both contacts 445, 446 open, thus eliminating a certain class of data. Socket J3 may be connected to socket J2 by a plug wire and sockets J4, J5 may also be so connected to sockets J20 or J17 for printing or accumulating in two sections of the accumulator or printer, of classified data in one column on the record cards. Socket J3 may be connected to J2 by a plug wire, while sockets J4 and J5 are plugged to jacks J21 so that the perforation of items may be placed selectively on the summary card according to class of item.

Totaling operation

To take a hand total, the total key 168 is depressed closing contacts K3 (Fig. 26a). This energizes magnet TM (in addition to magnets FCE, ACA, PPM, PUC and PRC) by a circuit from line 721, through wire 726, contacts K2, wire 797, magnet TM, wire 798, contacts IN2 or MI6, switch S15, wire 779, contacts K3 and wire 748 to the other side of the line 722. The contact blades TS and contacts 313, 314 are then shifted by the mechanism shown in Fig. 9. Of course, before a hand total is taken, the card feeding operation is stopped by an automatic group change which not only opens contacts MI4 or IN1 to stop the card feed, but also closes contacts MI6, MI6' or IN2, IN2' to prepare for taking a total.

Contacts CR4 are closed by a constantly running cam at a definite time after the shifting of contact blades TS, and a circuit is set up from the line 721 through wire 799, contacts TS3 now closed, contacts CR4, contacts PM9 and then through the minor group control contacts MI1, switch S8 to socket J14. From this socket a plug wire may reach to the lowest order jack J15' and through all the successive spring contact blades 29 on the jacks J15 to contacts TS4. When a plug 28 is inserted into a jack J15, an insulation block 30 on the blade 29 of the adjacent jack is cammed out of the plugged jack and moves the blade away from the side of the plugged jack and breaks the electrical connection to the lower orders. The other control jacks J11, J12 and J13 may be plugged to certain of the jacks J15 to control resetting of parts or sections of accumulators on major, intermediate or final totals. For example, three separate accumulators may be plugged separately to the three jacks J11, J12 and J13, the lowest order jacks J15' being plugged to each of the three. Then on a change in intermediate group classification perforations on the records, the accumulator connected to J13 would be reset and totaled; on a change in major group numbers, the accumulators connected to J12 and J13 would be reset; and on operation of the final total control, all accumulators would be reset. The resetting circuits continue from jacks J15 and contacts TS4 through wires 800 to magnets C and D, bus bar 781, wire 782, bus bar 783 and back to the line 722. This takes place at a time in the total operation of the machine corresponding to one step prior to the time that the nine index positions on the card would ordinarily pass under the brushes 104. The accumulator wheels are then all (except the wheels at zero) thrown into mesh for operation and will be conditioned to turn through ten steps, or in other words, each wheel will turn to add the value ten unless interrupted at an intermediate point. The wheels at zero are not meshed because when they are so positioned the cams 363 thereon rock latches 359 out of the position supporting lever 133 and assembly 123, 124 so that it is not urged in a counterclockwise direction but clockwise by spring 121 which then urges the accumulator clutch elements out of mesh as explained hereinbefore.

Although the resetting or totaling impulses are sent through both accumulators, printing and perforating will be effected only under control of the accumulator containing the balance as a true number. If the balance is a debit balance, the following total printing circuit will also be closed while the accumulator wheels are turning: from the line 721, through wire 799, contacts TS2 now closed, contacts CR5 and contacts PM4, PM5, contacts 492, wires 801 to bus bars 802 in the debit accumulator, and from the bus bars, wires to a brush in each pair of brushes 368. Then, since the commutators 364 (Figs. 13, 14, 15 and 26b) are turning with the accumulator wheels, when a metal insert 365 on wheel 364 closes the circuit between a pair of brushes 368, the circuit will continue through cable 803, contacts 314 now closed, plugs J19, J20, wire 787, printer magnet PM, bus bar 788, wire 789, and through contacts CB8 to line 722. The timed energization of magnets PM will set the respective type bars for printing the total of the balance which was standing on the debit accumulator wheels. If set for a clearing total the accumulator wheels are demeshed at the zero position, the grooved bar 332 of Figs. 13 and 15 having released the levers 133 to permit the gears 120 to be cammed and latched out so that the accumulators are cleared and ready for a new accumulating operation.

As explained hereinbefore, if the amount in the accumulators is a credit balance, the debit accumulator will contain a complement and the credit accumulator will contain a true number as a balance. The accumulator wheel of the highest order in the credit accumulator will contain a zero and the corresponding debit wheel will stand at nine.

Whenever a total is to be taken, the wheel 364 and contacts 367 of the highest order in the credit accumulator are tested for a zero by a circuit about to be traced. If the wheel contains a zero, devices are set up to print and perforate the total under control of the credit accumulator instead of the debit accumulator. After the total key 768 has been depressed and the contacts TS closed, current will pass from line 721 through wire 799, contacts TS2, wire 804, contacts CR9 closed before the total reading cycle, contacts SS, wire 805 and wire 806 to bus bar 807 and one brush 367 in one of the credit accumulators, through an insert on commutator 364 if the wheel stands at zero, then through the other brush 367, wire 808, contacts SS2, Fig. 26a, now closed, magnet MBM, wire 774 to line 722. This magnet MBM opens contacts 492 and closes contacts 493. Printing will then be controlled by impulses through cable 803 and brushes 366 as circuits are closed by the rotating credit accumulator wheels. The credit accumulator wheels are conditioned for rotation by the resetting circuits through plug sockets J15 described hereinbefore.

If operation of the machine is not under subtraction control, the contacts SS3 in the minus balance control circuits are closed so as to shunt contacts 493, thus conditioning for the printing of the amount registered on both sets of accumulator wheels during total taking.

During clearing totals, the wheels will rotate until they reach their zero positions at which time they will be demeshed and left at zero for a new accumulating operation. The circuit to the printer magnets PM established on credit balance printing operations is from line 721, through wire 799, contact TS2, contacts CR5, contacts PM4, PM5, contacts 493 (contacts SS3 are opened except when set for straight adding operation), bus bars 807, brush 366, commutator 364, brush 366, cable 803, contacts 314, sockets J19, J20, wires 787, magnets PM, bus bar 788, wire 789, contacts CB8 to the other side of the line 722.

When it is desired to print a total without clearing the accumulator wheels, a switch S19 is closed in a circuit with the progressive totaling magnets PG. Then early in the totaling operation the magnets PG are energized by the following circuit: line 721, contacts CR10, contacts MI2, switch S19, socket J32, plug wire to a socket J33, through one or more magnets PG, bus bar 781, wire 782, bar 783, contacts CB8, and line 722.

The number of accumulator wheels retaining the amount setting after totaling depends on the number of sockets J33 connected to energize the associated progressive totaling magnets PG. With switch S19 opened, progressive totaling may be selected by depressing the progressive total key 809 closing contacts K5 and establishing the circuit outlined above. The sockets J35 are used to hold one end of a dummy plug, the other end of which is plugged at J33 for splitting progressive totaling.

At the same time that magnet TM is energized by a circuit outlined hereinbefore, another magnet ACA is energized, it being arranged in multiple with magnet TM. The magnet ACA as shown and explained with reference to Fig. 5 conditions the total taking devices by allowing the turning of notched shafts 331, 332.

Another magnet FCE is arranged in multiple with magnet TM and is adapted to be energized when a control switch S20 is closed to complete the multiple connection. When energized by total operations, magnet FCE shifts contacts FC and GIC, as explained with reference to Fig. 12. Socket J6 is connected to sockets J7 and J8 through contacts FC and GIC, so that if socket J6 is connected by plug wire to J2 and J8 is connected to plug J20, the printing is controlled so that a group number is printed with the feeding of the first card of a group, and thereafter printing is eliminated until after another total. Contacts FC are used when the tabulator is operated for ordinary item listing at which time the group number of each card is to be recorded. Then plug J7 is connected to plug J20, and switch S20 (Fig. 26a) is opened to disable relay magnet FCE so that the closed condition of contacts FC is maintained.

On total taking operations the magnets PRC, PUC, and PPM are energized to connect devices for securing a printed and perforated record of the total. The circuit through the printing clutch operating magnet PRC runs from line 721, wire 726, contacts K2, magnet PRC, wire 767, wire 769, wire 739, contacts MI6', MI6, contacts P3, switch S12 or S13 and contacts CR3 or total key contact K3, according to whether the total is automatic or hand operated, and wire 740, to line 722. The printing clutch circuit may branch off at wire 739 to include the intermediate contacts IN2, IN2' for the printing of an intermediate, major or final total. The circuit through the punch clutch control magnet PUC includes line 721, wire 726, contacts K2, wire 738, magnet PUC, wire 810, contacts MI7, switch S22, wire 739, contacts MI6', MI6, contacts P3, switch S12, contacts CR3, and wire 740 to line 722. The summary card feeding magnet PPM is energized by the same circuit, it being arranged in multiple with magnet PUC by wire 811 and contacts MI7'.

Group control

If automatic control over total taking is desired, devices may be made effective to sense a change in card group numbers and change the control to take a total. The automatic group control devices include the magnets GCM. The magnets may be connected between the upper and lower brushes to simultaneously sense the same index points in the same columns on succeeding cards and thereby be energized if the succeeding cards carry coinciding perforations. If the cards carry disagreeing classification data, certain of the magnets GCM are not energized.

The socket J30 connected to magnet GCM may be connected by plug wire to socket J2 connected to lower brush 104. The other socket J31 connected to the same magnet GCM is connected by plug wire to a socket J1 in turn connected to an upper brush 103 for sensing the same column. Each of the magnets GCM may be connected in the same fashion to the columns of the sensing devices which it is desired to have control the automatic totaling devices. The circuit through each control magnet includes connections from line 721, contacts LCL2', contacts CB2, wire 776, contact roller 777, brush 104, socket J2, plug wire to J30, magnet GCM, socket J31, plug wire to J1, brush 103, roller 794, wire 795, bus bar 783, contacts CB8, and line 722.

When a control magnet is energized, indicating no change in a related order of the group number, it attracts and opens the associated contacts 381. A magnet GCM, not energized, permits the related contact 381 to remain closed, conditioning it for energizing one of the magnets MI, INT, MA and FI with which the contacts 381 are arranged in series through connections to plug sockets 398. The sockets 398 may be connected to sockets J22, J23 and J24 associated with magnets MA, INT and MI, respectively.

A connection from socket 398 to one of the plug sockets, connects one or more of the contacts 381 in multiple with the control magnets so that if any one of the series of contacts 381 remains closed, the magnet is energized. The magnets are plugged according to the arrangement of columns desired to control. Minor group control is adapted to be effected by change in group number the greatest number of times. Intermediate control numbers are less likely to change, and major control data seldom change.

The circuit through the automatic control magnets runs from line 721, contacts LCL2', wire 735, contact CB4, wire 744, switch S5, wire 745, one or more of the contacts 381, socket 398, socket J22, J23, or J24, magnet MA, INT, or MI, contacts CR1 and wire 812 to line 722. On a change in minor classification, magnet MI is energized and serves to operate all the MI contacts as explained in connection with Fig. 6. A change in intermediate classification serves to energize magnet INT which in turn controls the operation of both the MI and the INT contacts.

A change in major classification energizes magnet MA to operate all the group control contacts except the final control contacts FI, as explained with reference to Fig. 6. When the group control contacts are operated, they serve to disable card feeding, since contacts IN1 and MI4 (Fig. 26a) are opened, and also initiate total taking operation, because then contacts MI6, MI6', IN2, IN2' close and contacts MI1, IN3 and MA1 (Fig. 26b) close to start turning the accumulator wheels in orders plugged thereto to be controlled to print and perforate a record of the total accumulated under control of the group of record cards fed through the machine before the change in classification.

An operation similar to the automatic group control operation may be initiated by the depression of the final total key 429. When this key is depressed, a circuit is connected including line 721, wire 772, contacts K4L, wire 813, contacts CB1, magnets FI and MA, contacts CR1 and wire 812, to line 722. Since both the magnets FI and MA are energized by the depression of the final total key, all the contacts of minor, intermediate, major, and final class are operated to condition the machine to print a total of amounts associated with all classes of designations.

The machine may be conditioned to take a minor control total automatically under control of the last card fed through the machine, if the switch S17 is closed. When the last card fed through the machine leaves the upper brushes, the contact UCL3, Fig. 26a, associated with the upper card lever is closed to condition a circuit including line 721, Fig. 26b, contacts LCL2', wire 735, contacts CB4, wire 744, switch S17, contacts UCL3, wire 814, magnet MI, contacts CR1, wire 812, to line 722. As the magnet MI is energized it serves to operate the MI contacts, as explained in connection with Fig. 6, thereby initiating a total taking operation.

The machine may be conditioned to print the group number of the first card of a group and prevent further printing during the accumulation of the separate items, by disabling printing until the total amount is printed on line with the group number. The circuit through the magnet PRC for the clutching of the printing devices to operate only with the first card of a group, includes line 726, contacts K2, magnet PRC, contacts PM2 normally closed, contacts MC1 closed on the previous total cycle by a latch associated with magnet PRH, contacts CFC2, contacts MI5, wire 734, contacts LCL1 and wire 733 to line 722. A break in the circuit is made at contacts MC1 after the feeding of the first card by the energization of magnet PRH and the tripping of a latch controlling contacts MC1. The circuit through magnet PRH comprises line 721, contacts LCL2', wire 735, contacts CB18 closed by the feeding of cards, wire 736, magnet PRH, switch S3 closed by hand when first card control is desired, wire 737, contacts PM3 closed by printing operation, and wire 815 to the line 722.

If it is desired to secure a perforated record of each item printed during listing operations, the perforating mechanism may be connected to act as a duplicator. A connection is made to the group control devices so that the effect is the same as if single card groups were fed through the machine under group control.

The plug connections to the control devices are changed as follows: a plug connection from magnet GCM to the upper or lower brushes is opened; the socket 398 connected to the contact 381 operated by the disabled magnet GCM is plugged to control the magnet MI. Thus, the control magnet is energized on each card feeding cycle as if the succeeding cards differed in group classification.

The first summary card is fed into the punching device under control of the punch picker magnet PPM, and the perforating operation is performed under control of devices operated when the punch clutch magnet PUC is energized by a total taking cycle. The circuit through the two magnets is from line 721, wire 726, contacts K2, wire 738, then branching out to go through both magnets PPM and PUC, wires 811 and 810 and contacts MI7 and MI7' closed by magnet MI, switch S22 closed for punch control, wire 739, contacts MI6', MI6, contacts P3, through switch S12 closed for automatic control operation or through S13 for hand operated totals, contacts CR3 normally closed, and wire 740 to line 722.

Upon completion of the punch cycle, contacts PI are closed by the punch driving means to restart the feeding of record cards by bringing about the energization of the card feed clutch magnet CFC through; line 721, wire 726, contacts K2, wire 727, contacts IN1, contacts MI4, the contacts PFCL, contacts P5, magnet CFC, contacts PI, contacts 532 closed by a blank card 500 entering the top of the punch as the punched summary card is ejected at the bottom, wire 741, switch S16 closed when operating with automatic start, contacts FCL1 closed by record cards in the magazine, or through switch S18, contacts LCL2 and wire 733 to the line wire 722.

When the record card feeding operation is initiated after a total printing and punching cycle, the card feeding magnet CFC when energized closes contacts CFC2 completing a circuit through the printing and perforating magnets to record the classification data on the first summary card from the first record card. The contacts PC1 and MC1 are closed, being latched in this position when operated during the previous totaling cycle by latches associated with magnets PUH and PRH respectively. The printing and print disabling control exercised by magnets PRC and PRH are explained hereinbefore by reference to the wiring. The punch and punch disabling control after first card registration is now outlined. The circuit through punch clutch magnet PUC is from line 721, wire 726, contacts K2, wire 738, magnet PUC, contacts P2 closed while not perforating, contacts PC1, wire 742, contacts CFC2, contacts MI5, wire 734, contacts LCL1 and wire 733 to line 722. The passing of the first record card disables the punching connections by energizing magnet PUH, opening contacts PC1 and deenergizing the magnet PUC. The circuit through magnet PUH is from line 721, contacts LCL2', wire 735, contacts CB18, wire 736, wire 820, magnet PUH, switch S23 closed for group designation perforating control, wire 821, wire 737, contacts PM3 and wire 815 to line 722.

After the perforating of the group number during automatic group control, the punch clutch magnet PUC is prevented from being energized through contacts PC1, but magnet PUC and magnet PPM may be energized by the closing of the MI contacts on a change in group as explained hereinbefore.

The energization of the magnet PUC serves to condition the punch operating device shown in Fig. 22 for operation, but control of the setting of the punch devices depends upon the timed energization of the punch control magnets PU. Certain of the magnets PU are connected to the lower brushes 104 directly on through the contacts GIC so that the punch devices are set to punch the group number sensed from the first card of a group. The circuit includes line 721, contacts LCL2', contacts CB2, wire 776, roller 777, through the card to brush 104, socket J2, plug wire to socket J6, contacts GIC, socket J8, plug wire to socket J21, magnet PU, wire 822, bus bar 783, contacts CB8 and line 722. Other of the magnets PU are connected in line with the commutators 364 on the accumulator wheels so that a reading of a total or balance may be taken and used to control perforation in the summary card. The circuit for total punching includes line 721, wire 799, contacts TS2, contact CR5, contacts PM4 and PM5, through contacts 492 or 493 to bus bar 802 for a debit balance, or bus bar 807 for a credit balance, or both bars for straight adding total control, then to one sensing brush 366 or 368, through the contact segment 20 on the commutator 364 at the instant it arrives at zero position, through the other brush to cable 803, socket J18, plug wire to socket J21, magnet PU, wire 822, bus bar 783 and through contacts CB8 to line 722.

The punching of a control perforation X, Fig. 34, in a summary card is controlled by magnet PX which is energized for credit balance punching. The circuit is closed by a TS contact, the balance shifting contact 493, and the contact P4 closed as the machine operates. The circuit includes line 721, wire 799, contacts TS2, CR5, PM5, and 493, wire 835, socket J10 and plug wire to socket J38, magnet PX, contacts P4, contacts TS1, bus bar 783, contacts CB8 to line 722.

Since the basic novel features of the invention have been shown and described as applied to a single modification, it will be understood that various omissions and substitutions and changes in the form and details of the device illustrated and changes in its operation may be made by those skilled in the art without departing from the spirit of the invention. It is the intention, therefore, to be limited only as indicated by the scope of the following claims:

1. In a record perforating machine, accumulators for adding different classes of amounts, means for detecting which of the accumulators holds a balance amount, as a true number, means under control of said detecting means for selecting one of said accumulators for operation, record perforating devices, means for operating said devices under control of the selected accumulator to make a perforated record of the balance accumulated, special punches, normally locked devices for operating one of said special punches to perforate a special perforation in the record, manipulative means for shifting said special operating devices to cooperate with any of said special punches in any column position on the record, and means under control of said selecting means for unlocking said special operating devices when a certain one of said accumulators is selected for control of the perforating devices.

2. In a record perforating machine, a plurality of accumulators, punching mechanism, means for detecting which of the accumulators holds a balance amount as a true number, means under control of said detecting means for selecting one of the accumulators to control said mechanism, means under control of the selected accumulator for operating said mechanism, special punches, devices for operating one of said special punches to cut a special perforation in the record, manipulative means for moving said special punch operating devices to cooperate with one of said special punches in any column position along the record, and means under control of said selecting means for conditioning said special punch operating devices for operation only when a certain accumulator is selected.

3. In a perforating device, a pair of balance accumulators, means for entering debit and credit amounts and complements into said accumulators, means for determining which accumulator holds the balance as a true number, means under control of said determining means for selecting the accumulator holding the true number balance of a series of amounts, a plurality of orders of perforating punches including a series of special punches, each order containing eleven special punches arranged in a column with one punch for each digit and a special punch, means under control of said selected accumulator for conditioning one digit punch for operation in each order, an interposer for conditioning one of said special punches for operation, means for shifting said interposer to choose one of said special punches for operation, and means under control of said selecting means for conditioning said interposer and the chosen special punch for operation when a certain one of the accumulators is selected and means for operating the conditioned punches to perforate a record.

4. In a perforating device, an accumulator, means for adding amounts in said accumulator, means for preparing said accumulator for total taking operation, a series of punches corresponding to digits, means under control of said accumulator for conditioning said punches for operation, a series of special punches, an interposer for conditioning one of said special punches for operation, means for shifting said interposer to select one of said special punches for operation, a restoring mechanism for normally holding said interposer in an ineffective position, a magnet for also holding said interposer in the ineffective position, means under control of said preparing means for energizing said magnet to release the interposer so that it may condition a special punch for operation when said restoring mechanism is operated, and means for operating the selected special punch and digit punches for the perforation of a record.

5. In a record perforating device, punching mechanism, a plurality of denominational order punch bars in said mechanism for selecting any one of ten punch positions corresponding to the figures 0–9, each of said bars being provided with zero stopping means and non-punching control means, stop pawls cooperating with said bars to stop the bars in positions to punch any of the significant figures, latches for holding said pawls away from the bars, means for operating said latches to release said pawls at differential times to stop the bars in different figure punching positions, means cooperating with said pawls to hold them out of cooperation with the bars to allow the bars to move free in all orders where said operating means operates a latch early in the cycle before the time for stopping the bar in a significant figure punch position, stop levers cooperating with said zero stopping means of said bars and with each other to stop higher order bars, on the left of a bar positioned to punch a significant figure, in position to punch zeros and to release all lower order levers for cooperation with said non-punching control means of the lower order bars so that they assume a position preventing punching.

6. In a record perforating device, punching mechanism comprising a series of punches arranged in columns with ten punches in a column for each order, each punch representing one of the digits 0–9, and a plurality of denominational order punch bars adapted to select one of said punches in each order, each of said bars being provided with a zero stopping means and non-punching control means, means for operating the selected punches to perforate the record, stop pawls cooperating with said bars to position the bars to select the punches, latches for holding said pawls away from the bars, means for operating said latches to release said pawls at differential times to stop the bars in different figure punching positions, means cooperating with said pawls to hold them out of cooperation with said bars to release the bars in all orders where said operating means operates a latch early in the cycle before the time for stopping the bar in a significant figure punching position, stop levers cooperating with said bars in one of two ways, to cooperate with the zero stopping means of the bars to stop them to select the zero punch or to cooperate with the non-punching control means of the bars to stop them in a position between punches to eliminate punching, offset connections between said levers to set higher order levers to select a zero punch under control of a lower order lever held by a bar set to select a punch for a significant digit, and manipulative devices for adjusting said levers to control zero perforation in three ways; to lock a lower order lever in zero punch selecting position and thereby, through the offset connections, cause perforation of zeros in higher orders, to adjust the levers in normal position wherein the offset connections cause the higher order levers to select zero punches under control of a lower order lever, and to break an offset connection thus splitting zero perforation control so that zeros are not perforated in higher orders under control of an order lower than that at the point of splitting.

7. In a recording device, a recording bar formed with a shoulder and a depression for controlling the movement thereof to recording or non-recording position, means for moving said bar toward recording position, a stop lever adapted to cooperate with said depression in said shoulder, means for urging said lever into said depression so that said bar is stopped out of recording position, a control member loosely connected to said lever, a stop bar for cooperating with said member to hold said lever to cooperate with said shoulder so that said bar is held in recording position, and manipulative means for selectively bringing said member into cooperation with said stop bar.

8. In a recording device, a recording bar movable to one of a series of different recording positions, a pawl for stopping said bar in any one of said positions, a crank for normally holding said pawl out of cooperation with said bar, springs which tend to draw said crank out of normal position and move said pawl into cooperation with said bar, a latch for engaging said crank or said pawl, means for operating said latch at a differential time and a projection on said bar which holds the crank in normal position so that if said latch is operated early in the recording cycle, the crank is latched and the pawl is held out of operation and the bar moves to the end position, and if said latch is operated during the usual portion of the recording cycle, said bar is stopped in a recording position.

9. In a machine with perforation sensing means controlled by perforated records grouped according to group numbers perforated therein, the combination of means under control of said sensing means for comparing said group numbers on successive records comprising minor, intermediate and major group control magnets energized under control of said sensing means when group numbers change, armature levers associated with said magnets, machine control contacts, means released by the armature associated with the minor magnet for operating certain of said contacts when said minor magnet is energized, means released by the armature associated with the intermediate magnet for operating other of said contacts, means released by the armature associated with the major magnet for operating still other of said contacts, and a link pivoted to the intermediate armature lever with pin and slot connections to the other two levers so that when the minor lever is moved the other two levers are not disturbed, but when the intermediate lever is moved the minor lever is also operated and when the major lever is operated the other two levers are also operated.

JOHN ROYDEN PEIRCE.